(12) United States Patent
Zhang et al.

(10) Patent No.: US 11,671,737 B2
(45) Date of Patent: Jun. 6, 2023

(54) AUDIO GLASSES

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 101 days.

(21) Appl. No.: 17/224,159

(22) Filed: Apr. 7, 2021

(65) Prior Publication Data

US 2021/0227306 A1 Jul. 22, 2021

Related U.S. Application Data

(63) Continuation of application No. PCT/CN2020/070540, filed on Jan. 6, 2020.

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/10* (2006.01)
*H04R 1/02* (2006.01)
(Continued)

(52) U.S. Cl.
CPC .......... *H04R 1/1016* (2013.01); *G02C 11/00* (2013.01); *G02C 11/10* (2013.01); *G06F 3/16* (2013.01);
(Continued)

(58) Field of Classification Search
CPC ........ H04R 1/105; H04R 1/1075; H04R 1/20; H04R 1/26; H04R 1/32; H04R 1/323; H04R 1/34; H04R 1/345; H04R 1/347
See application file for complete search history.

(56) References Cited

U.S. PATENT DOCUMENTS

2005/0093653 A1* 5/2005 Larson, III ............. H03H 9/605
333/187
2007/0223735 A1 9/2007 Lopresti et al.
(Continued)

FOREIGN PATENT DOCUMENTS

CN 206193360 U 5/2017
WO 2020220970 A1 11/2020

OTHER PUBLICATIONS

International Search Report in PCT/CN2020/070540 dated Apr. 2, 2020, 6 pages.
(Continued)

*Primary Examiner* — Kile O Blair
(74) *Attorney, Agent, or Firm* — Metis IP LLC

(57) ABSTRACT

The present disclosure relates to a pair of audio glasses. The pair of audio glasses may include a frame, one or more lenses, and one or more temples. The pair of audio glasses may further include at least one low-frequency acoustic driver, at least one high-frequency acoustic driver, and a controller. The at least one low-frequency acoustic driver may be configured to output sounds from at least two first guiding holes. The at least one high-frequency acoustic driver may be configured to output sounds from at least two second guiding holes. The controller may be configured to direct the low-frequency acoustic driver to output the sounds in a first frequency range and direct the high-frequency acoustic driver to output the sounds in a second frequency range. The second frequency range may include one or more
(Continued)

frequencies higher than one or more frequencies in the first frequency range.

17 Claims, 29 Drawing Sheets

(51) Int. Cl.
| | |
|---|---|
| H04R 1/26 | (2006.01) |
| H04R 1/44 | (2006.01) |
| G06F 3/16 | (2006.01) |
| H04M 1/03 | (2006.01) |
| H04M 1/78 | (2006.01) |
| H04R 1/24 | (2006.01) |
| H04R 1/28 | (2006.01) |
| H04R 3/02 | (2006.01) |
| H04R 1/34 | (2006.01) |
| H04W 4/80 | (2018.01) |
| H04R 1/22 | (2006.01) |
| H04R 3/00 | (2006.01) |
| H04R 5/02 | (2006.01) |
| G10L 21/038 | (2013.01) |
| H04R 5/033 | (2006.01) |
| H04S 7/00 | (2006.01) |
| G02C 11/00 | (2006.01) |
| H04R 1/38 | (2006.01) |
| H04R 9/06 | (2006.01) |
| G10L 21/0208 | (2013.01) |
| G02C 11/06 | (2006.01) |
| G10L 21/0216 | (2013.01) |

(52) U.S. Cl.
CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

U.S. PATENT DOCUMENTS

| | | |
|---|---|---|
| 2007/0291971 A1 | 12/2007 | Van Halteren |
| 2013/0051585 A1 | 2/2013 | Karkkainen et al. |
| 2019/0052954 A1* | 2/2019 | Rusconi Clerici Beltrami ........... G10K 11/175 |

OTHER PUBLICATIONS

Written Opinion in PCT/CN2020/070540 dated Apr. 2, 2020, 6 pages.

* cited by examiner

300

(a)

(b)

AUDIO GLASSES

CROSS-REFERENCE TO RELATED APPLICATIONS

This application is a Continuation of International Patent Application No. PCT/CN2020/070540, filed on Jan. 6, 2020, which claims priority of Chinese Patent Application No. 201910364346.2, filed on Apr. 30, 2019, Chinese Patent Application No. 201910888762.2, filed on Sep. 19, 2019, and Chinese Patent Application No. 201910888067.6, filed on Sep. 19, 2019, the entire contents of each of which are incorporated herein by reference.

TECHNICAL FIELD

The present disclosure relates to smart devices, in particular, to an audio glasses.

BACKGROUND

Audio glasses are a composite product including an earphone and glasses. Compared with traditional glasses, users of the audio glasses may listen to music and answer a call through the audio glasses. Compared with conventional earphone (e.g., an in-ear earphone, and a headphone), the audio glasses may have an open structure, which does not block and not cover the ear canal, allows a user to obtain sound information of an ambient environment while the user is listening to music, thereby improving safety and comfort of the user. Due to the use of an open structure, a sound leakage of the audio glasses may be more serious than that of conventional headphones. In particular, when a volume of the audio glasses is relatively large and the environment is relatively quiet, the sound leakage may be relatively prominent and obvious, which may not only affect the work or life of people around, but also leaks information that users is listening to.

Therefore, it is desirable to provide audio glasses with improved hearing sound and decreased sound leakage.

SUMMARY

According to an aspect of the present disclosure, a pair of audio glasses are provided. The audio glasses may avoid the aforementioned problems. Specifically, the pair of audio glasses may reduce the sound leakage of the audio glasses by setting multi-point sources. The pair of audio glasses may include one or more frequency division loudspeakers, thereby improving user's experience.

To achieve the above purposes, the technical solutions disclosed according to some embodiments of the present disclosure are described in the following.

According to an aspect of the present disclosure, the pair of audio glasses are provided. The pair of audio glasses may include a frame, one or more lenses, and one or more temples. The pair of audio glasses may further include at least one low-frequency acoustic driver, at least one high-frequency acoustic driver, and a controller. The at least one low-frequency acoustic driver may be configured to output sounds from at least two first guiding holes. The at least one high-frequency acoustic driver may be configured to output sounds from at least two second guiding holes. The controller may be configured to direct the low-frequency acoustic driver to output the sounds in a first frequency range and direct the high-frequency acoustic driver to output the sounds in a second frequency range. The second frequency range may include one or more frequencies higher than one or more frequencies in the first frequency range.

In some embodiments, a first distance may be between the two first guiding holes, a second distance may be between the two second guiding holes, and the first distance may exceed the second distance.

In some embodiments, the first distance may be in a range of 20 millimeters-40 millimeters, and the second distance may be in a range of 3 millimeters-7 millimeters.

In some embodiments, the first distance may be at least twice of the second distance.

In some embodiments, the first frequency range may include frequencies lower than 650 Hz, and the second frequency range may include frequencies higher than 1000 Hz.

In some embodiments, the first frequency range may overlap with the second frequency range.

In some embodiments, the controller may include an electronic frequency division module. The electronic frequency division module may be configured to divide an audio source signal to generate a low-frequency signal corresponding to the first frequency range and a high-frequency signal corresponding to the second frequency range. The low-frequency signal may drive the at least one low-frequency acoustic driver to generate the sounds, and the high-frequency signal may drive the at least one high-frequency acoustic driver to generate the sounds.

In some embodiments, the electronic frequency division module may include at least one of a passive filter, an active filter, an analog filter, or a digital filter.

In some embodiments, the at least one low-frequency acoustic driver may include a first transducer. The at least one high-frequency acoustic driver may include a second transducer. The first transducer and the second transducer may have different frequency response characteristics.

In some embodiments, the first transducer may include a low-frequency loudspeaker, and the second transducer may include a high-frequency loudspeaker.

In some embodiments, at least two first acoustic routes may be formed between the at least one low-frequency acoustic driver and the at least two first guiding holes. At least two second acoustic routes may be formed between the at least one high-frequency acoustic driver and the at least two second guiding holes. The at least two first acoustic routes and the at least two second acoustic routes may have different frequency selection characteristics.

In some embodiments, each of the at least two first acoustic routes may include an acoustic resistance material. An acoustic impedance of the acoustic resistance material may be in a range from 5MKS Rayleigh to 500MKS Rayleigh.

In some embodiments, the pair of audio glasses may further include a supporting structure. The supporting structure may be configured to support the at least one high-frequency acoustic driver and the at least one low-frequency acoustic driver and keep the at least two second guiding holes closer to a user's ears than the at least two first guiding holes when the user wears the audio glasses.

In some embodiments, the at least two first guiding holes and the at least two second guiding holes may be disposed on the supporting structure.

In some embodiments, the low-frequency acoustic driver may be encapsulated by a first housing. The first housing may define a front chamber and a rear chamber of the low-frequency acoustic driver.

In some embodiments, the front chamber of the low-frequency acoustic driver may be acoustically coupled to one of the at least two first guiding holes. The rear chamber may be acoustically coupled to the other first guiding hole of the at least two first guiding holes.

In some embodiments, the high-frequency acoustic driver may be encapsulated by a second housing. The second housing may define a front chamber and a rear chamber of the high-frequency acoustic driver.

In some embodiments, the front chamber of the high-frequency acoustic driver may be acoustically coupled to one of the at least two second guiding holes. The rear chamber of the high-frequency acoustic driver may be acoustically coupled to the other second guiding hole of the at least two second guiding holes.

In some embodiments, the sounds output from the at least two first guiding holes may have opposite phases.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
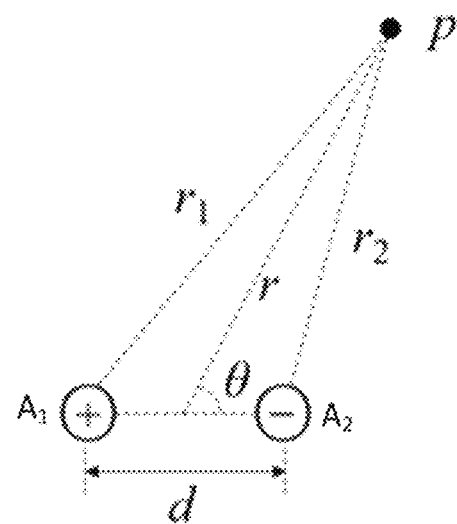
FIG. 1 is a schematic diagram illustrating an exemplary dual-point sound source according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

It will be understood that the term "system," "engine," "unit," "module," and/or "block" used herein are one method to distinguish different components, elements, parts, section or assembly of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps can be processed in reverse order or simultaneously. Besides, one or more other operations may be added to the flow charts, or one or more operations may be omitted from the flow chart.

Figure 38:
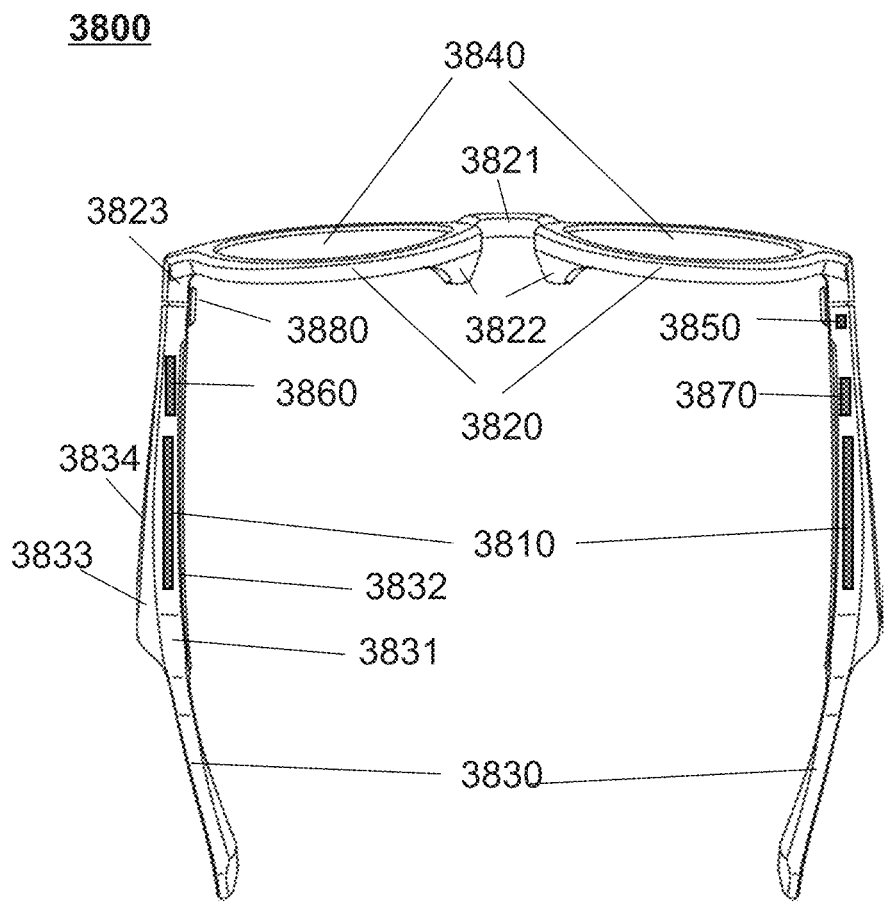
FIG. 38 is a schematic diagram illustrating exemplary audio glasses according to some embodiments of the present disclosure.

The present disclosure provides audio glasses. The audio glasses may include a frame, one or more lenses, and one or more temples. When a user wears the audio glasses, the audio glasses may be close to but do not block the user's ears. In some embodiments, an audio glasses may include at least two sets of acoustic drivers. The at least two sets of acoustic drivers may include at least one set of high-frequency acoustic drivers and at least one set of low-frequency acoustic drivers. Each of the at least two sets of the acoustic drivers may be configured to generate a sound with a specific frequency range, and propagate sound outward through at least two guiding holes acoustically coupled to the set of acoustic drivers. In some embodiments, the audio glasses may include at least one set of acoustic drivers, and the sound generated by the at least one set of acoustic drivers may be propagated outward through at least two guiding holes acoustically coupled to the at least one ser of acoustic drivers. In some embodiments, an audio glasses may be arranged with a baffle structure, thus at least two guiding holes may be arranged on both sides of the baffle, respectively. In some embodiments, at least two guiding holes may be disposed on two sides of the user's auricle. The use's auricle may be served as a baffle to separate the at least two guiding holes, and the at least two guiding holes may have different acoustic routes to the user's ear canal. In some embodiments, the audio glasses may include an acoustic output device (e.g., as shown in FIG. 38, audio glasses 3800 may include an acoustic output device 3810), or the audio glasses may be regarded as an acoustic output device.

FIG. 1 is a schematic diagram illustrating an exemplary dual-point sound source according to some embodiments of the present disclosure. To further illustrate the effect of the setting of guiding holes of an acoustic output device (e.g., audio glasses) on an output sound of the acoustic output device, and considering that the sound propagates outward from the guiding holes, the guiding holes of the acoustic output device may be regarded as sound sources for sound output in the present disclosure.

Merely for the convenience of description and illustration purposes, when a size of each of the guiding holes of the acoustic output device is relatively small, the each guiding hole may be regarded as a point sound source. In some embodiments, any guiding holes disposed on the acoustic output device for outputting sound may be regarded as a single point sound source of the acoustic output device. A sound pressure of a sound field p generated by a single point sound source may be represented by Equation (1) below:

$$p = \frac{j\omega\rho_0}{4\pi r} Q_0 \exp j(\omega t - kr), \tag{1}$$

where $\omega$ refers to an angular frequency, $\rho_0$ refers to the air density, r refers to a distance between a target point and a sound source, $Q_0$ refers to a volume velocity of the sound source, and k refers to a wave number. It can be seen that the sound pressure of the sound field of the point sound source may be inversely proportional to the distance between the target point to the point sound source. It should be noted that a guiding hole for outputting a sound is regarded as a point sound source in the present disclosure may be only an example of the principle and effect, which does not limit the shape and size of the guiding hole in practical applications. In some embodiments, a guiding hole with a relatively large area may be regarded as a surface sound source and configured to propagate a sound outward. In some embodiments, the point sound source may also be realized by other structures, such as a vibrating surface, a sound radiating surface, or the like. For those skilled in the art, without paying any creative activity, it may be known that the sound generated by the structures such as the guiding hole, the vibrating surface, and the sound radiating surface may be regarded as a point sound source at a spatial scale discussed in the present disclosure, which may have the same sound propagation characteristics and the same mathematical descriptions. Further, for those skilled in the art, without paying any creative activity, it may be known that the acoustic effect achieved in a case in which a sound generated by an acoustic driver may be propagated outward through at least two guiding holes illustrated in the present disclosure may be achieved by other acoustic structures mentioned above, such as the sound generated by the at least one set of acoustic drivers may be propagated outward through at least one sound radiating surface. Other acoustic structures may be selected, adjusted, and/or combined according to actual needs, and the same acoustic output effect may be achieved. The principle of propagating sound outward by a structure such as the surface sound source may be similar to the principle of propagating sound outward by the point sound source, which is not be repeated herein.

As mentioned above, at least two guiding holes corresponding to the same acoustic driver of an acoustic output device disclosed in the present disclosure may be used to construct a dual-point sound source, thereby reducing the sound radiated by the acoustic output device to the surrounding environment. For convenience, the sound radiated by the acoustic output device to the surrounding environment may be referred to as a far-field leakage sound due to that the sound may be heard by other people in the environment. The sound that the acoustic output device radiates to the ears of the user wearing the acoustic output device may be referred to as a near-field sound due to the acoustic output device is close to the user. In some embodiments, the sound output by two guiding holes (i.e., a dual-point sound source) may have a certain phase difference. As used herein, a phase of the sound output by a point sound source (e.g., a guiding hole) may also be referred to as a phase of the point sound source. When positions of the two point sound sources of the dual-point sound source and the phase difference satisfy certain conditions, the acoustic output device may show different sound effects in the near-field (e.g., a hearing position of the user's ear) and the far-field. For example, when the phases of the point sound sources corresponding to the two guiding holes are opposite, that is, when an absolute value of the phase difference between the two point sound sources is 180 degrees, a far-field leakage may be reduced according to the principle of sound wave anti-phase cancellation. More descriptions regarding improving the sound output effect of an acoustic output device may be found in International Patent Application No. PCT/CN2019/130884 filed on Dec. 31, 2019, the entire contents of which are hereby incorporated by reference.

As shown in FIG. 1, the sound pressure p of the sound field generated by the dual-point sound source may be represented by Equation (2) below $$p = \frac{A_1}{r_1} \exp j(\omega t - kr_1 + \varphi_1) + \frac{A_2}{r_2} \exp j(\omega t - kr_2 + \varphi_2), \tag{2}$$

where $A_1$ and $A_2$ refer to the intensities of the two point sound sources of the dual-point sound source, respectively, $\varphi_1$ and $\varphi_2$ refer to the phases of the two point sound sources of the dual-point sound source, respectively, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \tag{3}$$

where r refers to a distance between any target point in space and a center position of the two point sound sources of the dual-point sound source, $\theta$ refers to an angle between a line connecting the target point and the center position of the dual-point sound source and a line where the dual-point sound source locates (i.e., the line connecting the two point sound sources of the dual-point sound source), and d refers to a distance between the two point sound sources of the dual-point sound source.

According to Equation (3), the sound pressure of the target point in the sound field may relate to the intensity of each point sound source, the distance between the two point sound sources, the phases of the two point sound sources, and a distance between the target point and the dual-point sound source.

The dual-point sound source with different output performance may be formed by setting the sound guiding holes. In this case, a volume in the near-field sound may be increased, and a volume of the leakage sound in the far-field may be decreased. For example, an acoustic driver may include a vibration diaphragm. When the vibration diaphragm vibrates, sounds may be transmitted from a front side and a rear side of the vibration diaphragm, respectively. The front side of the vibration diaphragm in the acoustic output device may include a front chamber for transmitting a sound. The front chamber may be acoustically coupled with a sound guiding hole. The sound transmitted from the front side of the vibration diaphragm may be transmitted to the sound guiding hole through the front chamber and further transmitted outwards. The rear side of the vibration diaphragm in the acoustic output device may be provided with a rear chamber for transmitting a sound. The rear chamber may be acoustically coupled with another sound guiding hole, and the sound transmitted from the rear side of the vibration diaphragm may be transmitted to the sound guiding hole through the rear chamber and propagate outwards. It should be noted that, when the vibration diaphragm vibrates, the front side and the rear side of the vibration diaphragm may generate sounds with opposite phases, respectively. In some embodiments, the structures of the front chamber and rear chamber may be specially set so that the sounds output by the acoustic driver at different sound guiding holes may meet specific conditions. For example, lengths of the front chamber and the rear chamber may be specially designed such that sounds with a specific phase relationship (e.g., opposite phases) may be output from the two sound guiding holes. As a result, problems that the acoustic output device has a low volume in the near-field and the sound leakage in the far-field may be effectively resolved.

Under certain conditions, compared to a single point sound source, the volume of the far-field sound of the dual-point sound source may be increased with the frequency. In other words, the leakage reduction capability of the dual-point sound source in the far-field may be decreased as the frequency increases. For further description, a curve of far-field leakage with frequency may be described in connection with FIG. 2.

Figure 2:
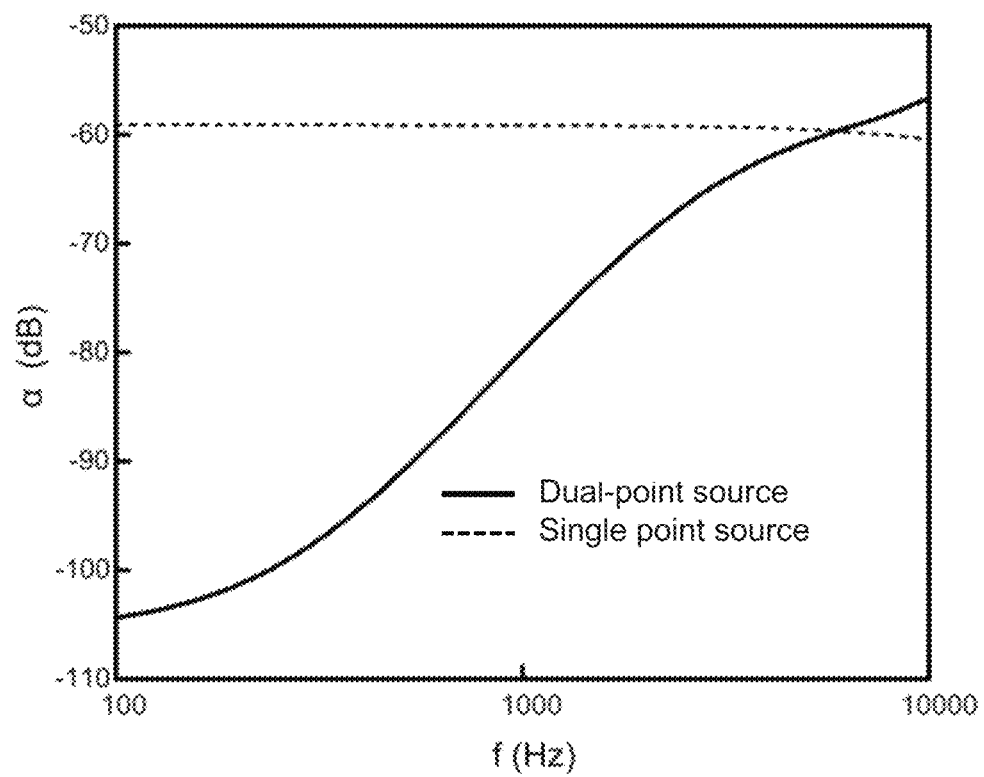
FIG. 2 is a schematic diagram illustrating variations of leakage sounds of a dual-point sound source and a single point sound source with a frequency according to some embodiments of the present disclosure.

FIG. 2 is a schematic diagram illustrating variations of leakage sounds of a dual-point sound source and a single point sound source with a frequency according to some embodiments of the present disclosure. A distance between the two point sound sources of the dual-point sound source in FIG. 2 may be constant, and the dual-point sound source may have the same (or substantially same) amplitude and opposite phases. A dotted line represents the variation of a volume of the leakage sound of the single point sound source at different frequencies. A solid line represents the variation of a volume of the leakage sound of the dual-point sound source at different frequencies. The abscissa represents the sound frequency (f), and the unit is Hertz (Hz). The ordinate adopts a normalization parameter α to evaluate a volume of a leakage sound. The parameter α may be represented by Equation (4) below:

$$\alpha = \frac{|P_{far}|^2}{|P_{ear}|^2}, \quad (4)$$

where $P_{far}$ represents a sound pressure of the acoustic output device in a far-field (i.e., the sound pressure of the far-field sound leakage). $P_{ear}$ represents a sound pressure around the user's ear(s) (i.e., a sound pressure of the near-field sound). The greater the value of α, the greater the far-field leakage sound relative to the near-field sound may be, which may indicate that the capability of the acoustic output device for reducing the far-field sound leakage may be worse.

As shown in FIG. 2, when the frequency is below 6000 Hz, the far-field leakage sound produced by the dual-point sound source may be less than the far-field leakage sound produced by the single point sound source, and the far-field leakage sound may be increased as the frequency increases. When the frequency is close to 10000 Hz (e.g., about 8000 Hz or above), the far-field leakage sound produced by the dual-point sound source may be greater than the far-field leakage sound produced by the single point sound source. In some embodiments, a frequency corresponding to an intersection of the variation curves of the dual-point sound source and the single point sound source may be determined as an upper limit frequency that the dual-point sound source can reduce the sound leakage.

For the purposes of illustration, when the frequency is relatively small (e.g., in a range of 100 Hz to 1000 Hz), the capability of reducing sound leakage of the dual-point sound source may be relatively strong (i.e., the value of a may be small which is below −80 dB). In such a frequency band, increment of the volume of the hearing sound may be determined as an optimization goal. When the frequency is relatively great, (e.g., in a range of 1000 Hz to 8000 Hz), the capability of reducing sound leakage of the dual-point sound source may be relatively weak (i.e., the value of a may be large which is above −80 dB). In such a frequency band, decreasement of the sound leakage may be determined as the optimization goal.

Referring to FIG. 2, a frequency division point of the frequency may be determined based on the variation tendency of the capability of the dual-point sound source in reducing the sound leakage. Parameters of the dual-point sound source may be adjusted according to the frequency division point so as to reduce the sound leakage of the acoustic output device. For example, the frequency corresponding to α with a specific value (e.g., −60 dB, −70 dB, −80 dB, −90 dB, etc.) may be used as the frequency division point. Parameters of the dual-point sound source may be determined by setting the frequency band below the frequency division point to improve volume of the near-field sound, and setting the frequency band above the frequency division point to reduce the far-field sound leakage. In some embodiments, a high-frequency band with relatively high sound frequencies (e.g., a sound output by a high-frequency acoustic driver) and a low-frequency band with relatively low sound frequencies (e.g., a sound output by a low-frequency acoustic driver) may be determined based on the frequency division point. More descriptions regarding the frequency division point may be found elsewhere in the present disclosure. See, e.g., FIG. 4 and the relevant descriptions thereof.

In some embodiments, the measurement and calculation of the sound leakage may be adjusted according to the actual conditions. For example, an average value of amplitudes of the sound pressures of a plurality of points on a spherical surface centered at the dual-point sound source with a radius of 40 cm may be determined as the value of the sound leakage. A distance between the near-field hearing position and the point sound source may be less than a distance between the point sound source and the spherical surface for measuring the far-field sound leakage. Optionally, the ratio of the distance between the near-field hearing position and the center of the dual-point sound source to the radius r may be less than 0.3, 0.2, 0.15, or 0.1. As another example, one or more points of the far-field position may be taken as the position for measuring the sound leakage, and the sound volume of the position may be taken as the value of the sound leakage. As another example, a center of the dual-point sound source may be used as a center of a circle, and sound pressure amplitudes of two or more points evenly sampled according to a certain spatial angle in the far-field may be averaged, and an average value may be taken as the value of the sound leakage. These measurement and calculation methods may be adjusted by those skilled in the art according to actual conditions, which are not limited herein.

According to FIG. 2, it can be concluded that in the high-frequency band (e.g., a relatively high frequency band determined according to the frequency division point), the dual-point sound source may have a relatively weak capability to reduce sound leakage, and in the low-frequency band (e.g., a relatively low frequency band determined according to the frequency division point), the dual-point sound source may have a relatively strong capability to reduce sound leakage. At a certain sound frequency, the amplitudes, phase differences, etc., of the two point sound sources of the dual-point radiation source may be different, and the capability of the two point sound sources of the dual-point radiation source to reduce sound leakage may be different, and the difference between a volume of the heard sound and a volume of the leakage sound may also be different. For a better description, the curve of the far-field leakage as a function of the distance between the two point sound sources of the dual-point radiation source may be described with reference to FIGS. 3A and 3B.

Figure 3A:
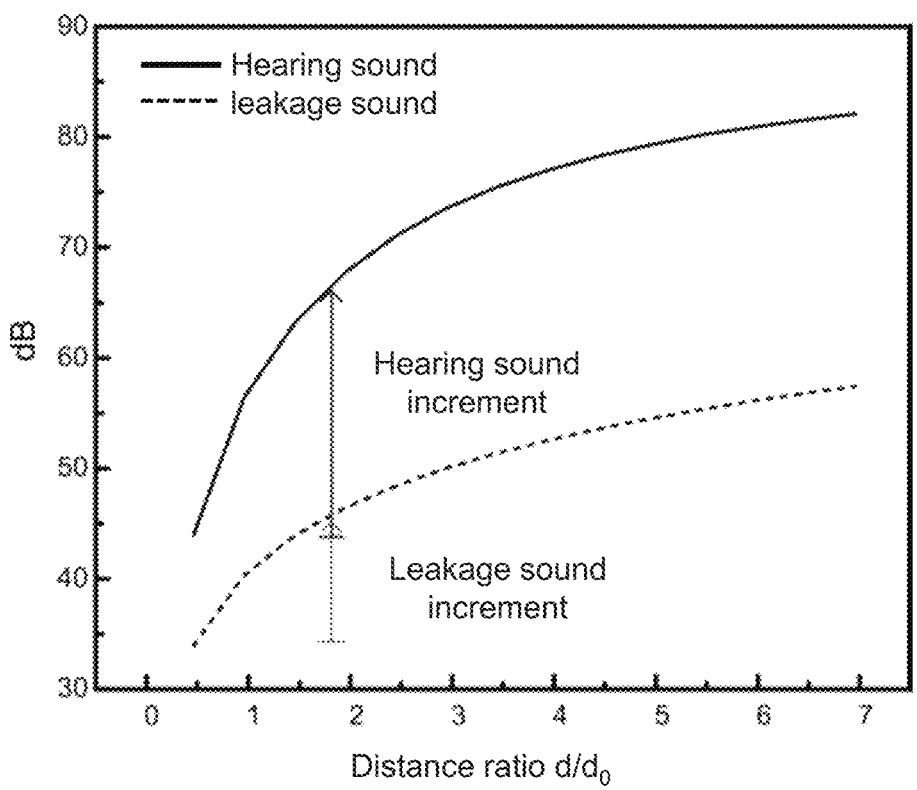
FIG. 3A and FIG. 3B are graphs illustrating changes of a volume of the near-field sound and a volume of the far-field leakage with a distance of two point sound sources of a dual-point sound source according to some embodiments of the present disclosure.
Figure 3B:
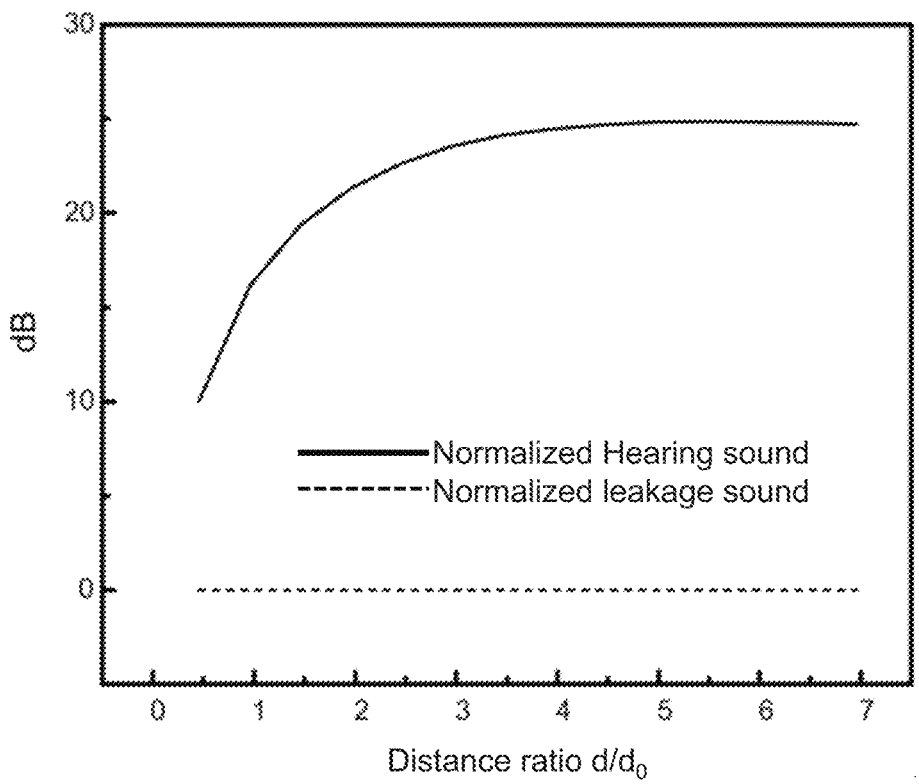

FIG. 3A and FIG. 3B are graphs illustrating changes of a volume of the near-field sound and a volume of the far-field leakage with a distance of two point sound sources of a dual-point sound source according to some embodiments of the present disclosure. FIG. 3B is the graph which is generated by performing a normalization on the graph in FIG. 3A.

As shown in FIG. 3A, a solid line represents a variation curve of a hearing sound of the dual-point sound source with the distance between the two point sound sources of the dual-point sound source, and a dotted line represents a variation curve of a leakage sound of the dual-point sound source with the distance between the two point sound sources of the dual-point sound source. The abscissa represents a distance ratio $d/d0$ of the distance d between the two point sound sources of the dual-point sound source to a reference distance d0. The ordinate represents a sound volume (the unit is decibel (dB)). The distance ratio $d/d0$ may reflect a change of the distance between the two point sound sources of the dual-point sound source. In some embodiments, the reference distance d0 may be determined within a specific range. For example, d0 may be a specific value in the range of 2.5 millimeters-10 millimeters. Merely byway of example, d0 may be 5 millimeters. In some embodiments, the reference distance d0 may be determined based on a hearing position. For example, a distance between the hearing position to a nearest point sound source among the two point sound sources of the dual-point sound source may be regarded as the reference distance d0. It should be known that the reference distance d0 may be determined as any other suitable values according to the actual conditions, which is not limited herein. Merely by way of example, in FIG. 3A, d0 may be 5 millimeters as the reference value for the change of the distance between the two point sound sources of the dual-point sound source.

When the sound frequency is constant, a volume of the hearing sound and a volume of the leakage sound of the dual-point sound source may increase as the distance between the two point sound sources of the dual-point sound source increases. When the distance ratio $d/d0$ is less than a ratio threshold, as the distance between the two point sound sources of the dual-point sound source increases, the increment of the volume of the hearing sound may be greater than the increment of the volume of the leakage sound. That is, the increment of the volume of the hearing sound may be more significant than that of the volume of the leakage sound. For example, as shown in FIG. 3A, when the distance ratio $d/d0$ is 2, a difference between the volume of the hearing sound and the volume of the leakage sound may be about 20 dB. When the distance ratio $d/d0$ is 4, the difference between the volume of the hearing sound and the volume of the leakage sound may be about 25 dB. In some embodiments, when the distance ratio $d/d0$ reaches the ratio threshold, a ratio of the volume of the hearing sound and the volume of the leakage sound may reach a maximum value, and as the distance of the two point sound sources of the dual-point sound source further increases, the curve of the volume of the hearing sound and the curve of the volume of the leakage sound may gradually go parallel. That is, the increment of the volume of the hearing sound and the increment of the volume of the leakage sound may be the same (or substantially same). For example, as shown in FIG. 3B, when the distance ratio $d/d0$ is 5, 6, or 7, the difference between the volume of the hearing sound and the volume of the leakage sound may be the same (or substantially same), which may be about 25 dB. That is, the increment of the volume of the hearing sound may be the same as the increment of the volume of the leakage sound. In some embodiments, the ratio threshold of the distance ratio $d/d$ of the dual-point sound source may be in the range of 0-7. For example, the ratio threshold of $d/d0$ may be in the range of 0.5-4.5. As another example, the ratio threshold of $d/d0$ may be in the range of 1-4.

In some embodiments, the ratio threshold may be determined based on the change of the difference between the volume of the hearing sound and the volume of the leakage sound of the dual-point sound source in FIG. 3A. For example, the ratio of the volume of the hearing sound to the volume of the leakage sound may be determined as the ratio threshold when a maximum difference between the volume of the hearing sound and the volume of the leakage sound is reached. As shown in FIG. 3B, when the distance ratio $d/d0$ is less than the ratio threshold (e.g., 4), as the distance between the two point sound sources of the dual-point sound source increases, a normalized curve of a hearing sound may show an upward trend (e.g., a slope of the normalized curve is greater than 0). That is, the increment of the volume of the hearing sound may be greater than the increment of the volume of the leakage sound. When the distance ratio $d/d0$ is greater than the ratio threshold, as the distance between the two point sound sources of the dual-point sound source increases, the slope of the normalized curve of the hearing sound may gradually approach 0. The normalized curve of the hearing sound may be parallel to the normalized curve of the leakage sound. That is, as the distance between the two point sound sources of the dual-point sound source increases, the increment of the volume of the hearing sound may be no longer greater than the increment of the volume of the leakage sound.

Based on the description mentioned above, it can be seen that when the hearing position is constant and the parameters of the dual-point sound source may be adjusted by certain means, thereby achieving significantly increasing the volume of the near-field sound and slightly increasing the volume of the far-field leakage (that is, the increment of the volume of the near-field sound is greater than the increment of the volume of the far-field leakage). For example, two or more of dual-point sound sources (e.g., a high-frequency dual-point sound sources and a low-frequency dual-point sound sources) may be disposed, the distance between two point sound sources of each of the dual-point sound sources may be adjusted by a certain means, and the distance between two point sound sources of the high-frequency dual-point sound source may be less than the distance between two point sound sources of the low-frequency dual-point sound source. Due to the low-frequency dual-point sound source may have a small sound leakage (i.e., the low-frequency dual-point sound source may have a relatively strong capability to reduce the sound leakage), and the high-frequency dual-point sound source may have a relatively great sound leakage (i.e., the high-frequency dual-point sound source may have a relatively weak capability to reduce the sound leakage). The volume of the hearing sound may be significantly greater than the volume of the leakage sound when the distance between the two point sound sources of the dual-point sound source in the high-frequency band is relatively small, thereby reducing the sound leakage.

In the embodiments of the present disclosure, a distance may be between two guiding holes corresponding to each set of acoustic drivers, and the distance may affect the volume of the near-field sound transmitted by the acoustic output device to the user's ears and the volume of the far-field leakage transmitted by the acoustic output device to the environment. In some embodiments, when the distance between the guiding holes corresponding to a high-frequency acoustic driver is less than the distance between the guiding holes corresponding to a low-frequency acoustic driver, the volume of the hearing sound may be increased and the volume of the leakage sound may be reduced, thereby preventing the sound from being heard by others near the user of the acoustic output device. According to the above descriptions, the acoustic output device may be effectively used as an open binaural earphone even in a relatively quiet environment.

Figure 4:
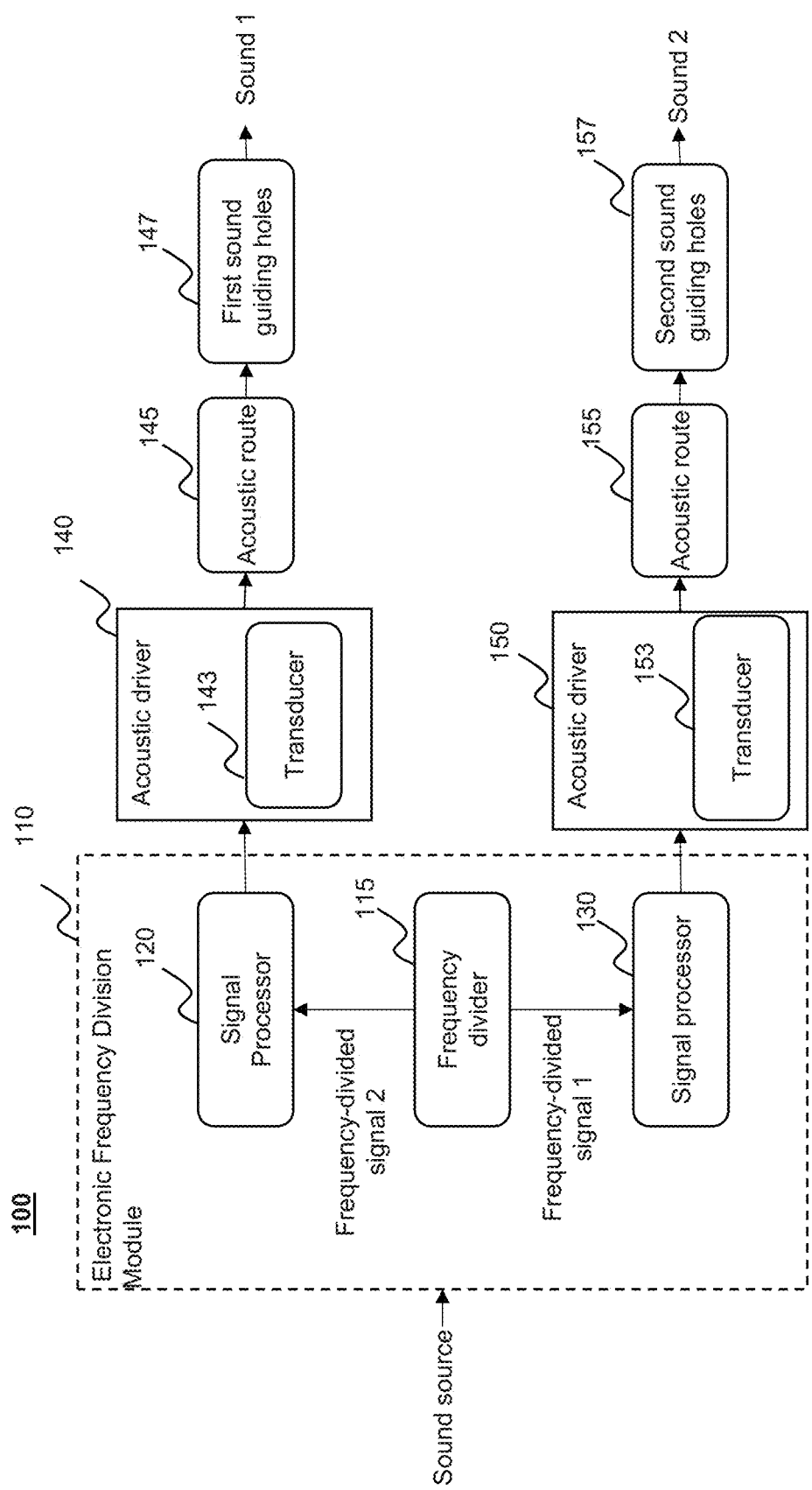
FIG. 4 is a schematic diagram illustrating an exemplary acoustic output device according to some embodiments of the present disclosure e.

FIG. 4 is a schematic diagram illustrating an exemplary acoustic output device according to some embodiments of the present disclosure. As shown in FIG. 4, an acoustic output device 100 may include an electronic frequency division unit 110, an acoustic driver 140, an acoustic driver 150, an acoustic route 145, an acoustic route 155, at least two first sound guiding holes 147, and at least two second sound guiding holes 157. In some embodiments, the acoustic output device 100 may further include a controller (not shown in the figure). The electronic frequency division unit 110, as part of the controller, may be configured to generate electrical signals that are input into different acoustic drivers. The connection between different components in the acoustic output device 100 may be wired or wireless. For example, the electronic frequency division unit 110 may send signals to the acoustic driver 140 and/or the acoustic driver 150 via a wired transmission manner or a wireless transmission manner.

The electronic frequency division unit 110 may divide a frequency of a source signal. The source signal may come from one or more sound source apparatuses (e.g., a memory storing audio data) integrated into the acoustic output device 100. The source signal may also be an audio signal that the acoustic output device 100 received by a wired or wireless means. In some embodiments, the electronic frequency division unit 110 may decompose the input source signal into two or more frequency-divided signals containing different frequencies. For example, the electronic frequency division unit 110 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal. The low-frequency signal may refer to a voice signal with frequencies in a first frequency range. The high-frequency signal may refer to a voice signal with frequencies in a second frequency range.

For the purposes of illustration, a low-frequency signal described in some embodiments of the present disclosure may refer to a voice signal with a frequency in a first frequency range with relatively low frequencies, and a high-frequency signal may refer to a voice signal with a frequency in a second frequency range with a relatively great frequencies. The first frequency range and the second frequency range may include or not include overlapping frequency ranges, and the second frequency range may include frequencies higher than the frequencies in the first frequency range. Merely by way of example, the first frequency range may include frequencies below a first frequency threshold, and the second frequency range may include frequencies above a second frequency threshold. The first frequency threshold may be lower than the second frequency threshold, equal to the second frequency threshold, or higher than the second frequency threshold. For example, the first frequency threshold may be smaller than the second frequency threshold (e.g., the first frequency threshold may be 600 Hz, and the second frequency threshold may be 700 Hz), which may indicate that there is no overlap between the first frequency range and the second frequency range. As another example, the first frequency threshold may be equal to the second frequency (e.g., both the first frequency threshold and the second frequency threshold may be 650 Hz or other frequency values). As yet another example, the first frequency threshold may be greater than the second frequency threshold, which may indicate that there is an overlap between the first frequency range and the second frequency range. In this case, a difference between the first frequency threshold and the second frequency threshold may not exceed a third frequency threshold. The third frequency threshold may be a value, for example, 20 Hz, 50 Hz, 100 Hz, 150 Hz, 200 Hz, etc., or may be a value related to the first frequency threshold and/or the second frequency threshold (e.g., 5%, 10%, 15%, etc., of the first frequency threshold). The third frequency threshold may be a value determined by a user according to the actual needs, which is not limited herein. It should be known that the first frequency threshold and the second frequency threshold may be determined according to different situations, which are limited herein.

In some embodiments, the electronic frequency division unit 110 may include a frequency divider 115, a signal processor 120, and a signal processor 130. The frequency divider 115 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 115 may be an electronic device that may implement the signal decomposition function, including but not limited to one of a passive filter, an active filter, an analog filter, a digital filter, or any combination thereof. In some embodiments, the frequency divider 115 may divide the sound source signal based on one or more frequency division points. A frequency division point refers to a signal frequency that distinguishes the first frequency range from the second frequency range. For example, when the first frequency range and the second frequency range include an overlapping frequency range, the frequency division point may be a feature point within the overlapping frequency range (e.g., a low-frequency boundary point, a high-frequency boundary point, a center frequency point, etc., of the overlapping frequency range). In some embodiments, the frequency division point may be determined according to a relationship (e.g., the curves shown in FIG. 2, FIG. 3A, or 3B) between a frequency and the sound leakage of the acoustic output device. For example, considering that the leakage sound of the acoustic output device may vary with a change of the frequency, a frequency point corresponding to the volume of the leakage sound that meets a certain condition may be selected as the frequency division point, for example, 1000 Hz shown in FIG. 2. More descriptions regarding the change of the leakage sounds with the frequency may be found elsewhere in the present disclosure. See, e.g., FIG. 2 and the relevant descriptions thereof. In some alternative embodiments, a user may directly determine a specific frequency as the frequency division point. For example, considering that the frequency range of sounds that a human ear can hear is 20 Hz-20 kHz, the user may select a frequency point in this range as the frequency division point. Merely by way of example, the frequency division point may be 600 Hz, 800 Hz, 1000 Hz, 1200 Hz, etc. In some embodiments, the frequency division point may be determined according to performance of the acoustic driver. For example, considering that the low-frequency acoustic driver and the high-frequency acoustic driver may have different frequency response curves, the frequency division point may be determined in a frequency range above ½ of an upper limiting frequency of the low-frequency acoustic driver and below 2 times of a low limiting frequency of the high-frequency acoustic driver. As another example, the frequency division point may be determined in a frequency range above ⅓ of the upper limiting frequency of the low-frequency acoustic driver and below 1.5 times of the low limiting frequency of the high-frequency acoustic driver. In some embodiments, in the overlapping frequency range, a position relationship between point sound sources may affect the volume produced by the acoustic output device in the near-field and the far-field. More descriptions regarding the effect of the position relationship between point sound sources on the volume produced by the acoustic output device in the near-field and the far-field may be found in International application No. PCT/CN2019/130886, filed on Dec. 31, 2019, the entire contents of which are hereby incorporated by reference.

The signal processors 120 and 130 may respectively process the frequency-divided signals to meet requirements of subsequent sound output. In some embodiments, the signal processor 120 or 130 may include one or more signal processing units. For example, the signal processor may include, but not limited to, an amplifier, an amplitude modulator, a phase modulator, a delayer, or a dynamic gain controller, or the like, or any combination thereof. Merely by way of example, the processing of the voice signal by the signal processor 120 and/or the signal processor 130 may include adjusting the amplitude corresponding to some frequencies in the voice signal. Specifically, when the first frequency range has an overlapping frequency range with the second frequency range, the signal processors 120 and 130 may adjust an intensity of the voice signal corresponding to the frequency in the overlapping frequency range (e.g., reduce the amplitude of a signal corresponding to a frequency in the overlapping frequency range), thereby avoiding excessive volume in the overlapping frequency range in the subsequent output sound caused by superposition of multiple voice signals.

After the processing operations are performed by the signal processor 120 or the signal processor 130, the frequency-divided signals may be transmitted to the acoustic drivers 140 and 150, respectively. In some embodiments, the voice signal transmitted to the acoustic driver 140 may be a voice signal including a relatively low frequency range (e.g., the first frequency range), and the acoustic driver 140 may also be referred to as a low-frequency acoustic driver. The voice signal transmitted into the acoustic driver 150 may be a voice signal including a relatively high frequency range (e.g., the second frequency range), and the acoustic driver 150 may also be referred to as a high-frequency acoustic driver. The acoustic driver 140 and the acoustic driver 150 may convert the voice signals into a low-frequency sound and a high-frequency sound, respectively, then propagate the converted sound outwards.

In some embodiments, the acoustic driver 140 may be acoustically coupled to at least two first sound guiding holes (e.g., two first sound guiding holes 147) (e.g., connected to the two first sound guiding holes 147 via two acoustic routes 145 respectively). Then the acoustic driver 140 may propagate the sound through the at least two first sound guiding holes. The acoustic driver 150 may be acoustically coupled to at least two second sound guiding holes (e.g., two second sound guiding holes 157) (e.g., connected to the two second sound guiding holes 157 via two acoustic routes 155, respectively). Then the acoustic driver 150 may propagate the sound through the at least two second sound guiding holes. Each of the sound guiding holes (e.g., the at least two first sound guiding holes or the at least two second sound guiding holes) may be a relatively small hole formed on the acoustic output device with a specific opening and allow the sound to pass through. The shape of the sound guiding hole may include but is not limited to a circle shape, an oval shape, a square shape, a trapezoid shape, a rounded quadrilateral shape, a triangle shape, an irregular shape, or the like, or any combination thereof. In addition, a count of the sound guiding holes coupled to the acoustic driver 140 or 150 may be not limited to two, which may be determined based on actual needs, for example, 3, 4, 6, or the like.

In some embodiments, in order to reduce the far-field leakage of the acoustic output device 100, the acoustic driver 140 may be used to generate low-frequency sounds with equal (or approximately equal) amplitude and opposite (or approximately opposite) phases at the at least two first sound guiding holes, respectively. The acoustic driver 150 may be used to generate high-frequency sounds with equal (or approximately equal) amplitude and opposite (or approximately opposite) phases at the at least two second sound guiding holes, respectively. In this way, the far-field leakage of low-frequency sounds (or high-frequency sounds) may be reduced according to the principle of acoustic interference cancellation. In some embodiments, according to FIG. 2, FIG. 3A, and FIG. 3B, further considering that a wavelength of the low-frequency sound is longer than that of the high-frequency sound, and in order to reduce the interference cancellation of the sound in the near-field (e.g., a position of the user's ear), a distance between the two first sound guiding holes and a distance between the two second sound guiding holes may be set to be different values. For example, assuming that there is a first distance between the two first guiding holes and a second distance between the two second guiding holes, the first distance may be longer than the second distance. In some embodiments, the first distance and the second distance may be arbitrary values. Merely by way of example, the first distance may be less than or equal to 40 millimeters, for example, the first distance may be in the range of 20 millimeters-40 millimeters. The second distance may be less than or equal to 12 millimeters, and the first distance may be longer than the second distance. In some embodiments, the first distance may be greater than or equal to 12 millimeters, and the second distance may be less than or equal to 7 mm, for example, in the range of 3 millimeters-7 millimeters. In some embodiments, the first distance may be 30 millimeters, and the second distance may be 5 millimeters. In some embodiments, the first distance may be at least twice of the second distance. In some embodiments, the first distance may be at least 3 times of the second distance. In some embodiments, the first distance may be at least 5 times of the second distance.

As shown in FIG. 4, the acoustic driver 140 may include a transducer 143. The transducer 143 may transmit sound to the first sound guiding holes 147 through the acoustic route 145. The acoustic driver 150 may include a transducer 153. The transducer 153 may transmit sound to the second sound guiding holes 157 through the acoustic route 155. In some embodiments, the transducer (e.g., the transducer 143 or the transducer 153) may include, but not be limited to, a transducer of a gas-conducting acoustic output device, a transducer of a bone-conducting acoustic output device, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (e.g., the low-frequency acoustic driver 140, the high-frequency acoustic driver 150) may include transducers with different properties or numbers. For example, each of the low-frequency acoustic driver 140 and the high-frequency acoustic driver 150 may include a transducer (e.g., a low-frequency speaker unit and a high-frequency speaker unit) having different frequency response characteristics. As another example, the low-frequency acoustic driver 140 may include two transducers (e.g., two low-frequency speaker units), and the high-frequency acoustic driver 150 may include two transducers 153 (e.g., two high-frequency speaker units).

In some alternative embodiments, the acoustic output device 100 may generate sound with different frequency ranges by other means, such as transducer frequency division, acoustic route frequency division, or the like. When the acoustic output device 100 uses a transducer or an acoustic route to divide the sound, the electronic frequency division unit 110 (a part inside the dotted box) may be omitted, and the voice signal may be transmitted to the acoustic driver 140 and the acoustic driver 150.

In some alternative embodiments, the acoustic output device 100 may use a transducer to achieve signal frequency division, the acoustic driver 140 and the acoustic driver 150 may convert the input sound source signal into a low-frequency sound and a high-frequency sound, respectively. Specifically, through the transducer 143 (such as a low-frequency speaker), the low-frequency acoustic driver 140 may convert the voice signal into the low-frequency sound with low-frequency components. In some embodiments, at least two first acoustic routes may be formed between the at least one low-frequency acoustic driver and the at least two first guiding holes. The low-frequency sound may be transmitted to the at least two first sound guiding holes 147 along at least two different acoustic routes (i.e., at least two first acoustic routes). Then the low-frequency sound may be propagated outwards through the first sound guiding holes 147. Through the transducer 153 (such as a high-frequency speaker), the high-frequency acoustic driver 150 may convert the voice signal into the high-frequency sound with high-frequency components. In some embodiments, at least two second acoustic routes may be formed between the at least one high-frequency acoustic driver and the at least two second guiding holes. The high-frequency sound may be transmitted to the at least two second sound guiding holes 157 along at least two different acoustic routes (i.e., the at least two second acoustic routes). Then the high-frequency sound may be propagated outwards through the second sound guiding holes 157. In some embodiments, the at least two first acoustic routes and the at least two second acoustic routes may have different frequency selection characteristics. As used herein, the frequency selection characteristic of an acoustic route refers to that a sound signal with a predetermined frequency range may be passed through the acoustic route. The frequency selection characteristic of an acoustic route may include the predetermined frequency range within which a sound can pass through the acoustic route. For example, a sound with low-frequency components within a first frequency range may be passed through the at least two first acoustic routes and a sound with high-frequency components within a second frequency range may be passed through the at least two second acoustic routes. The first frequency range may include frequencies less than frequencies in the second frequency range. In some embodiments, the first frequency range may include a maximum frequency that is less than or equal to the minimum frequency in the second frequency range. In some embodiments, the first frequency range may include the maximum frequency that exceeds the minimum frequency in the second frequency range and less than the maximum frequency in the second frequency range. In some embodiments, the at least two first acoustic routes may have different frequency selection characteristics. In some embodiments, the at least two first acoustic routes may have the same frequency selection characteristic. In some embodiments, the at least two second acoustic routes may have different frequency selection characteristics. In some embodiments, the at least two second acoustic routes may have the same frequency selection characteristic.

In some alternative embodiments, an acoustic route (e.g., the acoustic route 145 and the acoustic route 155) connecting a transducer and sound guiding holes may affect the nature of the transmitted sound. For example, an acoustic route may attenuate or change a phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route (e.g., at least one of the at least two first acoustic routes, at least one of the at least two second acoustic routes, etc.) may also include an acoustic resistance material, which may have a specific acoustic impedance. For example, the acoustic impedance may be in the range of 5MKS Rayleigh to 500MKS Rayleigh. The acoustic resistance materials may include, but not be limited to, plastic, textile, metal, permeable material, woven material, screen material or mesh material, porous material, particulate material, polymer material, or the like, or any combination thereof. By setting the acoustic routes with different acoustic impedances, the acoustic output of the transducer may be acoustically filtered, such that the sounds output through different acoustic routes may have different frequency components.

In some alternative embodiments, the acoustic output device 100 may utilize acoustic routes to achieve signal frequency division. Specifically, the source signal may be input into a specific acoustic driver and converted into a sound containing high and low-frequency components. The voice signal may be propagated along acoustic routes having different frequency selection characteristics. For example, the voice signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the voice signal may be propagated along the acoustic route with a high-pass characteristic to the corresponding sound guiding hole to generate a high-frequency sound. In this process, the low-frequency sound may be absorbed or attenuated by the acoustic route with the high-pass characteristic.

In some embodiments, the acoustic output device 100 may include a controller (not shown in figure). The controller may cause the low-frequency acoustic driver 140 to output a sound in the first frequency range (i.e., low-frequency sound), and cause the high-frequency acoustic driver 150 to output a sound in the second frequency range (i.e., high-frequency sound). In some embodiments, the acoustic output device 100 may also include a supporting structure. The supporting structure may be used to support the acoustic driver (such as the high-frequency acoustic driver 150, the low-frequency acoustic driver 140, etc.), so that the sound guiding holes corresponding to the acoustic driver is positioned away from the user's ear. In some embodiments, the sound guiding holes (e.g., the at least two second guiding holes) acoustically coupled with the high-frequency acoustic driver 150 may be located closer to an expected position of the user's ear (e.g., the ear canal entrance), while the sound guiding holes (e.g., the at least two first guiding holes) acoustically coupled with the low-frequency acoustic driver 140 may be located further away from the expected position. For example, a distance between the sound guiding holes (e.g., the at least two second guiding holes) acoustically coupled with the high-frequency acoustic driver 150 and the expected position of the user's ear may be less than a first distance threshold, and a distance between the sound guiding holes (e.g., the at least first second guiding holes) acoustically coupled with the low-frequency acoustic driver 140 and the expected position of the user's ear may be greater than a second distance threshold. The first distance threshold and/or the second distance threshold may be determined according to an actual need. The first distance threshold may be less than the second distance threshold. In some embodiments, the supporting structure may be used to package the acoustic driver. The supporting structure of the packaged acoustic driver may be a housing made of various materials such as plastic, metal, tape, etc. The housing may encapsulate the acoustic driver and form a front chamber and a rear chamber corresponding to the acoustic driver. For example, the low-frequency acoustic driver may be encapsulated by a first housing, and the first housing may define a front chamber and a rear chamber of the low-frequency acoustic driver. As another example, the high-frequency acoustic driver may be encapsulated by a second housing, and the second housing may define a front chamber and a rear chamber of the high-frequency acoustic driver. In some embodiments, the second housing may be the same as or different from the first housing. The front chamber may be acoustically coupled to one of the at least two sound guiding holes. The rear chamber may be acoustically coupled to the other of the at least two sound guiding holes. For example, the front chamber of the low-frequency acoustic driver 140 may be acoustically coupled to one of the at least two first sound guiding holes 147. The rear chamber of the low-frequency acoustic driver 140 may be acoustically coupled to the other of the at least two first sound guiding holes 147. The front chamber of the high-frequency acoustic driver 150 may be acoustically coupled to one of the at least two second sound guiding holes 157. The rear chamber of the high-frequency acoustic driver 150 may be acoustically coupled to the other of the at least two second sound guiding holes 157. As used herein, a front chamber of a housing refers to a space (also referred to as a route) between the acoustic driver and one of the at least two sound guiding holes acoustically coupled to the acoustic driver, which is encapsulated by the housing. A rear chamber of the housing refers to a route between the acoustic driver and the other of the at least two sound guiding holes. For example, the front chamber of the low-frequency acoustic driver 140 may be a space between the low-frequency acoustic driver 140 and one of the first sounding guiding holes 147, which is encapsulated by the housing (e.g., the first housing). The rear chamber of the low-frequency acoustic driver 140 may be a space between the low-frequency acoustic driver 140 and the other of the first sounding guiding holes 147, which is encapsulated by the housing (e.g., the first housing). As another example, the front chamber of the high-frequency acoustic driver 150 may be a space between the high-frequency acoustic driver 150 and one of the first sounding guiding holes 157, which is encapsulated by the housing (e.g., the second housing). The rear chamber of the high-frequency acoustic driver 150 may be a space between the high-frequency acoustic driver 150 and the other of the first sounding guiding holes 157, which is encapsulated by the housing (e.g., the second housing). In some embodiments, the sound guiding holes (e.g., the first sound guiding holes 147 and the second sound guiding holes 157) may be disposed on the housing.

The above descriptions of the acoustic output device 100 may be merely some examples. Those skilled in the art may make adjustments and changes to the structure, quantity, etc. of the acoustic driver, which is not limiting in the present disclosure. In some embodiments, the acoustic output device 100 may include any number of the acoustic driver structures. For example, the acoustic output device 100 may include two sets of the high-frequency acoustic drivers 150 and two sets of the low-frequency acoustic drivers 140, or one set of the high-frequency acoustic drives 150 and two sets of the low-frequency acoustic drivers 140, and these high-frequency/low-frequency drivers may be used to generate a sound in a specific frequency range. As another example, the acoustic driver 140 and/or the acoustic driver 150 may include an additional signal processor. The signal processor may have the same or different structural components as the signal processor 120 or the signal processor 130.

It should be noted that the acoustic output device and its modules are shown in FIG. 4 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD, or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e.g., firmware).

It should be noted that the above description of the acoustic output device 100 and its components is only for the convenience of description, and not intended to limit the scope of the present disclosure. It should be understood that, for those skilled in the art, after understanding the principle of the apparatus, it is possible to combine each unit or form a substructure to connect with other units arbitrarily without departing from this principle. For example, the signal processor 120 or the signal processor 130 may be a part independent of the electronic frequency division unit 110. Those modifications may fall within the scope of the present disclosure.

Figure 5:
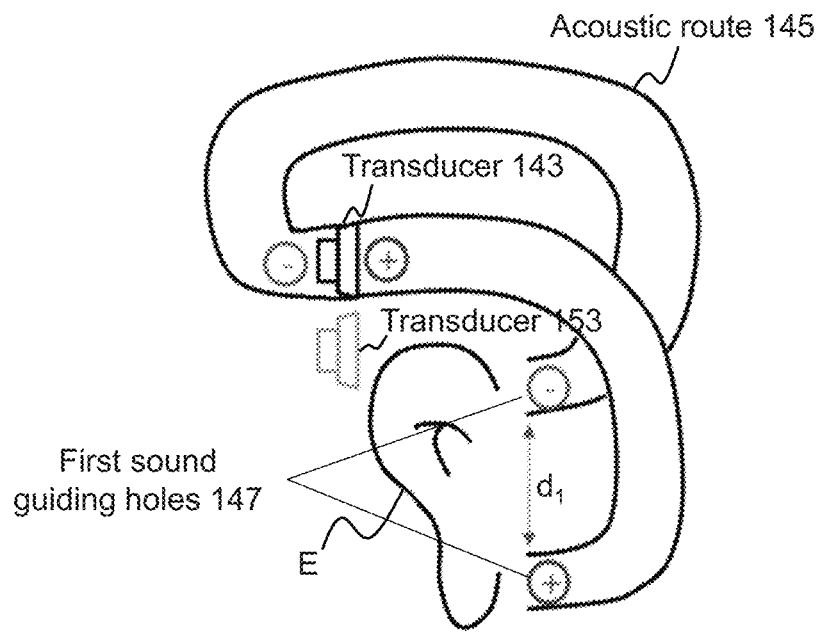
FIG. 5 is a schematic diagram illustrating an exemplary acoustic output device according to some embodiments of the present disclosure.
Figure 5:
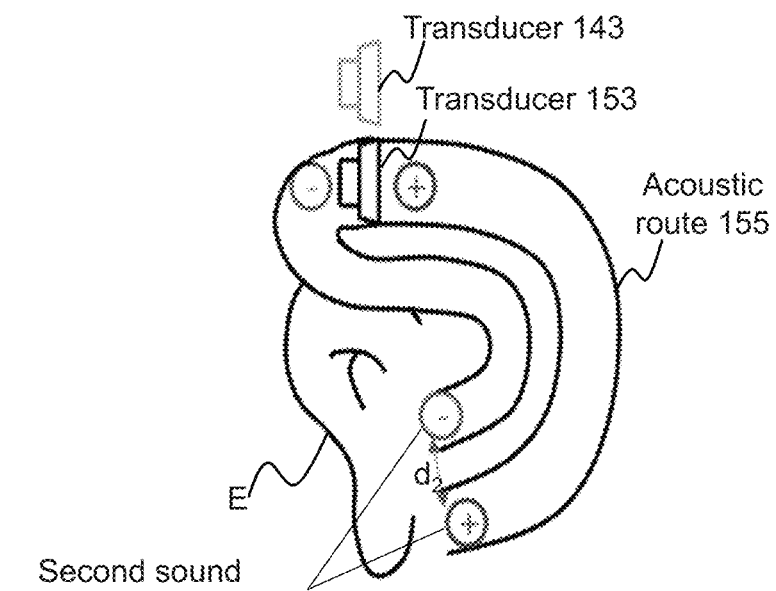

FIG. 5 is a schematic diagram illustrating an exemplary acoustic output device according to some embodiments of the present disclosure. For the purpose of illustration, an outward propagating sound formed by the same transducer coupled with different sound guiding holes may be described as an example. In FIG. 5, each transducer may have a front side and a rear side, and a corresponding front chamber (i.e., a first acoustic route) and a rear chamber (i.e., a second acoustic route) may exist on the front side or the rear side of the transducer, respectively. In some embodiments, the front chamber and the rear chamber may have the same or the substantially same equivalent acoustic impedance, such that the transducers may be loaded symmetrically. The symmetrical load of the transducer may form sound sources satisfy an amplitude and phase relationship at different sound guiding holes (such as the "two point sound sources" having the same amplitude and opposite phases as described above), such that a specific sound field may be formed in high-frequency and/or low-frequency (e.g., a near-field sound may be enhanced and a far-field leakage may be suppressed).

As shown in FIG. 5, the acoustic driver (e.g., the acoustic driver 140 or 150) may include transducers, and acoustic routes and sound guiding holes connected to the transducer. In order to describe the actual application scenarios of the acoustic output device 300 more clearly, a position of the user's ear E may also be shown in FIG. 5 for the explanation. FIG. (a) in FIG. 5 illustrates an application scenario of the acoustic driver 140. The acoustic driver 140 may include a transducer 143, and the transducer 143 may be coupled with two first sound guiding holes 147 through an acoustic route 145. FIG. (b) in FIG. 5 illustrates an application scenario of the acoustic driver 150. The acoustic driver 150 may include a transducer 153, and the transducer 153 may be coupled with two second sound guiding holes 157 through an acoustic route 155.

The transducer 143 or 153 may vibrate under the driving of an electric signal, and the vibration may generate sound with equal amplitudes and opposite phases (180 degrees inversion). The type of transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 143 or 153 may include a vibration diaphragm, which may vibrate when driven by an electrical signal, and the front and rear sides of the vibration diaphragm may simultaneously output a normal-phase sound and a reverse-phase sound. In FIG. 5, "+" and "−" may be used to exemplify sounds with different phases, wherein "+" may represent a normal-phase sound, and "−" may represent a reverse-phase sound.

In some embodiments, the transducer may be encapsulated by a housing (e.g., a supporting structure), and the interior of the housing may be provided with sound channels connected to the front and rear sides of the transducer, respectively, thereby forming an acoustic route. For example, the front cavity of the transducer 143 may be coupled to one of the two first sound guiding holes 147 through a first acoustic route (i.e., the first half of the acoustic route 145), and the rear cavity of the transducer 143 may acoustically be coupled to the other sound guiding hole of the two first sound guiding holes 147 through a second acoustic route (i.e., the second half of the acoustic route 145). Normal-phase sound and reverse-phase sound that output from the transducer 143 may be output from the two first sound guiding holes 147, respectively. As another example, the front cavity of the transducer 153 may be coupled to one of the two sound guiding holes 157 through a third acoustic route (i.e., the first half of the acoustic route 155), and the rear cavity of the transducer 153 may be coupled to another sound guiding hole of the two sound guiding holes 157 through a fourth acoustic route (i.e., the second half of the acoustic route 155). The normal-phase sound and the reverse-phase sound output from the transducer 153 may be output from the two second sound guiding holes 157, respectively.

In some embodiments, acoustic routes may affect the nature of the transmitted sound. For example, an acoustic route may attenuate or change the phase of the transmitted sound to some extent. In some embodiments, the acoustic route may be composed of one of a sound tube, a sound cavity, a resonance cavity, a sound hole, a sound slit, a tuning network, or the like, or any combination of. In some embodiments, the acoustic route may also include an acoustic resistance material, which may have a specific acoustic impedance. For example, the acoustic impedance may be in the range of 5MKS Rayleigh to 500MKS Rayleigh. In some embodiments, the acoustic resistance material may include, but not limited to, one of plastics, textiles, metals, permeable materials, woven materials, screen materials, and mesh materials, or the like, or any combination of. In some embodiments, in order to prevent the sound transmitted by the acoustic driver's front chamber and rear chamber from being disturbed (or the same change caused by disturbance), the front chamber and rear chamber corresponding to the acoustic driver may be set to have approximately the same equivalent acoustic impedance. For example, the same acoustic resistance material, the sound guiding holes with the same size or shape, etc., may be used.

A distance between the two first sound guiding holes 147 of the low-frequency acoustic driver may be expressed as $d_1$ (i.e., a first distance). The distance between the two second sound guiding holes 157 of the high-frequency acoustic driver may be expressed as d2 (i.e., a second distance). By setting the distance between the sound guiding holes corresponding to the low-frequency acoustic driver and the high-frequency acoustic driver, a higher sound volume output in the low-frequency band and a stronger ability to reduce the sound leakage in the high-frequency band may be achieved. For example, the distance between the two first sound guiding holes 147 is greater than the distance between the two second sound guiding holes 157 (i.e., $d_1 > d_2$).

In some embodiments, the transducer 143 and the transducer 153 may be housed together in a housing of an acoustic output device, and be placed in isolation in a structure of the housing.

In some embodiments, the acoustic output device 300 may include multiple sets of high-frequency acoustic drivers and low-frequency acoustic drivers. For example, the acoustic output device 300 may include a group of high-frequency acoustic drivers and a group of low-frequency acoustic drivers for simultaneously outputting sound to the left and/or right ears. As another example, the acoustic output device may include two groups of high-frequency acoustic drivers and two groups of low-frequency acoustic drivers, wherein one group of high-frequency acoustic drivers and one group of low-frequency acoustic drivers may be used to output sound to a user's left ear, and the other set of high-frequency acoustic drivers and low-frequency acoustic drivers may be used to output sound to a user's right ear.

In some embodiments, the high-frequency acoustic driver and the low-frequency acoustic driver may be configured to have different powers. In some embodiments, the low-frequency acoustic driver may be configured to have a first power, the high-frequency acoustic driver may be configured to have a second power, and the first power may be greater than the second power. In some embodiments, the first power and the second power may be arbitrary values.

Figure 6A:
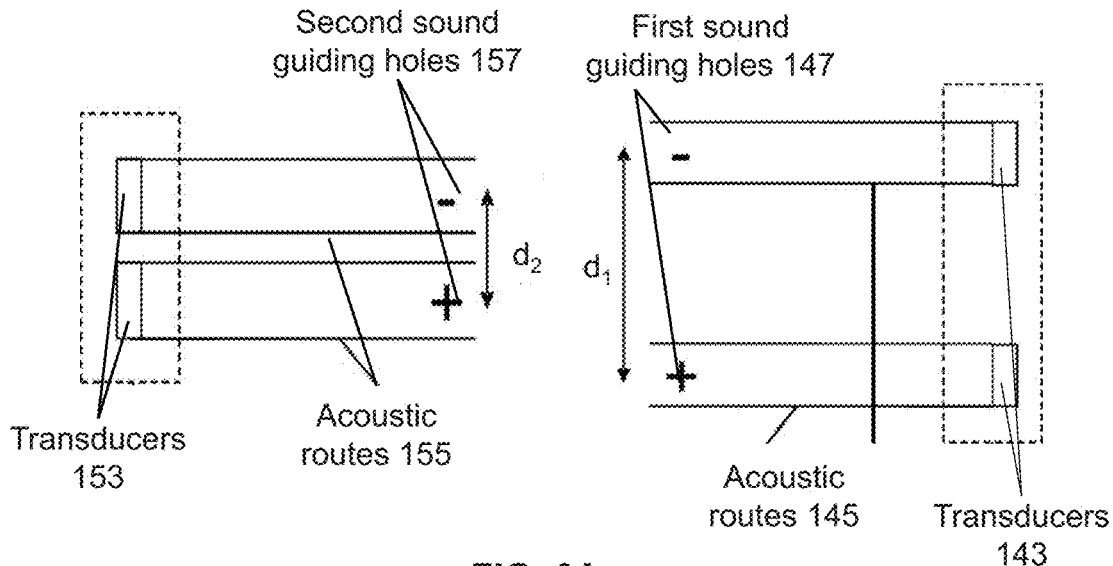
FIG. 6A and FIG. 6B are schematic diagrams illustrating exemplary processes for sound output according to some embodiments of the present disclosure.
Figure 6B:
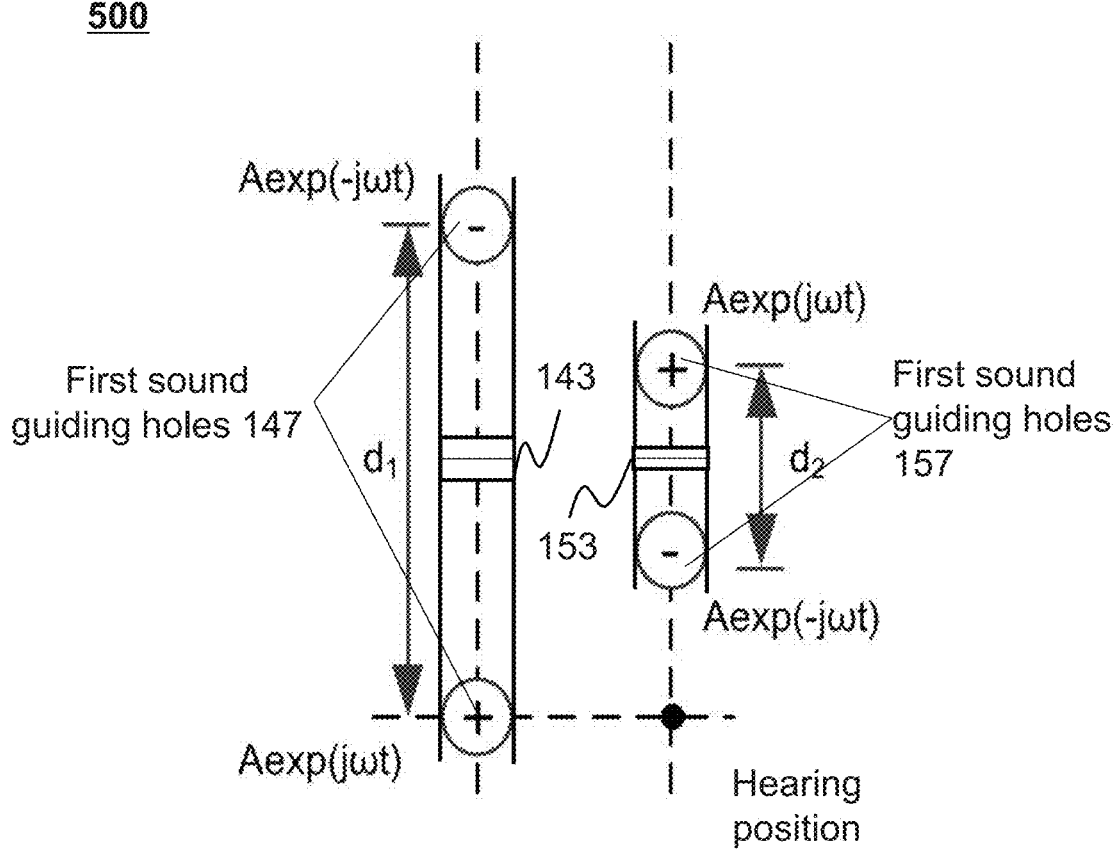

FIG. 6A is a schematic diagram illustrating a process for sound output according to some embodiments of the present disclosure. FIG. 6B is a schematic diagram illustrating another process for sound output according to some embodiments of the present disclosure.

In some embodiments, the acoustic output device may generate sounds in the same frequency range through two or more transducers, and the sounds may propagate outwards through different sound guiding holes. In some embodiments, different transducers may be controlled by the same or different controllers, respectively, and may produce sounds that satisfy certain phase and amplitude conditions (e.g., sounds with the same amplitude but opposite phases, sounds with different amplitudes and opposite phases, etc.). For example, the controller may make the electrical signals input to the two low-frequency transducers of the acoustic driver have the same amplitude and opposite phases. In this way, when a sound is formed, the two low-frequency transducers may output low-frequency sounds with the same amplitude but opposite phases.

Specifically, the two transducers in the acoustic driver (such as the low-frequency acoustic driver 140 and the high-frequency acoustic driver 150) may be arranged side by side in an acoustic output device, one of which may be used to output normal-phase sound, and the other may be used to output reverse-phase sound. As shown in FIG. 6A, the acoustic driver 140 on the right may include two transducers 143, two acoustic routes 145, and two first sound guiding holes 147. The acoustic driver 150 on the left may include two transducers 153, two acoustic routes 155, and two second sound guiding holes 157. Driven by electrical signals with opposite phases, the two transducers 143 may generate a set of low-frequency sounds with opposite phases (180 degrees inversion). One of the two transducers 143 may output normal-phase sound (such as the transducer located below), and the other may output reverse-sound (such as the transducer located above). The two sets of low-frequency sounds with opposite phases may be transmitted to the two first sound guiding holes 147 along the two acoustic routes 145, respectively, and propagate outwards through the two first sound guiding holes 147. Similarly, driven by electrical signals with opposite phases, the two transducers 153 may generate a set of high-frequency sounds with opposite phases (180 degrees inversion). One of the two transducers 153 may output normal-phase high-frequency sound (such as the transducer located below), and the other may output a reverse-phase high-frequency sound (such as the transducer located above). The high-frequency sound with opposite phases may be transmitted to the two second sound guiding holes 157 along the two acoustic routes 155, respectively, and propagate outwards through the two second sound guiding holes 157.

In some embodiments, the two transducers in the acoustic driver (e.g., the low-frequency acoustic driver 140 and the high-frequency acoustic driver 150) may be arranged relatively close to each other along the same straight line, and one of them may be used to output a normal-phase sound and the other may be used to output a reverse-sound. As shown in FIG. 6B, the left side may be the acoustic driver 140, and the right side may be the acoustic driver 150. The two transducers 143 of the acoustic driver 140 may generate a set of low-frequency sounds of equal amplitude and opposite phases under the control of the controller, respectively. One of the transducers may output normal low-frequency sound, and transmit the normal low-frequency sound along a first acoustic route to a first sound guiding hole. The other transducer may output reverse-phase low-frequency sound, and transmit the reverse-phase low-frequency sound along the second acoustic route to another first sound guiding hole. The two transducers 153 of the acoustic driver 150 may generate high-frequency sound of equal amplitude and opposite phases under the control of the controller, respectively. One of the transducers may output normal-phase high-frequency sound, and transmit the normal-phase high-frequency sound along a third acoustic route to a second sound guiding hole. The other transducer may output reverse-phase high-frequency sound, and transmit the reverse-phase high-frequency sound along the fourth acoustic route to another second sound guiding hole.

In some embodiments, the transducer 143 and/or the transducer 153 may be of various suitable types. For example, the transducer 143 and the transducer 153 may be dynamic coil speakers, which may have the characteristics of a high sensitivity in low-frequency, a large dive depth of low-frequency, and a small distortion. As another example, the transducer 143 and the transducer 153 may be moving iron speakers, which may have the characteristics of a small size, a high sensitivity, and a large high-frequency range. As another example, the transducers 143 and 153 may be air-conducted speakers, or bone-conducted speakers. As another example, the transducer 143 and the transducer 153 may be balanced armature speakers. In some embodiments, the transducer 143 and the transducer 153 may be different types of transducers. For example, the transducer 143 may be a moving iron speaker, and the transducer 153 may be a moving coil speaker. As another example, the transducer 1043 may be a moving coil speaker, and the transducer 1053 may be a moving iron speaker.

In FIGS. 6A and 6B, the distance between the two point sound sources of the acoustic driver 140 may be $d_1$, and the distance between the two point sound sources of the acoustic driver 150 may be $d_2$, and $d_1$ may be greater than $d_2$. As shown in FIG. 6B, the hearing position (that is, the position of the ear canal when the user wears an acoustic output device) may be located on a line of a set of two point sound sources. In some alternative embodiments, the hearing position may be any suitable position. For example, the hearing position may be located on a circle centered on the center point of the two point sound sources. As another example, the hearing position may be on the same side of two sets two point sound sources connection, or in the middle of a line connecting the two sets two point sound sources.

It should be understood that the simplified structure of the acoustic output device shown in FIGS. 6A and 6B may be merely by way of example, which may be not a limitation for the present disclosure. In some embodiments, the acoustic output device 400 and/or 500 may include a supporting structure, a controller, a signal processor, or the like, or any combination thereof.

Figure 7A:
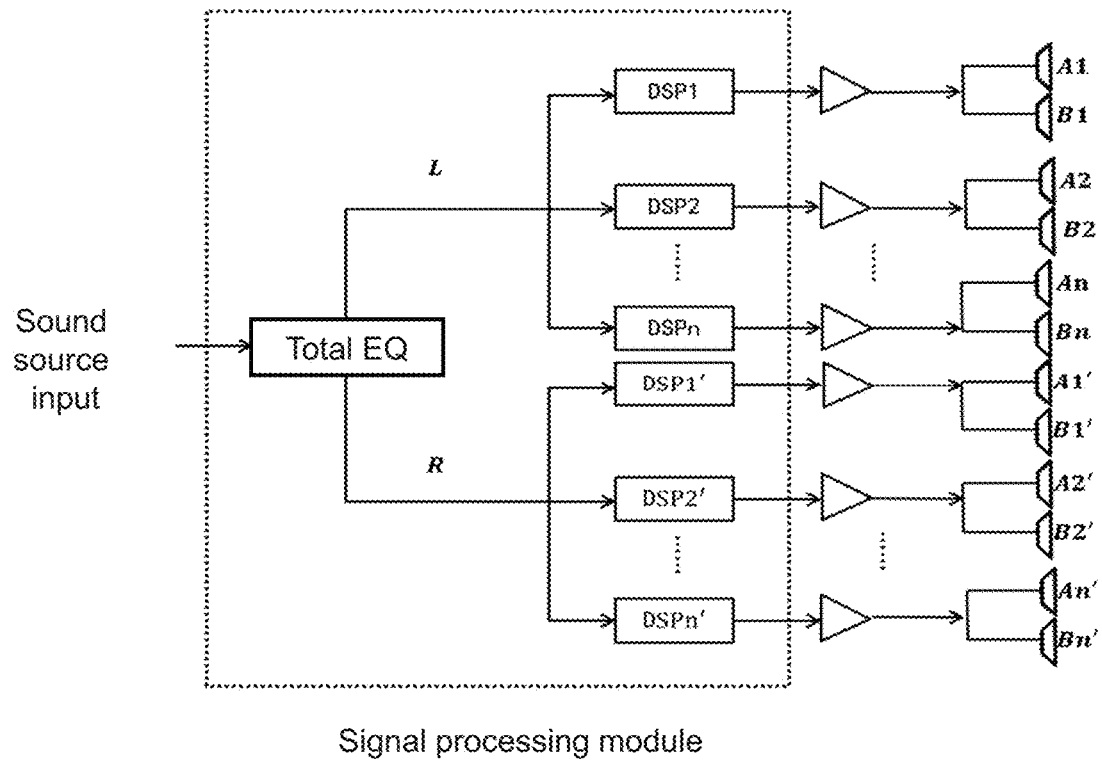
FIG. 7A and FIG. 7B are schematic diagrams illustrating exemplary acoustic output devices according to some embodiments of the present disclosure.
Figure 7B:
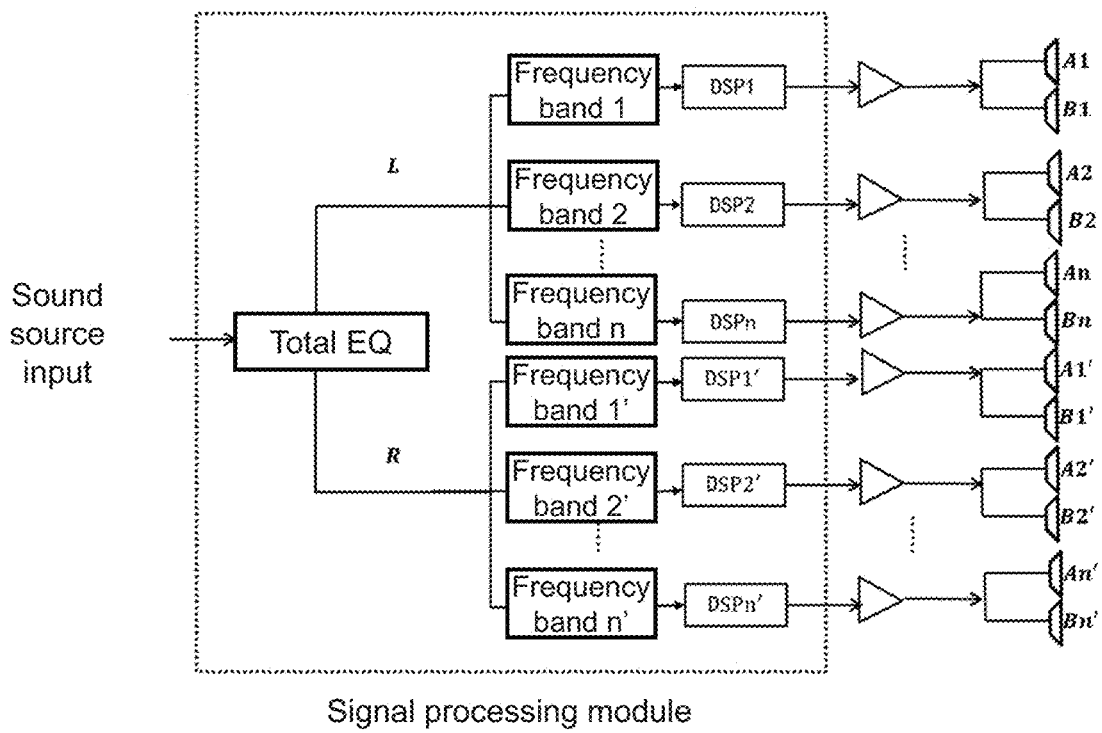

FIG. 7A is a schematic diagram illustrating an acoustic output device according to some embodiments of the present disclosure. FIG. 7B is a schematic diagram illustrating another acoustic output device according to some embodiments of the present disclosure.

In some embodiments, acoustic drivers (e.g., acoustic drivers 140 or 150) may include multiple groups of narrow-band speakers. As shown in FIG. 7A, the acoustic output device may include a plurality of groups of narrow-band speaker units and a signal processing unit. On the left or right side of the user, the acoustic output device may include n groups, respectively, with a total number of 2*n narrow-band speaker units. Each group of narrow-band speaker units may have different frequency response curves, and the frequency response of each group may be complementary and may collectively cover the audible sound frequency band. The narrow-band speaker herein may be an acoustic driver with a narrower frequency response range than the low-frequency acoustic driver and high-frequency acoustic driver. Taking the speaker unit located on the left side of the user shown in FIG. 7A as an example: A1~An and B1~Bn form n groups of two point sound sources, respectively. When the same electrical signal is an input, each two point sound sources may generate sound with different frequency ranges. By setting the distance dn of each two point sound sources, the near-field and far-field sound of each frequency band may be adjusted. For example, in order to enhance the volume of near-field sound and reduce the volume of far-field leakage, the distance between the higher-frequency two point sound sources may be less than the distance of the lower-frequency two point sound sources.

In some embodiments, the signal processing unit may include an Equalizer (EQ) processing unit, and a Digital Signal Processor (DSP) processing unit. The signal processing unit may be used to implement signal equalization and other general digital signal processing algorithms (such as amplitude modulation and equal modulation). The processed signal may output sound by being connected to a corresponding acoustic driver (e.g., a narrow-band speaker) structure. In some embodiments, the narrow-band speaker may be a dynamic moving coil speaker or a moving iron speaker. In some embodiments, the narrow-band speaker may be a balanced armature speaker. Two point sound sources may be constructed using two balanced armature speakers, and the sound output from the two speakers may be in opposite phases.

In some embodiments, the acoustic drivers (such as acoustic drivers 140 or 150) may include multiple groups of full-band speakers. As shown in FIG. 7B, the acoustic output device may include a plurality of sets of full-band speaker units and a signal processing unit. On the left or right side of the user, the acoustic output device may include n groups, respectively, with a total number of 2*n full-band speaker units. Each full-band speaker unit may have the same or similar frequency response curve, and may cover a wide frequency range.

Taking the speaker unit located on the left side of the user as shown in FIG. 7B as an example: A1~An and B1~Bn form n dual-point sound sources, respectively. The difference from FIG. 7A may be that the signal processing unit in FIG. 7B may include at least one set of filters for frequency division of the sound source signal, and the electric signals corresponding to different frequency ranges may be input into each group of full-band speakers. In this way, each group of speaker units (similar to the dual-point sound sources) may produce sounds with different frequency ranges separately.

Figure 8A:
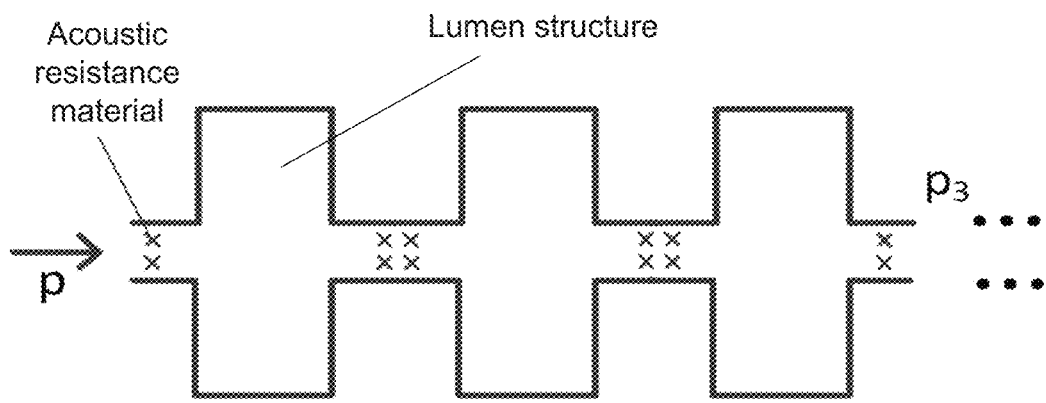
FIGS. 8A-8C are schematic diagrams illustrating exemplary acoustic routes according to some embodiments of the present disclosure.
Figure 8B:
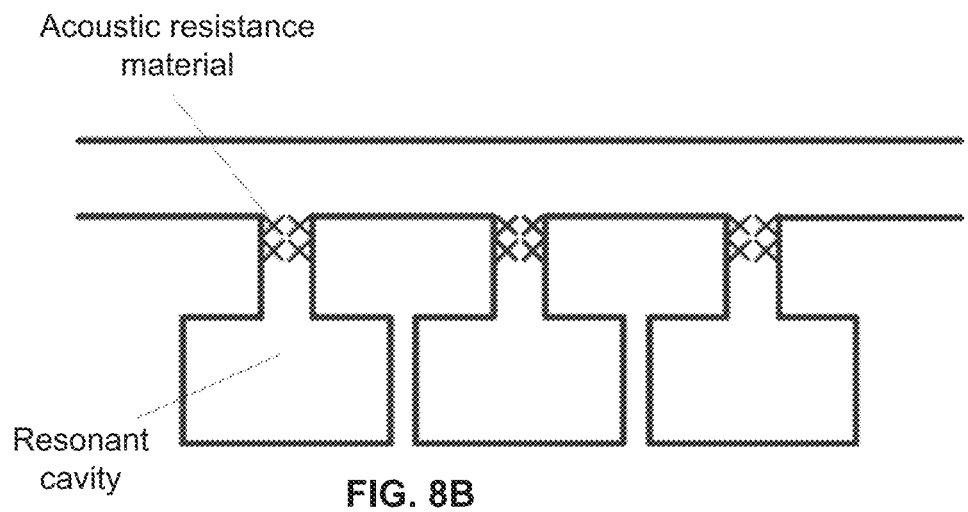
Figure 8C:
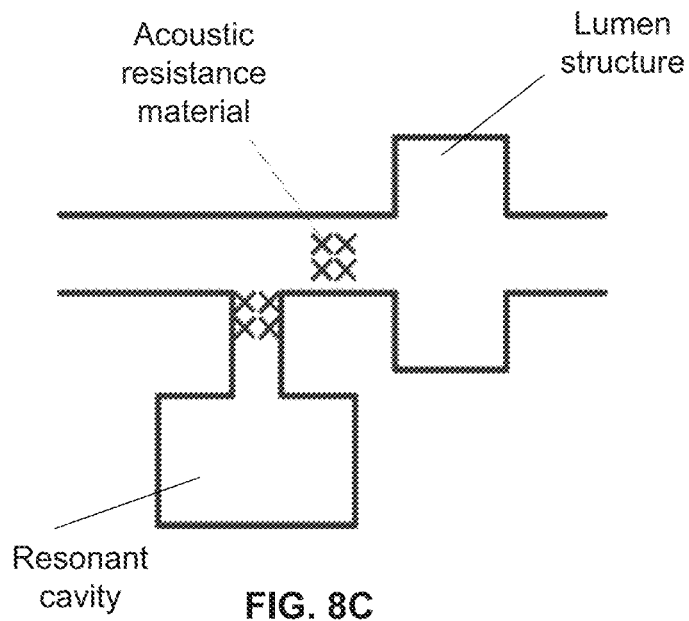

FIG. 8A is a schematic diagram illustrating an acoustic route according to some embodiments of the present disclosure. FIG. 8B is a schematic diagram illustrating another acoustic route according to some embodiments of the present disclosure. FIG. 8C is a schematic diagram illustrating a further acoustic route according to some embodiments of the present disclosure.

As described above, a corresponding acoustic filtering network may be constructed by setting structures such as a sound tube, a sound cavity, and a sound resistance in an acoustic route to achieve frequency division of sound. FIGS. 8A-8C show a schematic structural diagram of frequency division of a voice signal using an acoustic route. It should be noted that FIGS. 8A-8C may be examples of setting the acoustic route when using the acoustic route to divide the voice signal, and may not be a limitation on the present disclosure.

As shown in FIG. 8A, an acoustic route may be composed of one or more groups of lumen structures connected in series, and an acoustic resistance material may be provided in the lumen to adjust the acoustic impedance of the entire structure to achieve a filtering effect. In some embodiments, a band-pass filtering or a low-pass filtering may be performed on the sound by adjusting the size of the structures in the lumen and the acoustic resistance material to achieve frequency division of the sound. As shown in FIG. 8B, a structure with one or more sets of resonant cavities (e.g., Helmholtz cavity) may be constructed on the acoustic route branch, and the filtering effect may be achieved by adjusting the size of each structure and the acoustic resistance material. As shown in FIG. 8C, a combination of a lumen and a resonant cavity (e.g., a Helmholtz cavity) structure may be constructed in an acoustic route, and a filtering effect may be achieved by adjusting the size of each structure and the acoustic resistance material.

Figure 9:
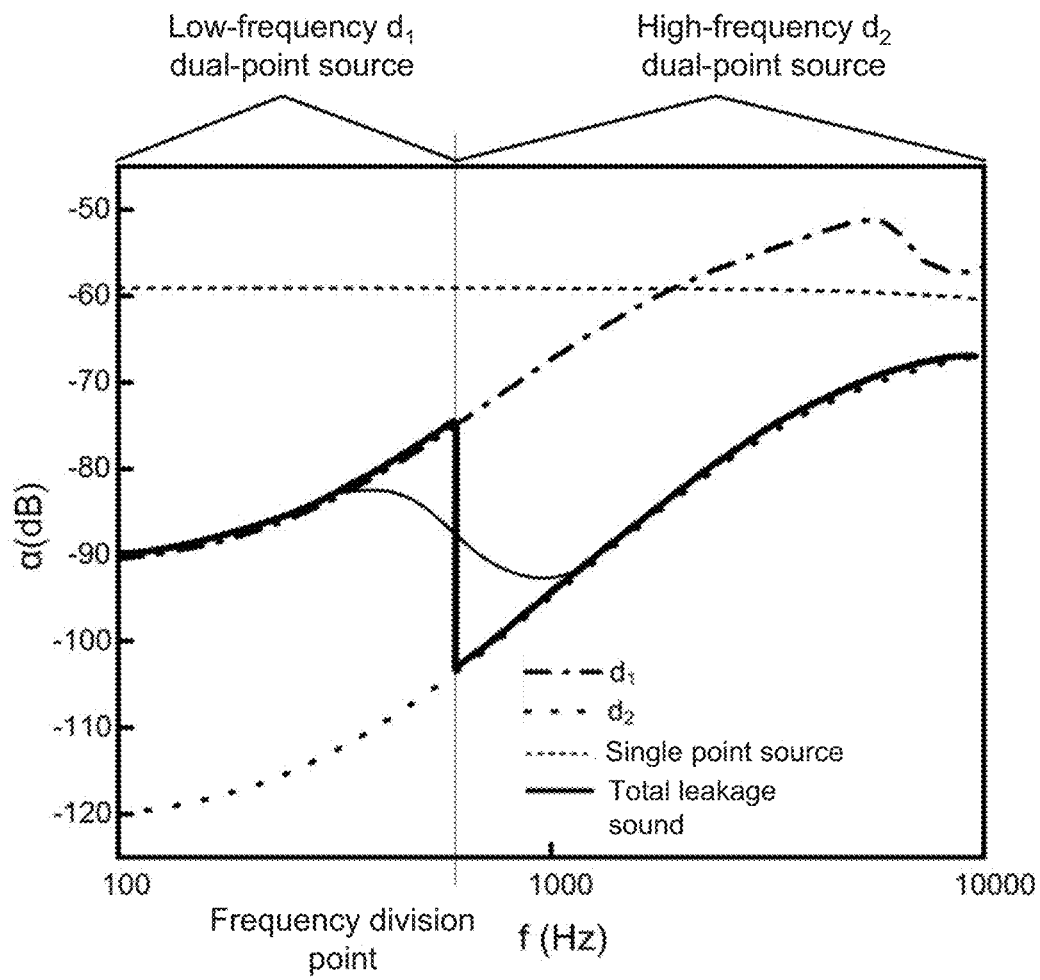
FIG. 9 is an exemplary graph illustrating sound leakage under a combined action of two sets of dual-point sound sources according to some embodiments of the present disclosure.

FIG. 9 is an exemplary graph illustrating sound leakage under a combined action of two sets of dual-point sound sources according to some embodiments of the present disclosure.

FIG. 9 shows a curve of the sound leakage of an acoustic output device (e.g., the acoustic output device 100, the acoustic output device 400, the acoustic output device 500, the acoustic output device 600, etc.) under the combined action of two sets of dual-point sound sources (e.g., a set of high-frequency dual-point sound source and a set of low-frequency dual-point sound source). The frequency division points of the two sets of dual-point sound sources may be around 700 Hz.

A normalization parameter α may be used to evaluate the volume of the leakage sound (for calculation of α, see Equation (4)). As shown in FIG. 9, compared with the case of a single point sound source, the dual-point sound source may have a relatively strong ability to reduce sound leakage. In addition, compared with the acoustic output device provided with only one set of dual-point sound source, the two sets of dual-point sound sources may output high-frequency sounds and low-frequency sounds, separately. A distance between the low-frequency dual-point sound source may be greater than that of the high-frequency dual-point sound source. In the low-frequency range, by setting a larger distance ($d_1$) between two point sound sources of a dual-point sound source, increment of the volume of the near-field sound may be greater than increment of the volume of the far-field leakage and may achieve a higher volume of the near-field sound output in the low-frequency band. At the same time, in the low-frequency range, the sound leakage of the dual-point sound source may originally be relatively small. After the distance between the two point sound sources is increased, the slightly increased sound leakage may still maintain a low level. In the high-frequency range, by setting a relatively small distance ($d_2$) between the two point sound sources of the dual-point sound source, the problems of the cutoff frequency of high-frequency sound leakage reduction being too low and the audio band of the sound leakage reduction being too narrow may be overcome. By setting the distance $d_1$ between the two point sound sources of the dual-point sound source in the low-frequency band and the distance $d_2$ between the two point sound sources of the dual-point sound source in the high-frequency band, the acoustic output device provided in the embodiments of the present disclosure may obtain a stronger sound leakage suppressing capability than a single point sound source and a set of dual-point sound source.

In some embodiments, affected by factors such as the filter characteristics of the actual circuit, the frequency characteristics of the transducer, and the frequency characteristics of the acoustic channel, the actual low-frequency and high-frequency sounds of the acoustic output device may differ from those shown in FIG. 9. In addition, low-frequency and high-frequency sounds may have a certain crossover (aliasing) in the frequency band near the frequency division point, causing the total sound leakage reduction of the acoustic output device not to have a mutation at the frequency division point as shown in FIG. 9. Instead, there may be gradients and transitions in the frequency band near the frequency division point, as shown in the thin solid line in FIG. 9. It should be understood that these differences may not affect the overall leakage reduction effect of the acoustic output device provided by the embodiment of the present disclosure.

According to FIG. 4 to FIG. 9 and the related descriptions, the acoustic output device provided by the present disclosure may be used to output sounds in different frequency bands by setting at least one high-frequency dual-point sound source and at least one low-frequency dual-point sound source, so as to achieve a better sound output effect. In addition, by setting different sets of dual-point sound sources with different distances, the acoustic output device may have a relatively stronger capability to reduce the sound leakage in a high frequency band and meet the requirements of an open acoustic output device.

In another aspect of the present disclosure, another acoustic output device may be provided. The acoustic output device may include at least one set of acoustic drivers, and the sound generated by the at least one set of acoustic drivers may propagate outwards through at least two guiding holes acoustically coupled with the at least one set of acoustic drivers. In some embodiments, the acoustic output device may include a baffle, and the at least two guiding holes may be distributed on both sides of the baffle, respectively. In some embodiments, the at least two guiding holes may be distributed on both sides of the user's auricle. In this case, the auricle may serve as a baffle to separate the at least two guiding holes, and the at least two guiding holes may have different acoustic routes to the user's ear canal. More descriptions regarding the dual-point sound source and the baffle may be found in International applications No. PCT/CN2019/130921 and No. PCT/CN2019/130942, both filed on Dec. 31, 2019, the entire contents of each of which are hereby incorporated by reference.

Figure 10:
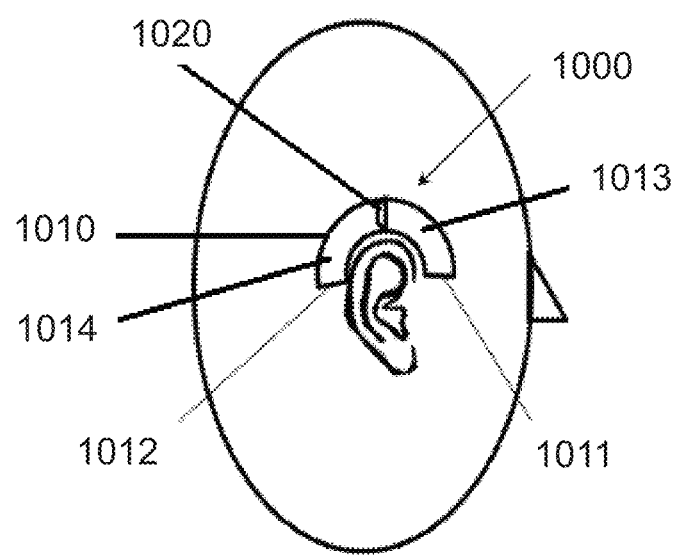
FIG. 10 is a schematic diagram illustrating an exemplary acoustic output device according to some embodiments of the present disclosure.

FIG. 10 is a schematic diagram illustrating an exemplary acoustic output device according to some embodiments of the present disclosure. As shown in FIG. 10, an acoustic output device 1000 may include a supporting structure 1010 and an acoustic driver 1020, which may be disposed in the supporting structure 1010. In some embodiments, the acoustic output device 1000 may be worn on a user's body (e.g., the head, the neck, the upper torso, etc. of the user) e.g., through the supporting structure 1010. The supporting structure 1010 and the acoustic driver 1020 may be close to and not block an ear canal of the user. The ear of the user may be in an open state. The user may hear a sound output from the acoustic output device 1000 and a sound from an external source. For example, the acoustic output device 1000 may be arranged around or partially around the user's ear and may transmit the sound via an air conduction manner or a bone conduction manner.

The supporting structure 1010 may be configured to support one or more acoustic drivers 1020. In some embodiments, the supporting structure 1010 may include an enclosed shell structure with an internal hollow, and the one or more acoustic drivers 1020 may be disposed in the supporting structure 1010. In some embodiments, the acoustic output device 1000 may be combined with a product such as a pair of audio glasses, a headset, a display device, an AR/VR helmet, etc. In this case, the supporting structure 1010 may be fixed near the user's ear via a hanging manner or a clamping manner. In some embodiments, the supporting structure 1010 may include a hook, a shape of the hook may be matched the shape of the auricle, and the acoustic output device 1000 may be worn on the user's ear through the hook, independently. The acoustic output device 1000, which is worn on the user's ear independently may be communicated with a signal source (e.g., a computer, a mobile phone, or other mobile devices) in a wired or wireless manner (e.g., Bluetooth). For example, the acoustic output device 1000 worn on the left ear and/or that worn on the right ear may be directly communicated with the signal source via a wireless manner. As another example, the acoustic output device 1000 worn at the left and/or right ear may include a first output part and a second output part. The first output part may be communicated with the signal source, and the second output part may be connected to the first output part via a wireless manner. The sound may be output synchronously by the first output part and the second output part controlled by one or more synchronization signals. The wireless manner may include but not limited to Bluetooth, a local area network, a wide area network, a wireless personal area network, a near-field communication, or the like, or any combination thereof.

In some embodiments, the supporting structure 1010 may include a shell structure, and a shape of the supporting structure 1010 may be matched a shape of the ear of the user. The shape of the supporting structure 1010 may include a circular ring, an oval, a (regular or irregular) polygonal, a U-shape, a V-shape, a semi-circle, etc., and the supporting structure 1010 may be directly anchored at the user's ear. In some embodiments, the supporting structure 1010 may also include one or more fixed parts. The fixed part may include an ear hook, a head beam, an elastic band, or the like, or any combination thereof, which may be used to fix the acoustic output device 1000 on the user and prevent the acoustic output device 1000 from falling. Merely byway of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 1000 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc.), and the rigid portion may be fixed to the supporting structure 1010 of the acoustic output device 1000 via a physical connection (e.g., a snap connection, a screw connection, etc.). The flexible portion may be made of an elastic material (e.g., a cloth, a composite material, a neoprene, etc.).

In some embodiments, when the user wears the acoustic output device 1000, the supporting structure 1010 may be placed above or below the auricle. The supporting structure 1010 may also include a sound guiding hole 1011 and a sound guiding hole 1012, which may be configured to transmit sounds. In some embodiments, the sound guiding hole 1011 and the sound guiding hole 1012 may be placed on two sides of the user's auricle, respectively. The acoustic driver 1020 may output sound(s) through the sound guiding hole 1011 and/or the sound guiding hole 1012.

The acoustic driver 1020 may be configured to receive an electrical signal, and convert the electrical signal into a voice signal which may be output. In some embodiments, a type of the acoustic driver 1020 may include an acoustic driver with a low-frequency, an acoustic driver with a high-frequency, an acoustic driver with a full-frequency, or the like, or any combination thereof, according to the frequency of the acoustic driver 1020. In some embodiments, the acoustic driver 120 may include a moving coil acoustic driver, a moving iron acoustic driver, a piezoelectric acoustic driver, an electrostatic acoustic driver, a magnetostrictive acoustic driver according to a principle of the acoustic driver 1020.

In some embodiments, the acoustic driver 1020 may include a vibration diaphragm. When the vibration diaphragm vibrates, sounds may be transmitted from a front side and a rear side of the vibration diaphragm, respectively. In some embodiments, a front chamber 1013 may be disposed on the front side of the vibration diaphragm in the supporting structure 1010, which may be configured to transmit the sound(s). The front chamber 1013 may be acoustically coupled with the sound guiding hole 1011. The sound transmitted from the front side of the vibration diaphragm may be transmitted from the sound guiding hole 1011 through the front chamber 1013. A rear chamber 1014 may be disposed on the rear side of the vibration diaphragm in the supporting structure 1010, which may be configured to transmit the sound(s). The rear chamber 1014 may be acoustically coupled with the sound guiding hole 1012. The sound transmitted from the rear side of the vibration diaphragm may be transmitted from the sound guiding hole 1012 through the rear chamber 1014. It should be noted that, when the vibration diaphragm vibrates, the front side and the rear side of the vibration diaphragm may simultaneously generate sounds with opposite phases. After passing through the front chamber 1013 and rear chamber 1014, respectively, the sounds may be transmitted outward from the sound guiding hole 1011 and the sound guiding hole 1012. In some embodiments, the sounds output by the acoustic driver 1020, which may be transmitted through the sound guiding hole 1011 and the sound guiding hole 1012 may meet the specific requirement by setting a structure of at least one of the front chamber 1013 and the rear chamber 1014. For example, the sound guiding hole 1011 and the sound guiding hole 1012 may transmit a set of sounds with a specific phase relationship (e.g., opposite phases) by designing a length of at least one of the front chamber 1013 and the rear chamber 1014, thereby increasing a volume in the near-field of the acoustic output device 1000, avoiding sound leakage of the acoustic output device 1000, and effectively improving the performance of the acoustic output device 1000. As used herein, a length of a front chamber refers to a length of a route between the vibration diaphragm to a guiding hole coupled with the front chamber when a sound (i.e., vibration) propagates from the vibration diaphragm to the guiding hole along the route, and a length of a rear chamber refers to a length of a route between the vibration diaphragm to a guiding hole coupled with the rear chamber when a sound (i.e., vibration) propagates from the vibration diaphragm to the guiding hole along the route.

In some alternative embodiments, the acoustic driver 1020 may include a plurality of vibration diaphragms (e.g., two vibration diaphragms). The plurality of vibration diaphragms may vibrate to generate sounds, respectively. Each of the sounds may be transmitted pass through a chamber that is connected to one of the vibration diaphragms in the supporting structure and may be output from a corresponding sound guiding hole. The plurality of vibration diaphragms may be controlled by the same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

As mentioned above (e.g., FIG. 3A, 3B and the related descriptions thereof), when a sound frequency is constant, as the distance between two point sound sources of the dual-point sound source increases, the volume of the hearing sound and the volume of the leakage sound corresponding to the dual-point sound source may increase. For a clearer description, the relationship between the volume of the hearing sound, the volume of the leakage sound, and the distance d of the two point sound sources may be further explained according to FIG. 11 to FIG. 13.

Figure 11:
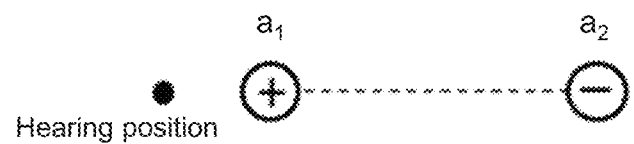
FIG. 11 is a schematic diagram illustrating two point sound sources and a hearing position according to some embodiments of the present disclosure.

FIG. 11 is a schematic diagram illustrating two point sound sources and a hearing position according to some embodiments of the present disclosure. As shown in FIG. 11, a point sound source $a_1$ and a point sound source $a_2$ may be disposed on the same side of the hearing position, and the point sound source $a_1$ may be closer to the hearing position. The point sound source $a_1$ and the point sound source $a_2$ may output sounds with the same amplitude and opposite phases.

Figure 12:
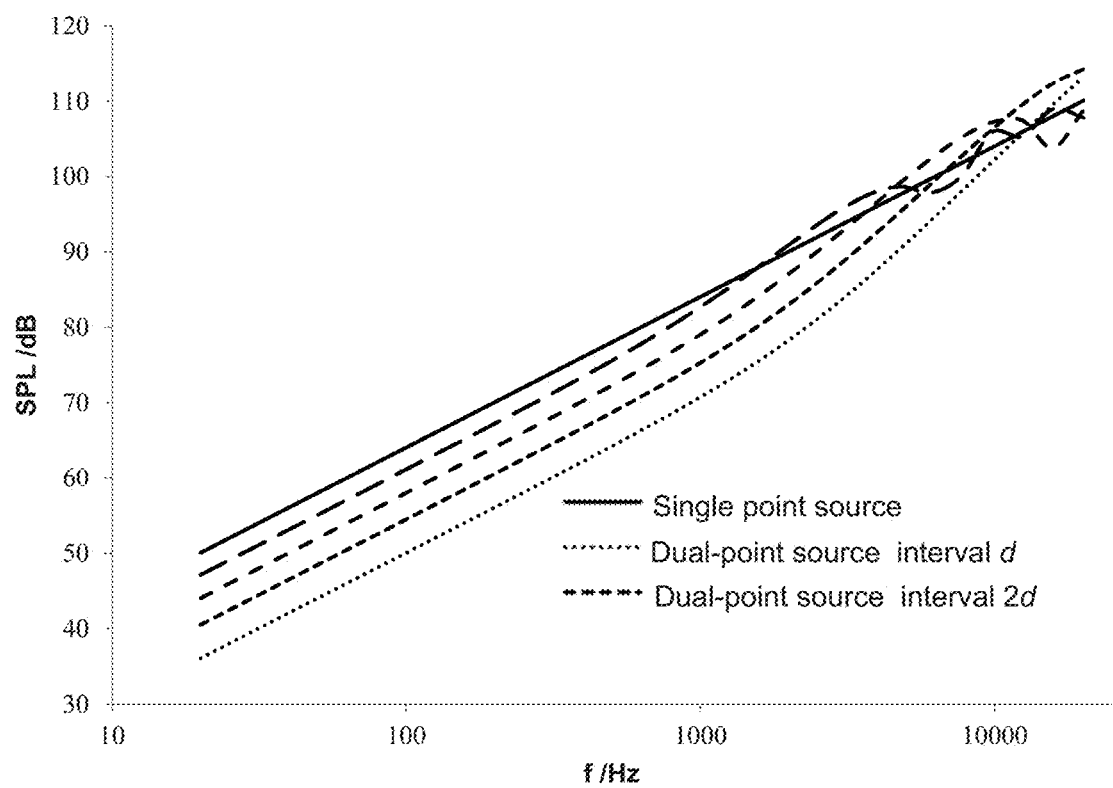
FIG. 12 is a graph illustrating a change of a volume of a hearing sound of a dual-point sound source with different distances along with a frequency according to some embodiments of the present disclosure.

FIG. 12 is a graph illustrating a change of a volume of a hearing sound of a dual-point sound source with different distances along with a frequency according to some embodiments of the present disclosure. The abscissa represents the frequency (f) of the sound output by the dual-point sound source, and the unit may be hertz (Hz). The ordinate represents the volume of the sound, and the unit may be decibel (dB). As shown in FIG. 12, as the distance between the point sound source $a_1$ and the point sound source $a_2$ gradually increases (e.g., from d to 10d), the sound volume at the hearing position may be gradually increased. As the distance between the point sound source $a_1$ and the point sound source $a_2$ increases, a difference between sound pressure amplitudes (i.e., sound pressure difference) of the two sounds reaching the hearing position may be increased, and a difference of acoustic routes may be increased, thereby reducing the sound cancellation and increasing the sound volume at the hearing position. Due to the existence of the sound cancellation, the sound volume at the hearing position may be less than that generated by a single-point sound source with the same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume at the hearing position generated by the two-point sound sources may be greater than a sound volume at the hearing position generated by the single-point sound source. As used herein, the sound pressure amplitude (i.e., a sound pressure) refers to a pressure generated by the sound through the vibration of the air.

Figure 13:
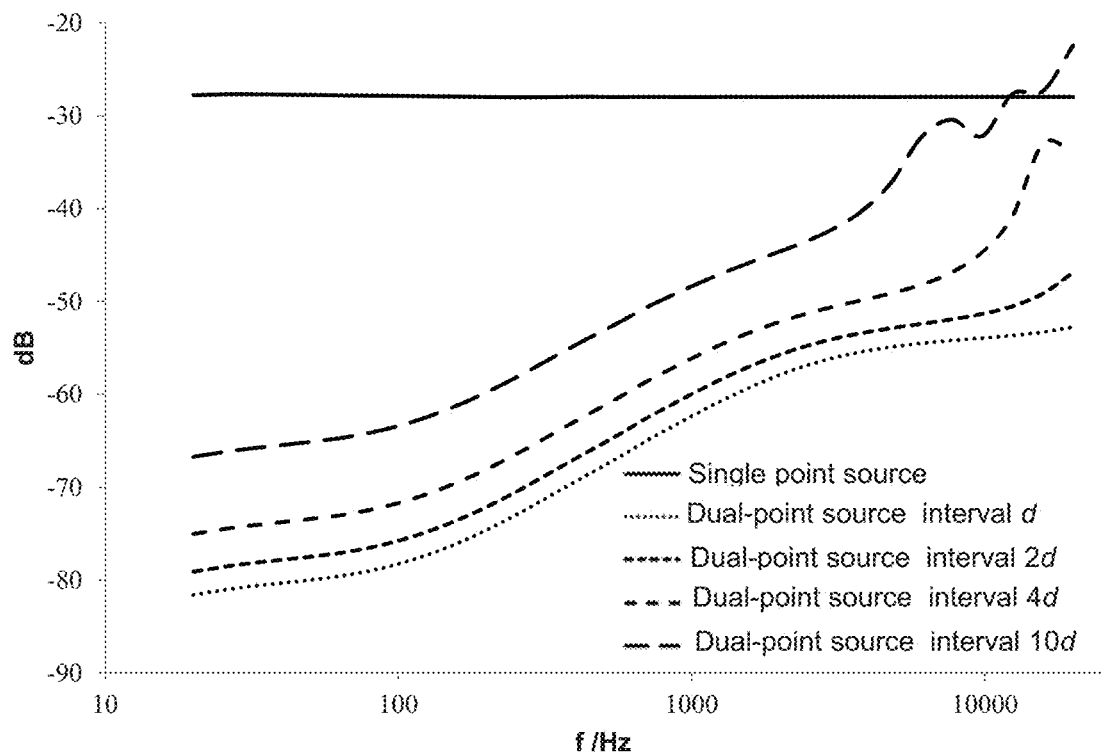
FIG. 13 is a graph illustrating a change of a normalized parameter of a dual-point sound source in a far-field along with a frequency according to some embodiments of the present disclosure.

In some embodiments, the sound volume at the hearing position may be increased by increasing the distance between the point sound sources (e.g., the point sound source $a_1$ and the point sound source $a_2$) of the dual-point sound source. As the distance increases, the sound cancellation of the dual-point sound source may be weakened, thereby increasing sound leakage in the far-field. For illustration purposes, FIG. 13 is a graph illustrating a change of a normalized parameter of a dual-point sound source in a far-field along with a frequency according to some embodiments of the present disclosure. The abscissa may represent the frequency (f) of the sound, the unit may be Hertz (Hz), the ordinate may use a normalized parameter α for evaluating the volume of the leakage sound, and the unit may be decibel (dB). As shown in FIG. 13, taking the far-field normalized parameter a of a single point sound source as a reference, as the distance between two point sound sources of the dual-point sound source increases from d to 10d, the far-field normalized parameter α may gradually increase, indicating the sound leakage may gradually increase. More descriptions regarding the normalized parameter α may be found in Equation (4) and related descriptions.

Figure 14:
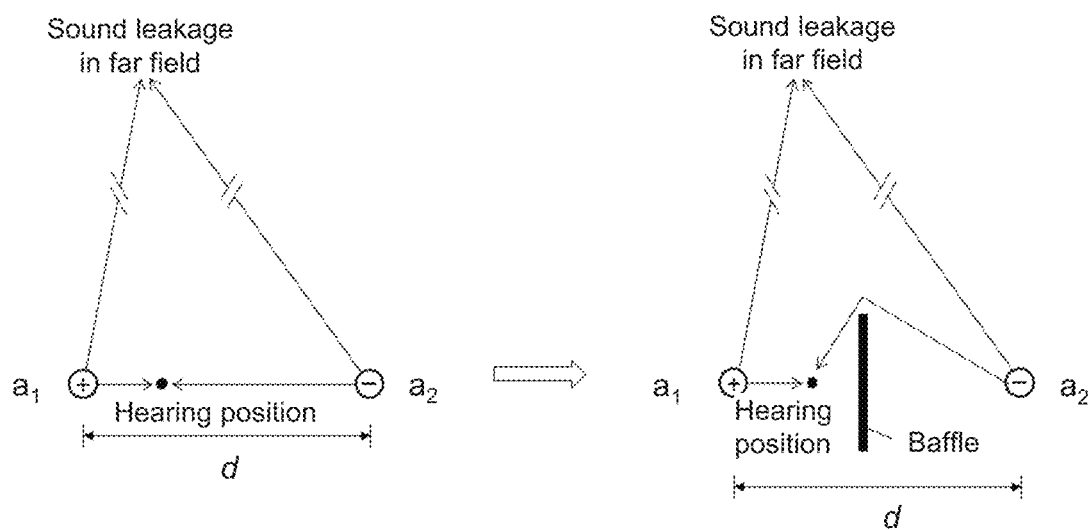
FIG. 14 is a schematic diagram illustrating an exemplary baffle disposed between two point sound sources of a dual-point sound source according to some embodiments of the present disclosure.

In some embodiments, adding a baffle to the acoustic output device may be beneficial to improve the output effect of the acoustic output device, for example, increase the sound intensity of the hearing position in the near-field and reduce the sound leakage in the far-field. For illustration purposes, FIG. 14 is a schematic diagram illustrating an exemplary baffle disposed between two point sound sources of a dual-point sound source according to some embodiments of the present disclosure. As shown in FIG. 14, when the baffle is disposed between a point sound source $a_1$ and a point sound source $a_2$, a sound field of the point sound source $a_2$ may bypass the baffle to interfere with a sound wave of the point sound source $a_1$ at a hearing position in the near-field, which may increase a length of an acoustic route between the point sound source $a_2$ and the hearing position. Assuming that the point sound source $a_1$ and the point sound source $a_2$ have the same amplitude, an amplitude difference between the sound waves of the point sound source $a_1$ and that of the point sound source $a_2$ at the hearing position may be greater than that in a case without a baffle, thereby reducing a sound cancellation of the two sounds at the hearing position, increasing a sound volume at the hearing position. In the far-field, the sound waves generated by the point sound source $a_1$ and the point sound source $a_2$ may not bypass the baffle in a relatively large space, the sound waves may be interfered (as a case without the baffle). Compared to the case without the baffle, the sound leakage in the far-field may be not increased significantly. Therefore, the baffle being disposed between the point sound source $a_1$ and the point sound source $a_2$ may significantly increase the sound volume at the hearing position in the near-field and not significantly increase that of the leakage sound in the far-field.

Figure 15:
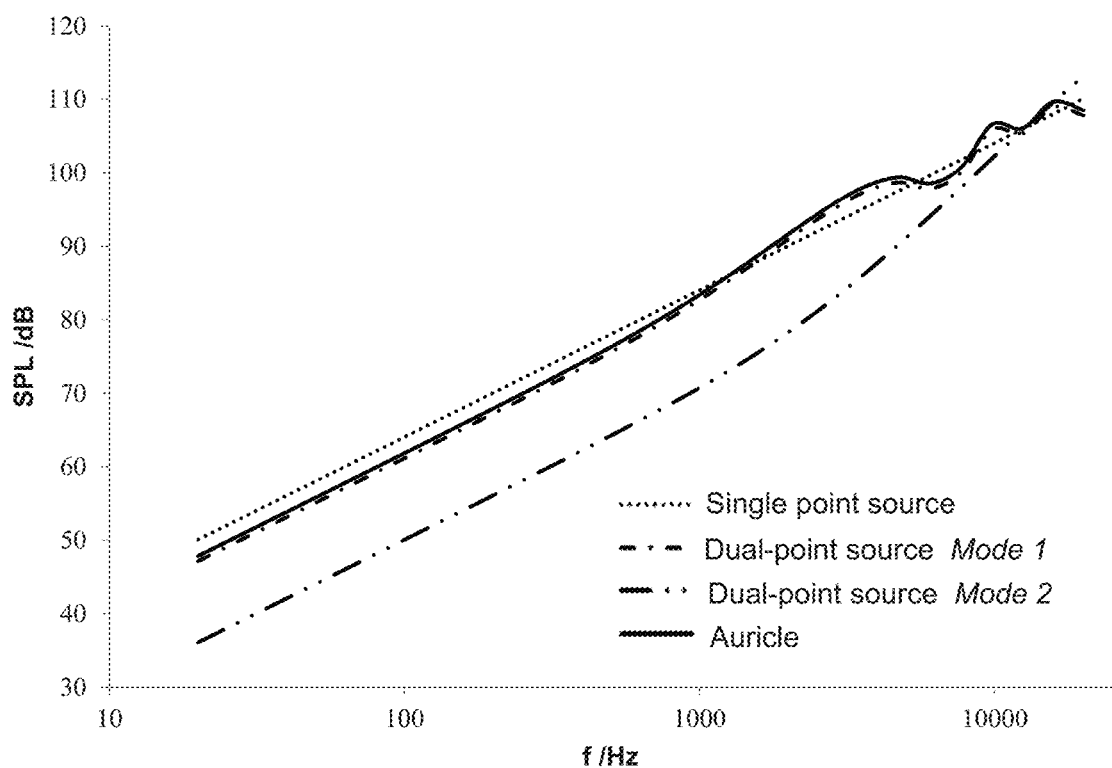
FIG. 15 is a graph illustrating a change of a volume of a hearing sound along with a frequency when an auricle is arranged between two point sound sources of a dual-point sound source according to some embodiments of the present disclosure.
Figure 16:
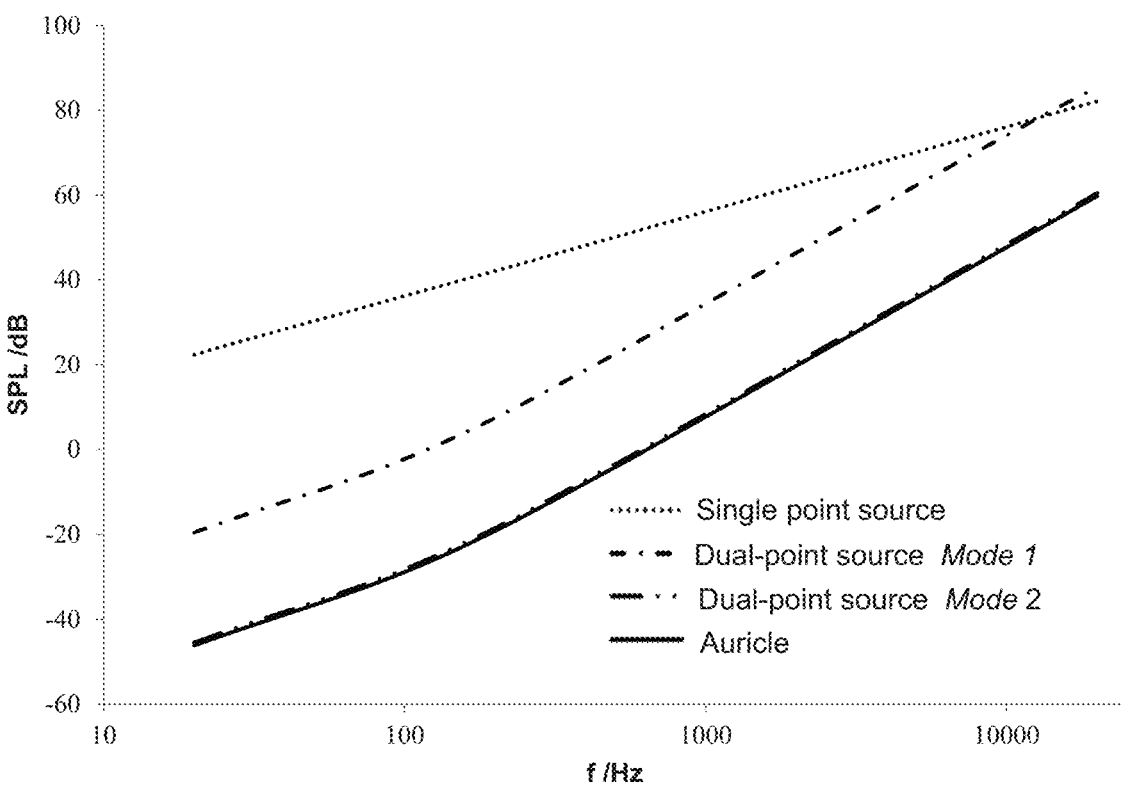
FIG. 16 is a graph illustrating a change of a volume of a leakage sound along with a frequency when an auricle is arranged between two point sound sources of a dual-point sound source according to some embodiments of the present disclosure.
Figure 17:
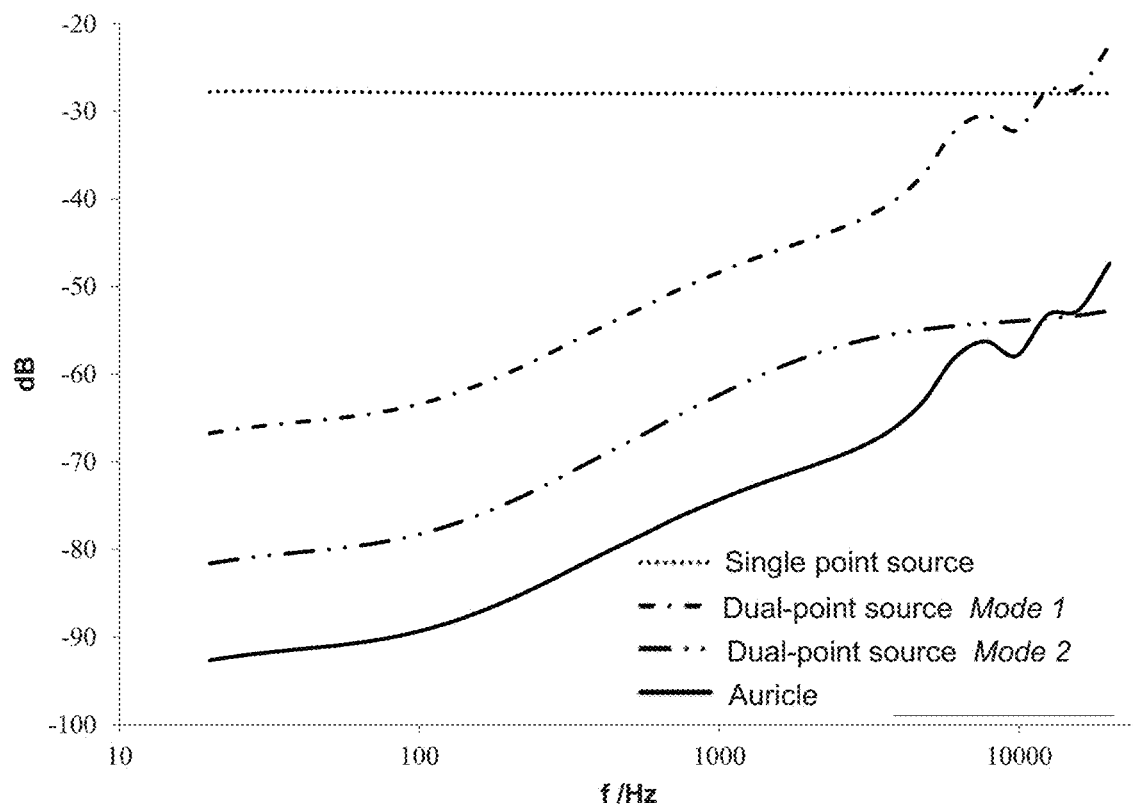
FIG. 17 is a graph illustrating a change of a normalized parameter along with a frequency when two point sound sources of a dual-point sound source of an acoustic output device are disposed on two sides of an auricle according to some embodiments of the present disclosure.

In the present disclosure, when the two point sound sources of the dual-point sound source are arranged on both sides of the auricle, the auricle may serve as a baffle, thus the auricle may also be referred to as a baffle for convenience. Merely by way of example, due to the existence of the auricle, a sound in the near-field may be generated by the dual-point sound source with a distance D1 (also referred to as Mode 1). A sound in the far-field may be generated by the dual-point sound source with a distance D2 (also referred to as Mode 2), and D1>D2. FIG. 15 is a graph illustrating a change of a volume of a hearing sound along with a frequency when a user's auricle is arranged between two point sound sources of a dual-point sound source according to some embodiments of the present disclosure. As shown in FIG. 15, for a low-frequency (e.g., a frequency less than 1000 Hz), a volume of the sound in the near-field (i.e., a sound heard by an ear of a user) may be the same as or similar to that in Mode 1 when the dual-point sound source are located on two sides of the auricle, which may be greater than a volume of a sound in the near-field in Mode 2 and may be close to a volume of a sound in a near-field of a single-point sound source. As the frequency increases (e.g., 2000 Hz~7000 Hz), the volume of the sound in the near-field in Mode 1 and generated by the two point sound sources of the dual-point sound source located on two sides of the auricle may be greater than that of the single-point sound source. It should be understood that, when the auricle is located between the two point sound sources of the dual-point sound source, the volume of the sound in the near-field transmitted from a sound source to the ear may be effectively increased. FIG. 16 is a graph illustrating a change of a volume of a leakage sound along with a frequency when an auricle is arranged between two point sound sources of a dual-point sound source according to some embodiments of the present disclosure. As shown in FIG. 16, as the frequency increases, the sound leakage in the far-field may be increased. When the dual-point sound source is located on two sides of the auricle, the sound leakage in the far-field leakage generated by the dual-point sound source may be the same as (or substantially same as) the sound leakage in the far-field in Mode 2, which may be less than the sound leakage in far-field in Mode 1 and/or the sound leakage in the far-field leakage generated by a single-point sound source. Therefore, when the auricle is located between the two point sound sources of the dual-point sound source, the sound transmitted from the sound source to the far-field may be effectively reduced, that is, the sound leakage from the sound source to the surroundings may be effectively reduced. FIG. 17 is a graph illustrating a change of a normalized parameter along with a frequency when two point sound sources of a dual-point sound source of an acoustic output device are disposed on two sides of an auricle according to some embodiments of the present disclosure. As shown in FIG. 17, when the frequency is less than 10000 Hz, the normalized parameter when two point sound sources of the dual-point sound source are distributed on both sides of the auricle may be less than the normalized parameter in the Mode 1 (in which there is no the baffle disposed between the two point sound sources of the dual-point sound source, and a distance between the two point sound sources is $D_1$), a Mode 2 (in which there is no baffle disposed between the two point sound sources of the dual-point sound source, and the distance between the two point sound sources is $D_2$), or a single point sound source, which may indicate that when the two point sound sources of the dual-point sound source are disposed on the two sides of the auricle, the acoustic output device may have a better capability to reduce the sound leakage.

In order to further explain an effect on the acoustic output of the acoustic output device 100 with or without a baffle between two point sound sources of a dual-point sound source or two sound guiding holes, a volume of a sound at the hearing position in a near-field and/or a volume of sound leakage in a far-field leakage under different conditions may be described below.

Figure 18:
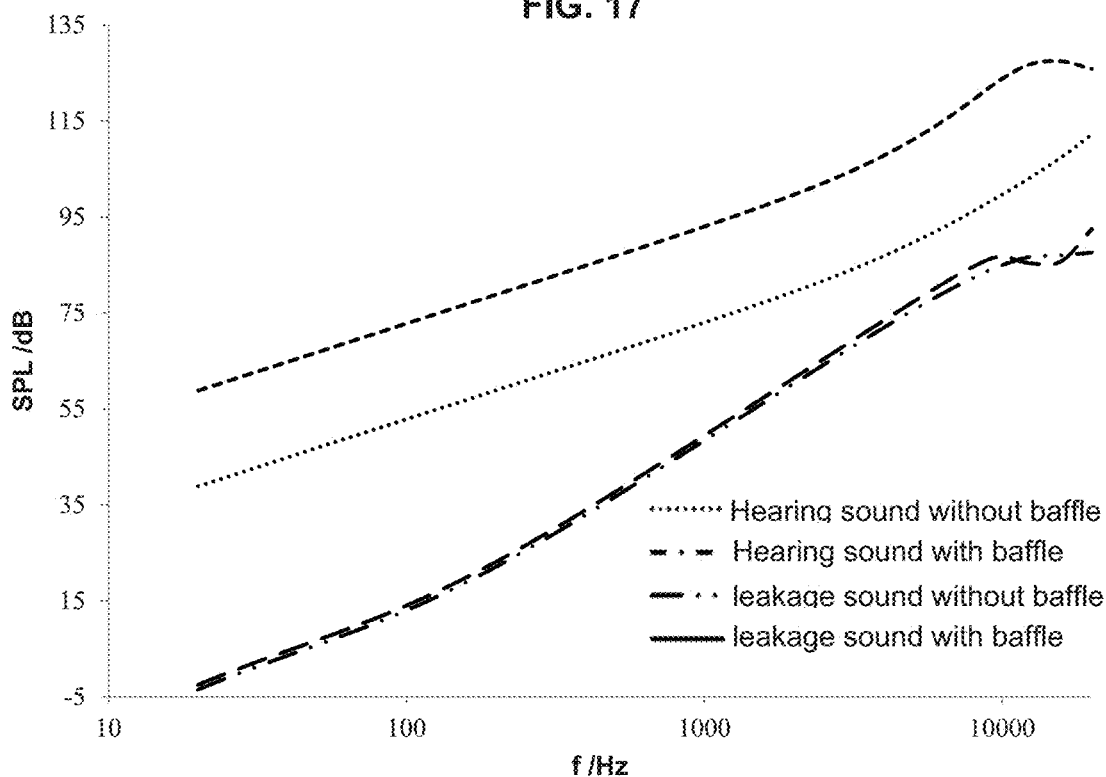
FIG. 18 is a graph illustrating a change of a volume of hearing sound and a volume of leakage sound along with a frequency with and without a baffle between two point sound sources of a dual-point sound source according to some embodiments of the present disclosure.

FIG. 18 is a graph illustrating a change of a volume of hearing sound and a volume of leakage sound along with a frequency with and without a baffle between two point sound sources of a dual-point sound source according to some embodiments of the present disclosure. As shown in FIG. 18, when the baffle is disposed between the two point sound sources of the dual-point sound source (i.e., two sound guiding holes) of the acoustic output device, a distance between the two point sound sources of the dual-point sound source may be increased in the near-field, and the volume of the sound at the hearing position in the near-field may be equivalent to being generated by dual-point sound source with a relatively large distance, thereby increasing the volume of the sound in the near-field compared to a case without the baffle. In the far-field, the interference of sound waves generated by the dual-point sound source may be not significantly affected by the baffle, the sound leakage may be regarded as being generated by a set of dual-point sound source with a relatively small distance, and the sound leakage may be not changed significantly with or without the baffle. The baffle disposed between the two sound guiding holes (the dual-point sound source) may improve the performance of the acoustic output device by reducing the sound leakage, and increase the volume of the sound in the near-field, thereby reducing requirements for a component that plays an acoustic role in the acoustic output device, reducing the electrical loss of the acoustic output device, and prolonging a working time of the acoustic output device.

Figure 19:
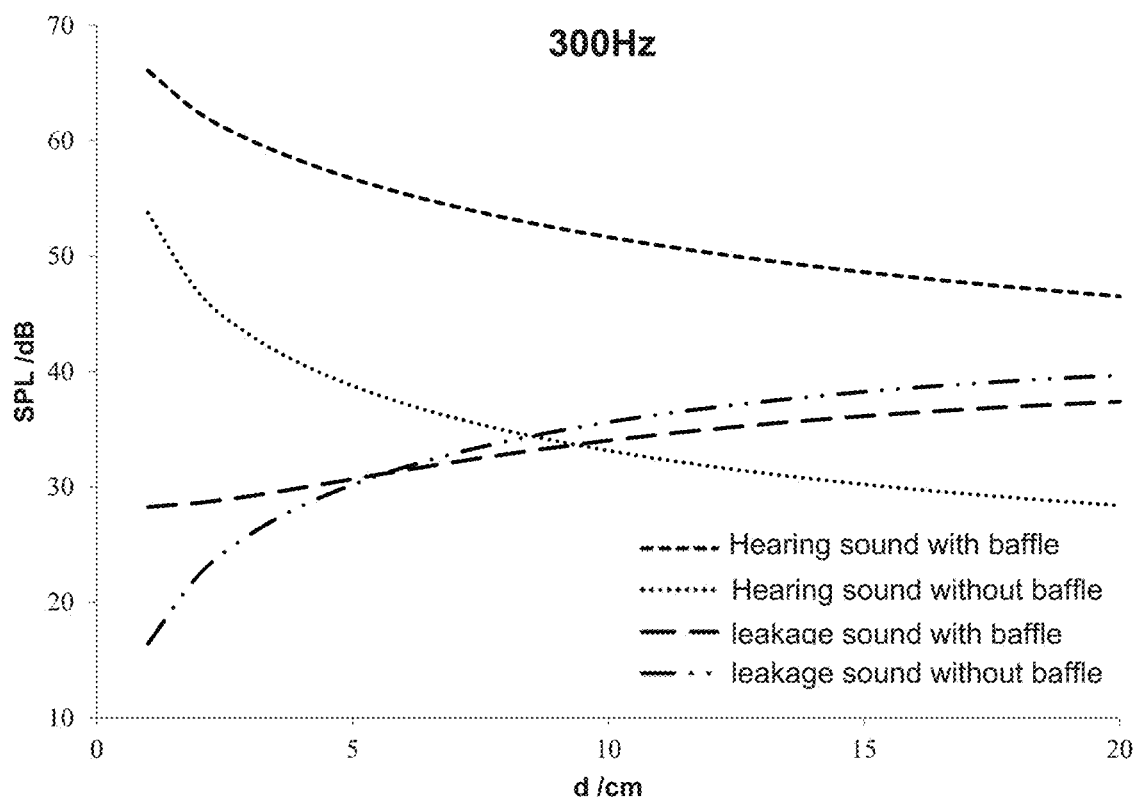
FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure.
Figure 20:
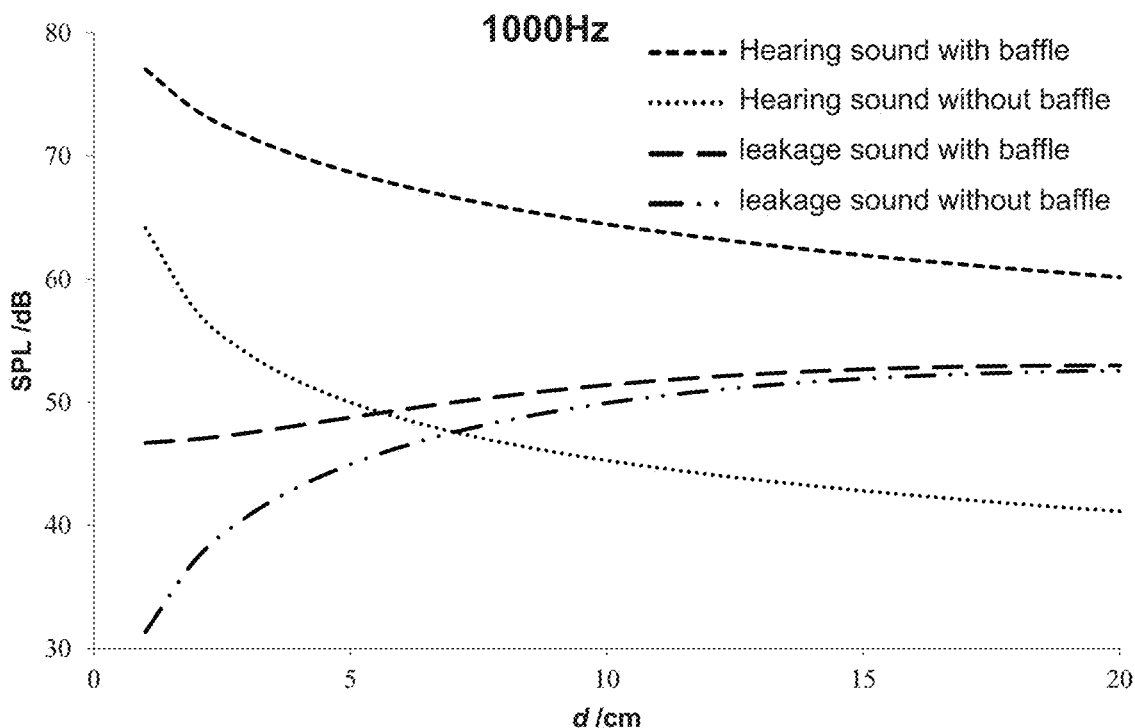
FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure.

FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure. FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure. As shown in FIG. 19 and FIG. 20, in the near-field, when the frequency is 300 Hz or 1000 Hz, a volume of a heard sound when a baffle is disposed between the two point sound sources of the dual-point sound source is greater than a volume of a heard sound when the baffle is not disposed between the two point sound sources of the dual-point sound source as the distance d of the dual-point sound source is increased. In this case, the baffle disposed between the two point sound sources of the dual-point sound source may effectively increase the volume of the heard sound in the near-field when the frequency is 300 Hz or 1000 Hz. In a far-field, a volume of a leakage sound when the baffle is disposed between the two point sound sources of the dual-point sound source may be equivalent to (or substantially equivalent to) a volume of the leakage sound when the baffle is not disposed between the two point sound sources of the dual-point sound source, which may show that the baffle disposed between the two point sound sources of the dual-point sound source may not affect on the sound leakage in the far-field when the frequency is 300 Hz or 1000 Hz.

Figure 21:
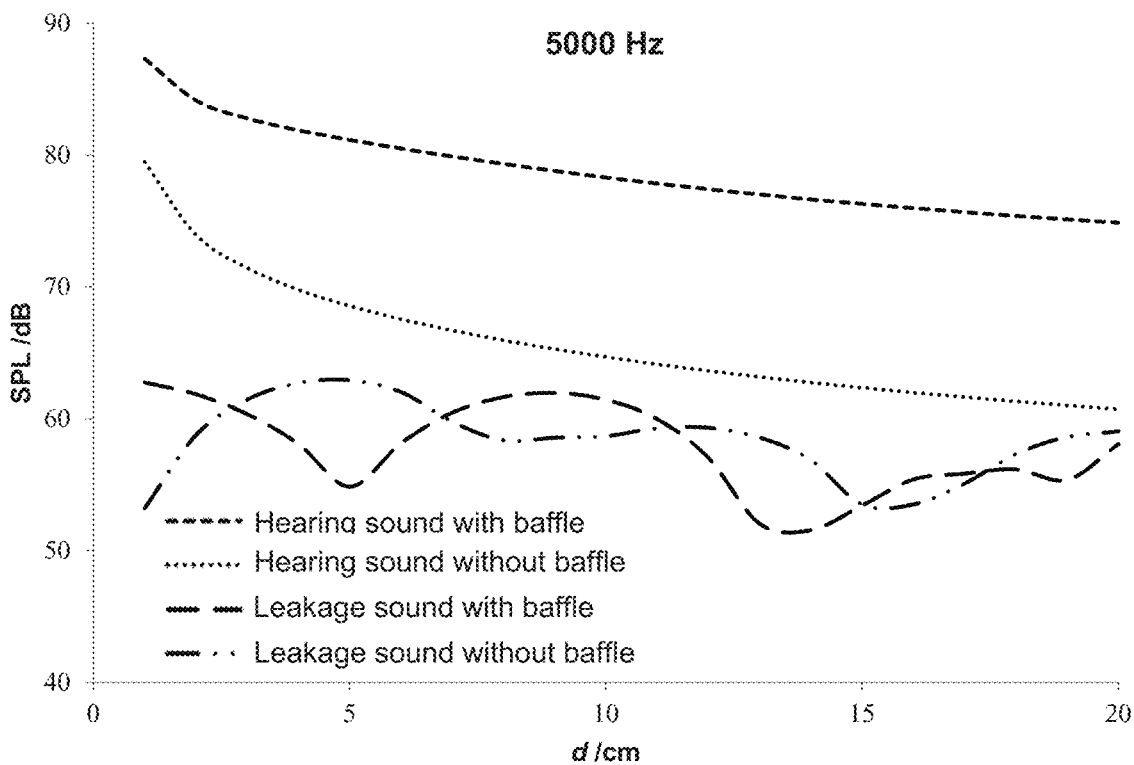
FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure.

FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure. As shown in FIG. 21, in the near-field, when the frequency is 5000 Hz, a volume of a heard sound when a baffle is disposed between the two point sound sources of the dual-point sound source is greater than a volume of a heard sound when the baffle is disposed between the two point sound sources of the dual-point sound source as the distance d of the dual-point sound source is increased. In the far-field, a volume of a leakage sound of the dual-point sound source may be fluctuant as a function of the distance d when the baffle is disposed and not disposed between the two point sound sources of the dual-point sound source. Overall, whether the baffle is disposed between the two point sound sources of the dual-point sound source may have little effect on the sound leakage in the far-field.

Figure 22:
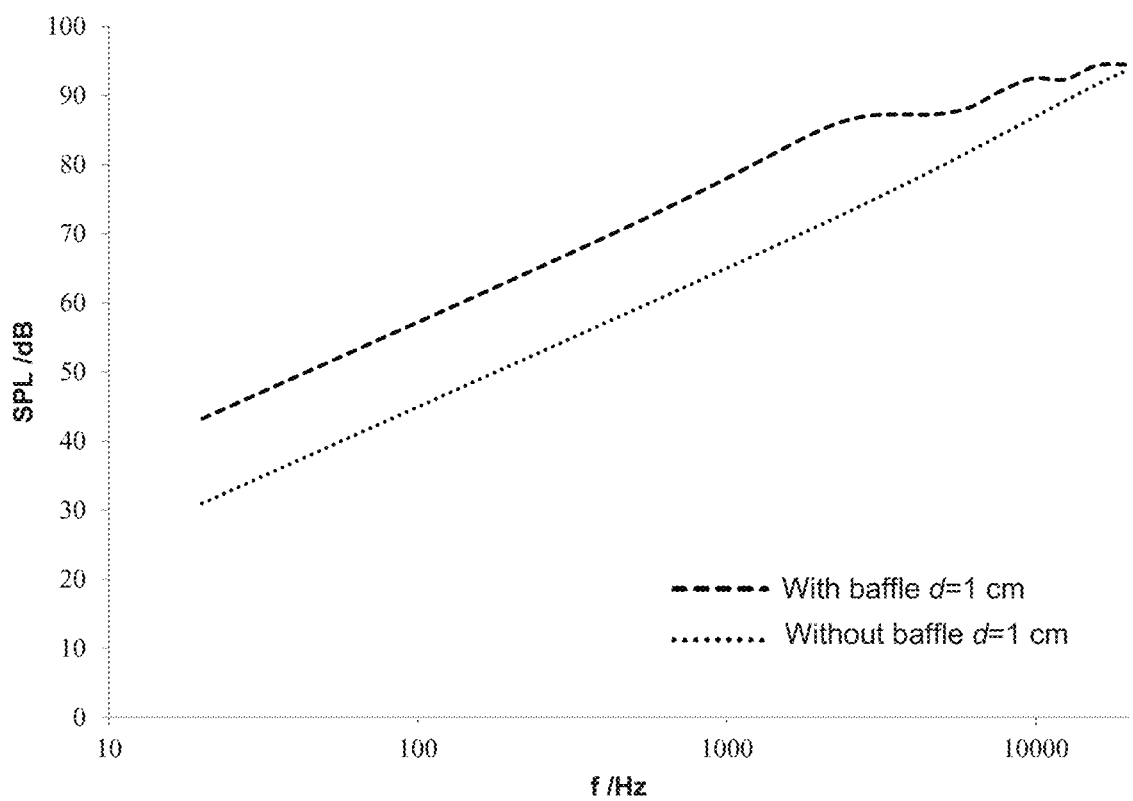
FIG. 22 is a graph illustrating a change of a volume of hearing sound along with a frequency when a distance d between two point sound sources of a dual-point sound source is 1 cm according to some embodiments of the present disclosure.
Figure 23:
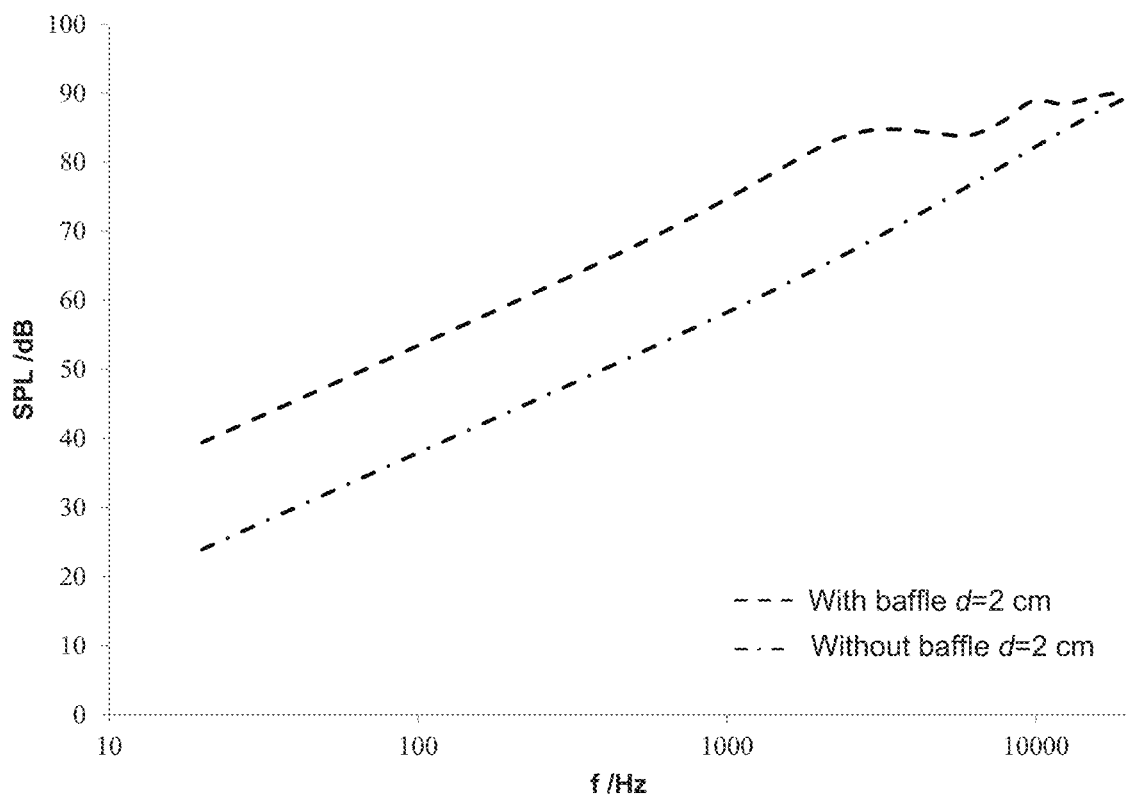
FIG. 23 is a graph illustrating a change of a volume of a hearing sound along with a frequency when a distance d between two point sound sources dual-point sound source is 2 cm according to some embodiments of the present disclosure.
Figure 24:
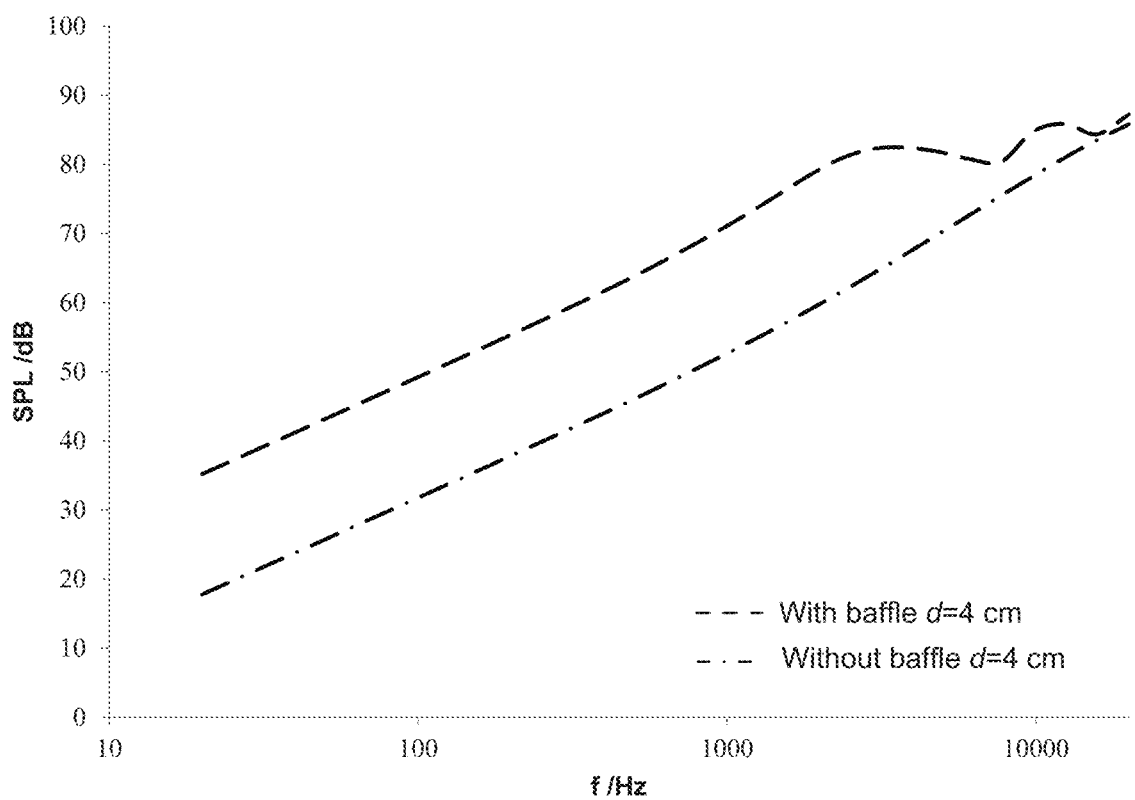
FIG. 24 is a graph illustrating a change of a volume of a hearing sound along with a frequency when a distance d of point sound sources of a dual-point sound source is 4 cm according to some embodiments of the present disclosure.
Figure 25:
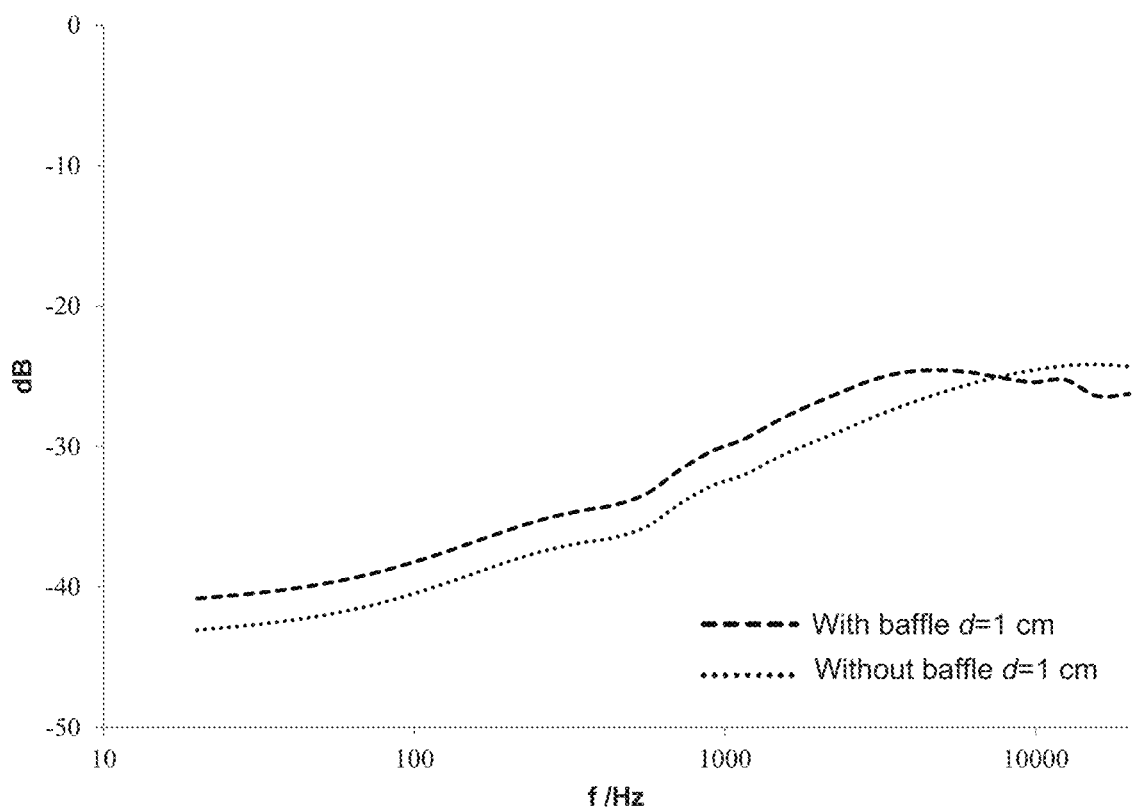
FIG. 25 is a graph illustrating a change of a normalized parameter along with a frequency when a distance d between two point sound sources of a dual-point sound source is 1 cm according to some embodiments of the present disclosure.
Figure 26:
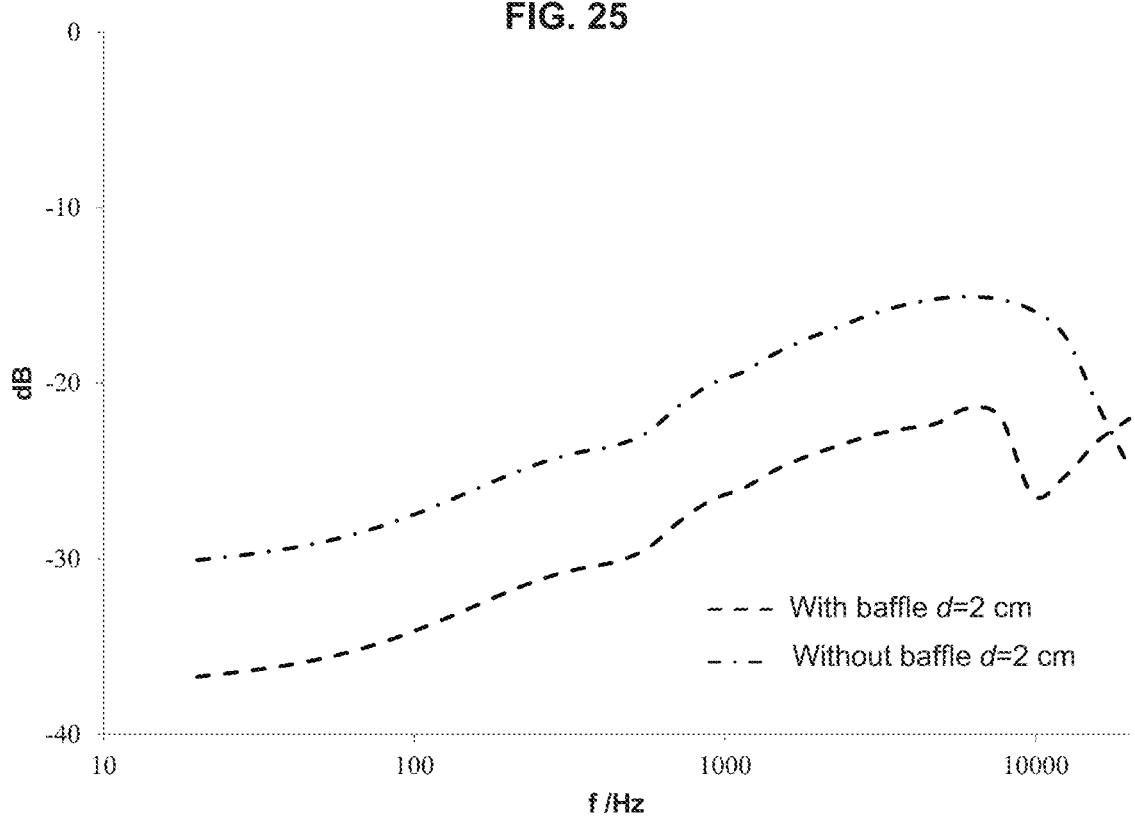
FIG. 26 is a graph illustrating a change of a normalized parameter along with a frequency when a distance d between two point sound sources of a dual-point sound source is 2 cm according to some embodiments of the present disclosure.
Figure 27:
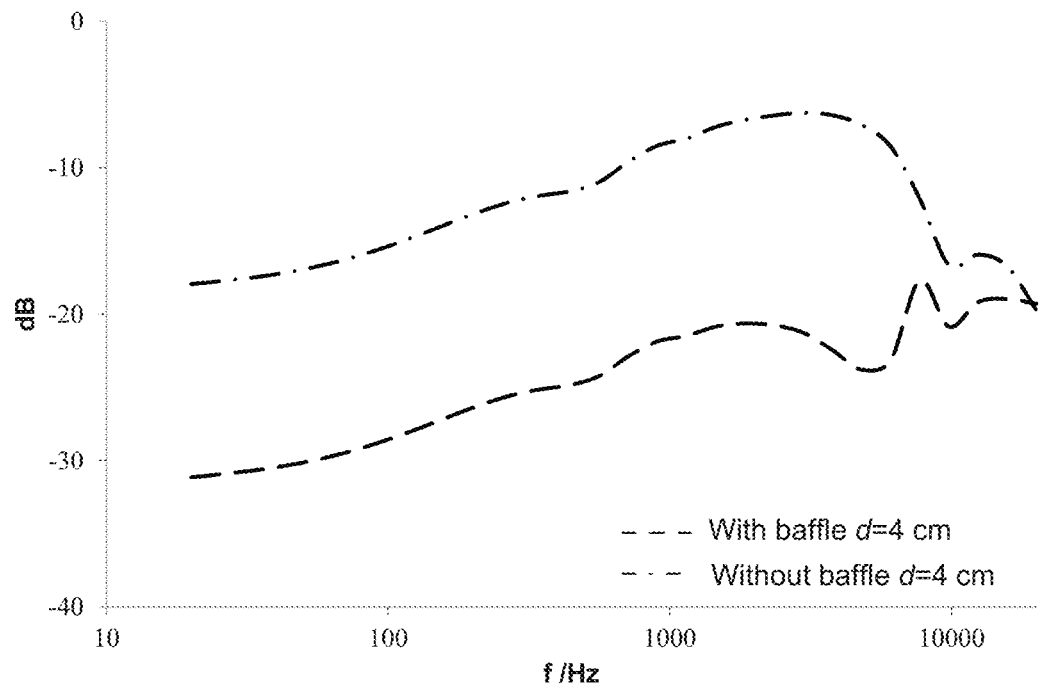
FIG. 27 is a graph illustrating a change of a normalized parameter along with a frequency when a distance d between two point sound sources of a dual-point sound source is 4 cm according to some embodiments of the present disclosure.

FIG. 22 is a graph illustrating a change of a volume of hearing sound along with a frequency when a distance d between two point sound sources of a dual-point sound source is 1 cm according to some embodiments of the present disclosure. FIG. 23 is a graph illustrating a change of a volume of a hearing sound along with a frequency when a distanced between two point sound sources dual-point sound source is 2 cm according to some embodiments of the present disclosure. FIG. 24 is a graph illustrating a change of a volume of hearing sound along with a frequency when a distance d between two point sound sources of a dual-point sound source is 4 cm according to some embodiments of the present disclosure. FIG. 25 is a graph illustrating a change of a normalized parameter along with a frequency when a distance d between two point sound sources of a dual-point sound source is 1 cm according to some embodiments of the present disclosure. FIG. 26 is a graph illustrating a change of a normalized parameter along with a frequency when a distance d between two point sound sources of a dual-point sound source is 2 cm according to some embodiments of the present disclosure. FIG. 27 is a graph illustrating a change of a normalized parameter along with a frequency when a distance d between two point sound sources of a dual-point sound source is 4 cm according to some embodiments of the present disclosure. As shown in FIG. 22 to FIG. 24, for different distance d (e.g., 1 cm, 2 cm, 4 cm) between sound guiding holes, at a certain frequency, in a hearing position in the near-field (e.g., an ear of a user), a volume of a sound generated by two sound guiding holes which may be disposed on two sides of the auricle (i.e., in the case of "without baffle" shown in FIGS. 22-24) may be greater than a volume of a sound generated by two sound guiding holes which may be not disposed on the two sides of the auricle. The certain frequency may be below 10000 Hz, 5000 Hz, or 1000 Hz.

As shown in FIGS. 25 to 27, for different distances d (e.g., 1 cm, 2 cm, 4 cm, etc.) between sound guiding holes, at a certain frequency, in far-field (e.g., a position away from an ear of a user), a volume of a leakage sound generated by the two sound guiding holes which may be disposed on two sides of an auricle, may be smaller than that generated by the two sound guiding holes which may be not disposed on two sides of the auricle. It should be noted that as the distance between the two sound guiding holes or two-point sound sources increases, the interference cancellation of a sound at a position in the far-field may be weakened, the sound leakage in the far-field may be increased, and the ability for reducing the sound leakage may be reduced. The distance d between the two sound guiding holes or the two-point sound sources may be not greater than a distance threshold. In some embodiments, the distance d between the two sound guiding holes may be set to be less than 20 cm to increase the volume in the near-field and reduce the sound leakage in the far-field. In some embodiments, the distance d between the two sound guiding holes may be set to be less than 12 cm. In some embodiments, the distance d between the two sound guiding holes may be set to be less than 10 cm. In some embodiments, the distance d between the two sound guiding holes may be set to be less than 6 cm. In some embodiments, considering a size of the acoustic output device and a structural requirement for the sound guiding hole(s), the distance d between the two sound guiding holes may be set to be no less than 1 cm and no greater than 12 cm. In some embodiments, the distance d between the two sound guiding holes may be set to be no less than 1 cm and no more than 10 cm. In some embodiments, the distanced between the two sound guiding holes may be set to be no less than 1 cm and no more than 8 cm. In some embodiments, the distanced between the two sound guiding holes may be set to be no less than 1 cm and no more than 6 cm. In some embodiments, the distance d between the two sound guiding holes may be set to be no less than 1 cm and no more than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of sound guiding holes may be set on two sides of the baffle. The count of the plurality of sound guiding holes disposed on each of the two sides of the baffle may be the same or different. For example, the count of sound guiding holes disposed on one side of the baffle may be two, and the count of sound guiding holes disposed on the other side may be two or three. These modifications and changes may still be within the protection scope of the present disclosure.

Figure 28:
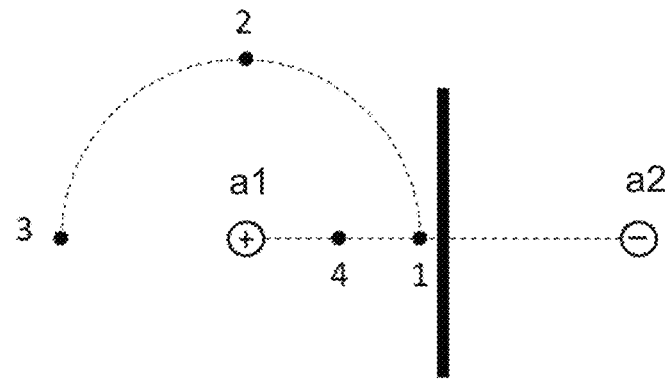
FIG. 28 is a schematic diagram illustrating hearing positions according to some embodiments of the present disclosure.

In some embodiments, for a certain distance between the two point sound sources of the dual-point sound source, a relative position of the hearing position to the dual-point sound source may affect the volume of the sound in the near-field and the sound leakage in the far-field. To improve the acoustic output performance of the acoustic output device, in some embodiments, the acoustic output device may include at least two sound guiding holes. The at least two sound guiding holes may include two sound guiding holes which may be disposed on a front side and/or a rear side of the auricle of a user, respectively. In some embodiments, a sound propagated from the sound guiding hole disposed on the rear side of the auricle may bypass the auricle to an ear canal of the user, and an acoustic route between the sound guiding hole disposed on the front side of the auricle and the ear canal (i.e., the acoustic distance from the sound guiding hole to an ear canal entrance) may be shorter than an acoustic route between the sound guiding hole disposed on the rear side of the auricle and the ear. FIG. 28 is a schematic diagram illustrating hearing positions according to some embodiments of the present disclosure. In order to further explain an effect of the hearing position on the acoustic output, four hearing positions (i.e., a hearing position 1, a hearing position 2, a hearing position 3, and a hearing position 4) may be selected as shown in FIG. 28, which may be used to describe the effect and criteria of the hearing positions. A distance between each of the hearing position 1, the hearing position 2, and the hearing position 3 and a point sound source $a_1$ may be equal, which may be denoted by $r_1$. A distance between the hearing position 4 and the point sound source $a_1$ may be denoted by $r_2$, and $r_2 < r_1$. The point sound source $a_1$ and a point sound source $a_2$ may generate sounds with opposite phases.

Figure 29:
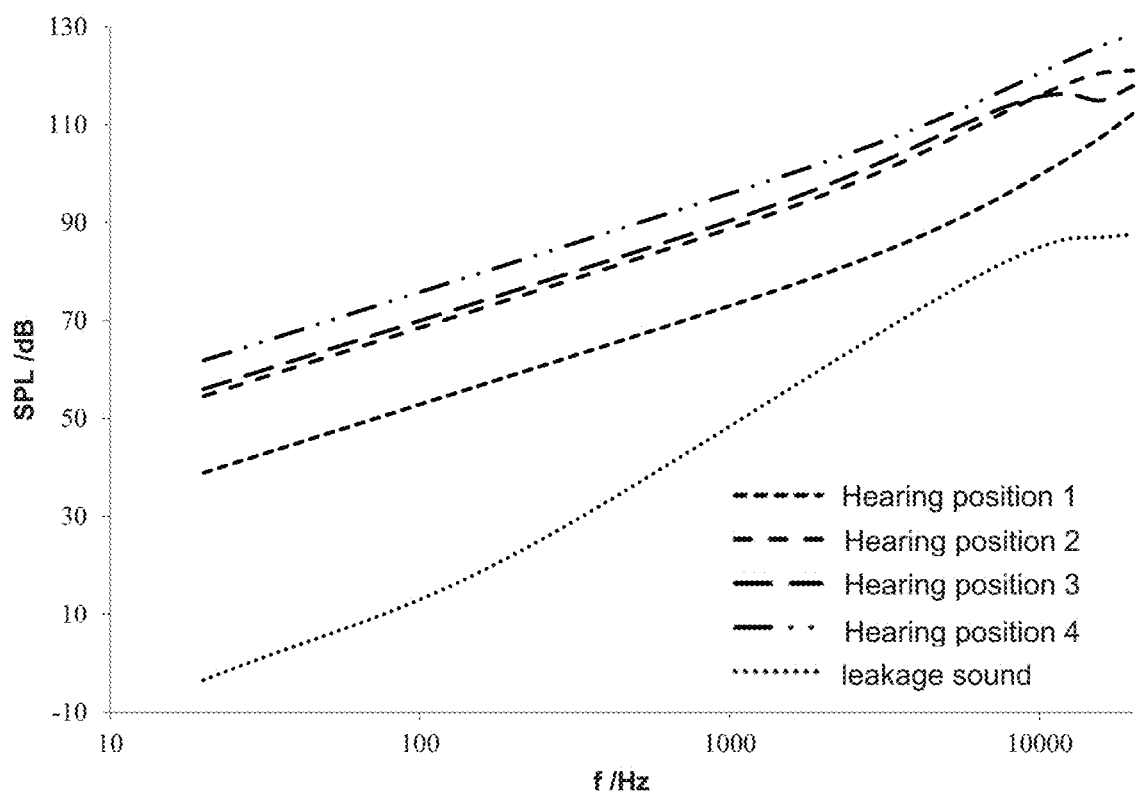
FIG. 29 is a graph illustrating a volume of hearing sound generated by a dual-point sound source without baffle at different hearing positions in a near field along with a frequency according to some embodiments of the present disclosure.
Figure 30:
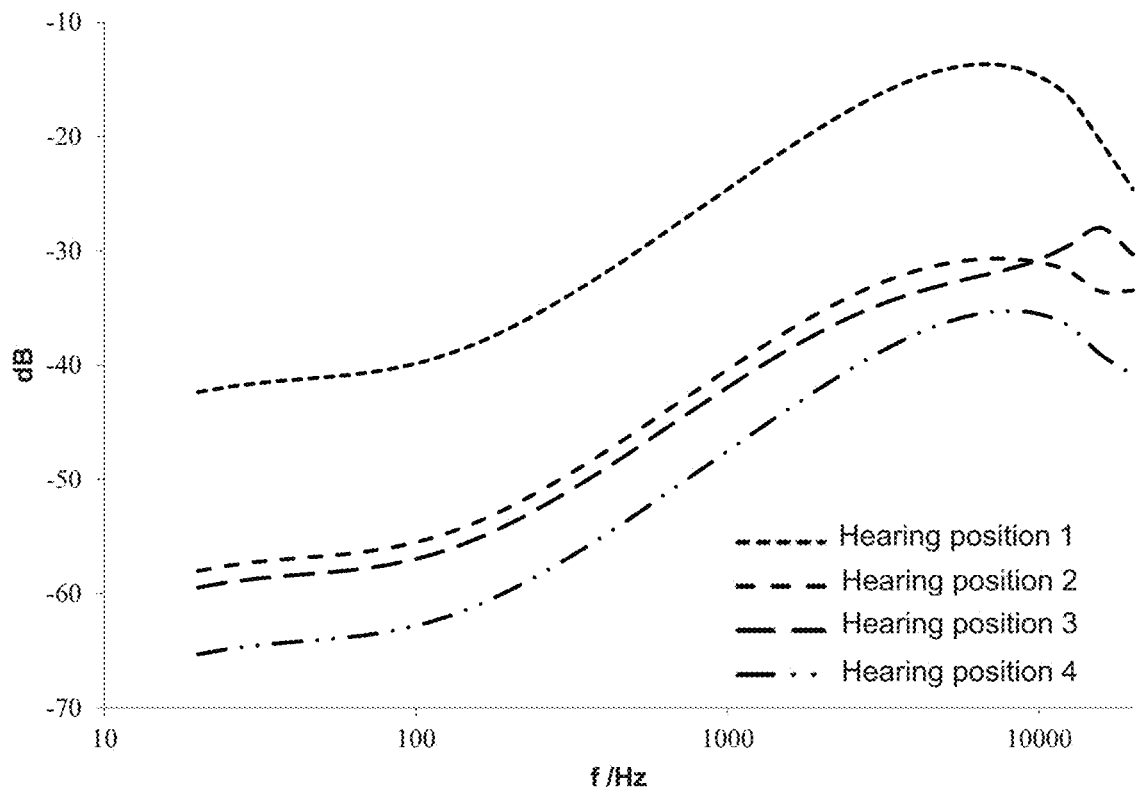
FIG. 30 is a graph illustrating a change of a normalized parameter of a hearing sound at different hearing positions in a near field of a dual-point sound source without baffle along with a frequency according to some embodiments of the present disclosure.

FIG. 29 is a graph illustrating a volume of hearing sound generated by a dual-point sound source without baffle at different hearing positions in a near field along with a frequency according to some embodiments of the present disclosure. FIG. 30 is a graph illustrating a normalized parameter at different hearing positions obtained with reference to Equation (4) on the basis of FIG. 29 along with a frequency. As shown in FIGS. 29 and 30, an acoustic route difference between an acoustic route from the point sound source $a_1$ to the hearing position 1 and an acoustic route from the point sound source $a_2$ to the hearing position 1 is relatively small, and accordingly an interference of sounds generated by the dual-point sound source at the hearing position 1 may decrease the volume of a heard sound at the hearing position 1 to be relatively smaller than that of other hearing positions. For a hearing position 2, compared with the hearing position 1, a distance between the hearing position 2 and the point sound source $a_1$ may be the same as that between the hearing position 1 and the point sound source $a_1$, that is, an acoustic route from the point sound source $a_1$ to the hearing position 2 may be the same as that from the point sound source $a_1$ to the hearing position. A distance between the hearing position 2 and the point sound source $a_2$ may be longer than that between the hearing position 1 and the point sound source $a_2$, and an acoustic route from the point sound source $a_2$ to the hearing position 2 may be greater than that from the point sound source $a_2$ to the hearing position 1. An amplitude difference between the sound generated by the point sound source $a_1$ and the sound generated by the point sound source $a_2$ may be increased at the hearing position 2. Accordingly, a volume of the sound transmitted from the dual-point sound source after being interfered at the hearing position 2 may be greater than that at the hearing position 1. Among a plurality of positions on an arc with a radius of $r_1$, a difference between the acoustic route from the point sound source $a_1$ to the hearing position 3 and the acoustic route from the point sound source $a_2$ to the hearing position 3 may be the longer than other acoustic routes. Compared with the hearing position 1 and the hearing position 2, a volume of a heard sound at the hearing position 3 may be higher than that at other hearing positions. For the hearing position 4, a distance between the hearing position 4 and the point sound source $a_1$ may be relatively short, a sound amplitude of a sound generated by the point sound source $a_1$ at the hearing position 4 may be greater than the sound amplitude of the sound generated by the point sound source $a_1$ at other hearing positions, and a volume of a heard sound at the hearing position 4 may be greater than other volumes of heard sounds at other hearing positions. In closing, the volume of the heard sound at the hearing position in the near-field may be changed when the hearing position and/or a relative position of the dual-point sound source is changed. When the hearing position (e.g., hearing position 3) is on the line between the two point sound sources of the dual-point sound source and on the same side of the dual-point sound source, the acoustic route difference between the two point sound sources of the dual-point sound source at the hearing position may be the largest (the acoustic route difference may be the distance d between the two point sound sources of the dual-point sound source). In this case (i.e., when the auricle is not used as a baffle), the volume of the heard sound at the hearing position may be greater than that at other positions. According to Equation (4), the sound leakage in the far-field is constant, the normalized parameter corresponding to the hearing position may be relatively small, and a capability for reducing the sound leakage may be relatively strong. Further, the distance $r_1$ between the hearing position (e.g., the hearing position 4) and the point sound source $A_1$ may be decreased, thereby increasing the volume of the heard sound at the hearing position, reducing the sound leakage parameter, and improving the capability of reducing sound leakage.

Figure 31:
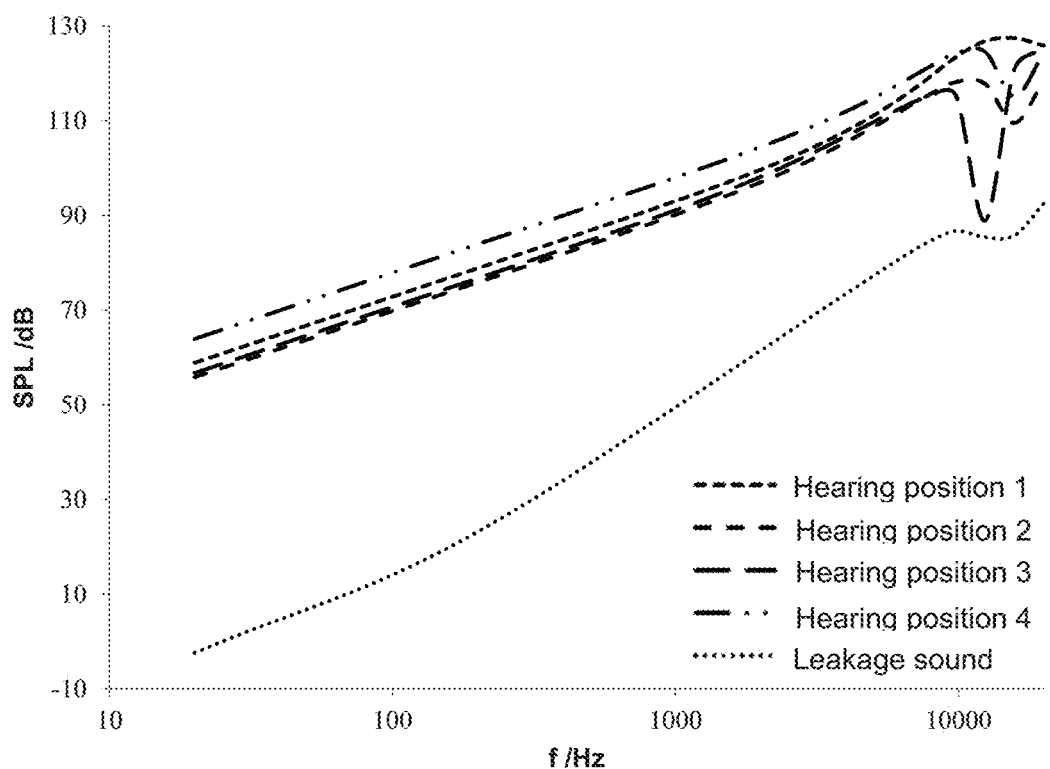
FIG. 31 is a graph illustrating a volume of a hearing sound at different hearing positions in a near field of a dual-point sound source with a baffle along with a frequency according to some embodiments of the present disclosure.
Figure 32:
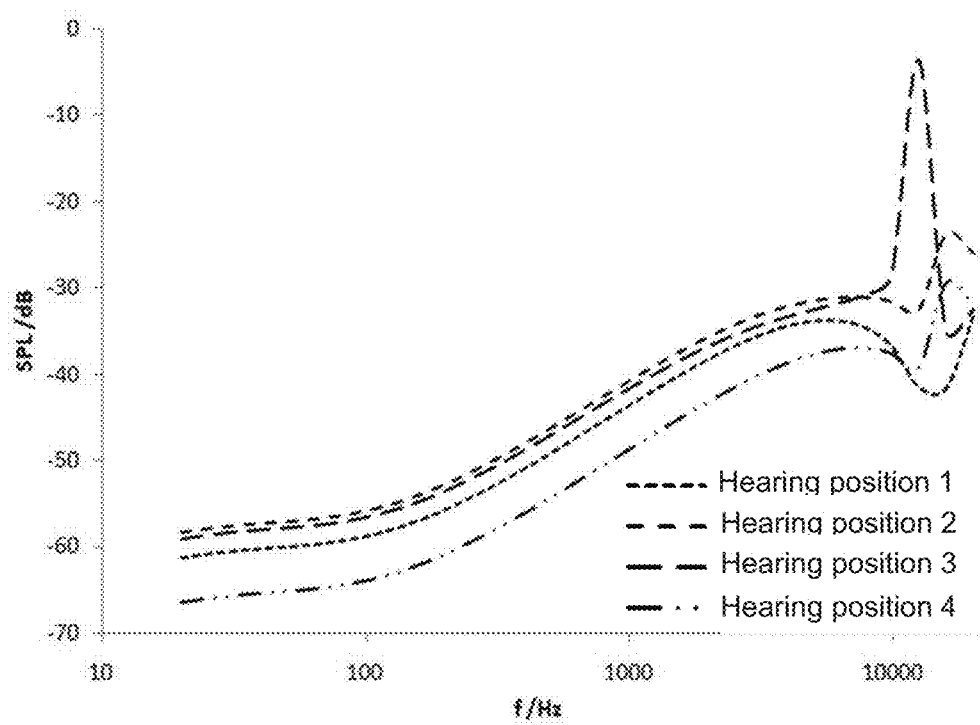
FIG. 32 is a graph illustrating a normalized parameter at different hearing positions of a dual-point sound source with a baffle along with a frequency according to some embodiments of the present disclosure.

FIG. 31 is a graph illustrating a volume of a hearing sound at different hearing positions in a near field of a dual-point sound source (shown in FIG. 28) with a baffle along with a frequency according to some embodiments of the present disclosure. FIG. 32 is a graph illustrating a normalized parameter at different hearing positions obtained with reference to Equation (4) on the basis of FIG. 31 along with a frequency. As shown in FIGS. 31 and 32, compared to a case without a baffle, a volume of a heard sound generated by the dual-point sound source at the hearing position 1 may be increased when the baffle is disposed between the two point sound sources of the dual-point sound source. The volume of the heard sound at the hearing position 1 may be greater than that at the hearing position 2 and/or the hearing position 3. An acoustic route from the point sound source $a_2$ to the hearing position 1 may be increased when the baffle is disposed between the two point sound sources of the dual-point sound source, and accordingly, an acoustic route difference between the two point sound sources of the dual-point sound source and the hearing position 1 may be increased. An amplitude difference between the sounds generated by the dual-point sound source at the hearing position 1 may be increased, and the sound interference cancellation may be not formed, thereby increasing the volume of the heard sound generated at the hearing position 1. At the hearing position 4, a distance between the hearing position 4 and the point sound source $a_1$ may be decreased, the sound amplitude of the point sound source $a_1$ at the hearing position may be relatively great. The volume of the heard sound at the hearing position 4 may be greater than that at other hearing positions (i.e., the hearing position 1, the hearing position 2, and/or the hearing position 3). For the hearing position 2 and the hearing position 3, an effect of the baffle on the acoustic route from the point sound source $a_2$ to the hearing positions may be not obvious, the increase of the volume of the heard sound at the hearing position 2 and the hearing position 3 may be less than that at the hearing position 1 and the hearing position 4 which are located close to the baffle.

The volume of leakage sound in the far-field may be not changed, and the volume of the heard sound at the hearing position in the near-field may be changed when the hearing position is changed. In this case, according to Equation (4), the normalized parameter of the acoustic output device may be different at different hearing positions. Specifically, a hearing position with a relatively large volume of the heard sound (e.g., the hearing position 1 and/or the hearing position 4) may correspond to a small normalized parameter and a strong capability for reducing the sound leakage. A hearing position with a low volume of the heard sound (e.g., the hearing position 2 and hearing position 3) may correspond to a large normalized parameter and a weak capability for reducing the sound leakage.

According to an actual application scenario of the acoustic output device, an auricle of a user may be served as the baffle. In this case, the two sound guiding holes on the acoustic output device may be arranged on a front side and a rear side of the auricle, respectively, and an ear canal may be located between the two sound guiding holes as a hearing position. In some embodiments, a distance between the sound guiding hole on the front side of the auricle and the ear canal may be smaller than a distance between the sound guiding hole on the rear side of the auricle and the ear canal by adjusting positions of the two sound guiding holes on the acoustic output device. In this case, the acoustic output device may produce a relatively large sound amplitude at the ear canal since the sound guiding hole on the front side of the auricle is close to the ear canal. The sound amplitude formed by the sound guiding hole on the rear side of the auricle may be smaller at the ear canal, which may avoid the interference cancellation of the sounds from the two sound guiding holes at the ear canal, thereby ensuring a relatively large volume of the heard sound at the ear canal. In some embodiments, the acoustic output device may include one or more contact points (e.g., "an inflection point" on a supporting structure to match a shape of the ear) which may contact with the auricle when the acoustic output device is worn. The contact point(s) may be located on a line connecting the two sound guiding holes or on one side of the line connecting the two sound guiding holes. And a ratio of a distance between the sound guiding hole disposed on the front side of the auricle and the contact point(s) and a distance between the sound guiding hole disposed on the rear side of the auricle and the contact point(s) may be 0.05-20. In some embodiments, the ratio may be 0.1-10. In some embodiments, the ratio may be 0.2-5. In some embodiments, the ratio may be 0.4-2.5.

Figure 33:
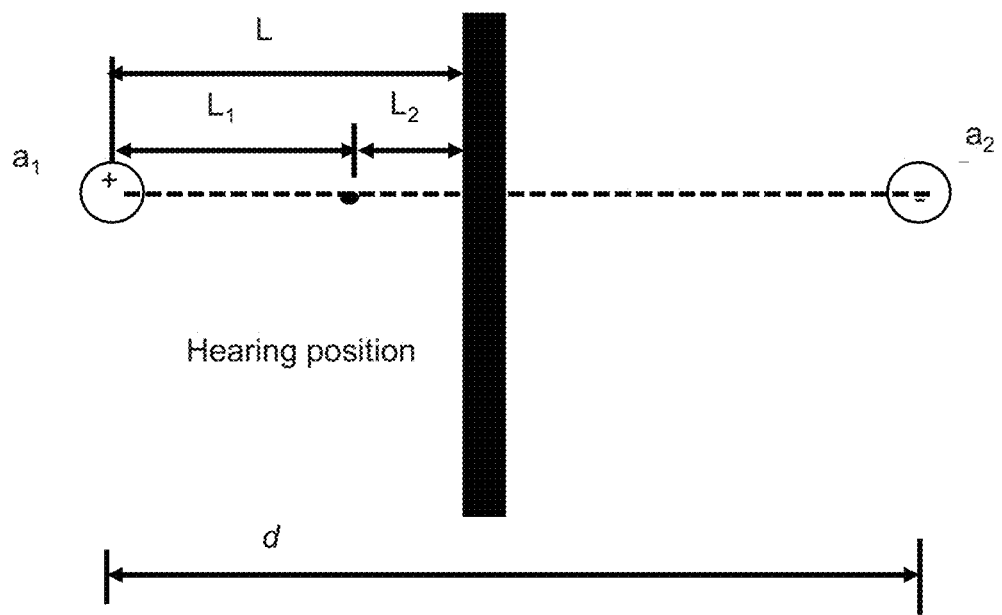
FIG. 33 is a diagram illustrating a dual-point sound source and a baffle according to some embodiments of the present disclosure.

FIG. 33 is a diagram illustrating a dual-point sound source and a baffle (e.g., an auricle) according to some embodiments of the present disclosure. In some embodiments, a position of the baffle disposed between the two sound guiding holes may affect the acoustic output of an acoustic output device. Merely by way of example, as shown in FIG. 33, the baffle may be disposed between a point sound source $a_1$ and a point sound source $a_2$, a hearing position may be located on a line connecting the point sound source $a_1$ and the point sound source $a_2$. In addition, the hearing position may be located between the point sound source $a_1$ and the baffle. A distance between the point sound source $a_1$ and the baffle may be L. A distance between the point sound source $a_1$ and the point sound source $a_2$ may be d. A distance between the point sound source $a_1$ and the heard sound may be $L_1$. A distance between the hearing position and the baffle may be $L_2$. When the distance $L_1$ is constant, a movement of the baffle may change a ratio of L to d, and a volume of the heard sound at the hearing position and/or a volume of a sound leakage in a far-field may be obtained.

Figure 34:
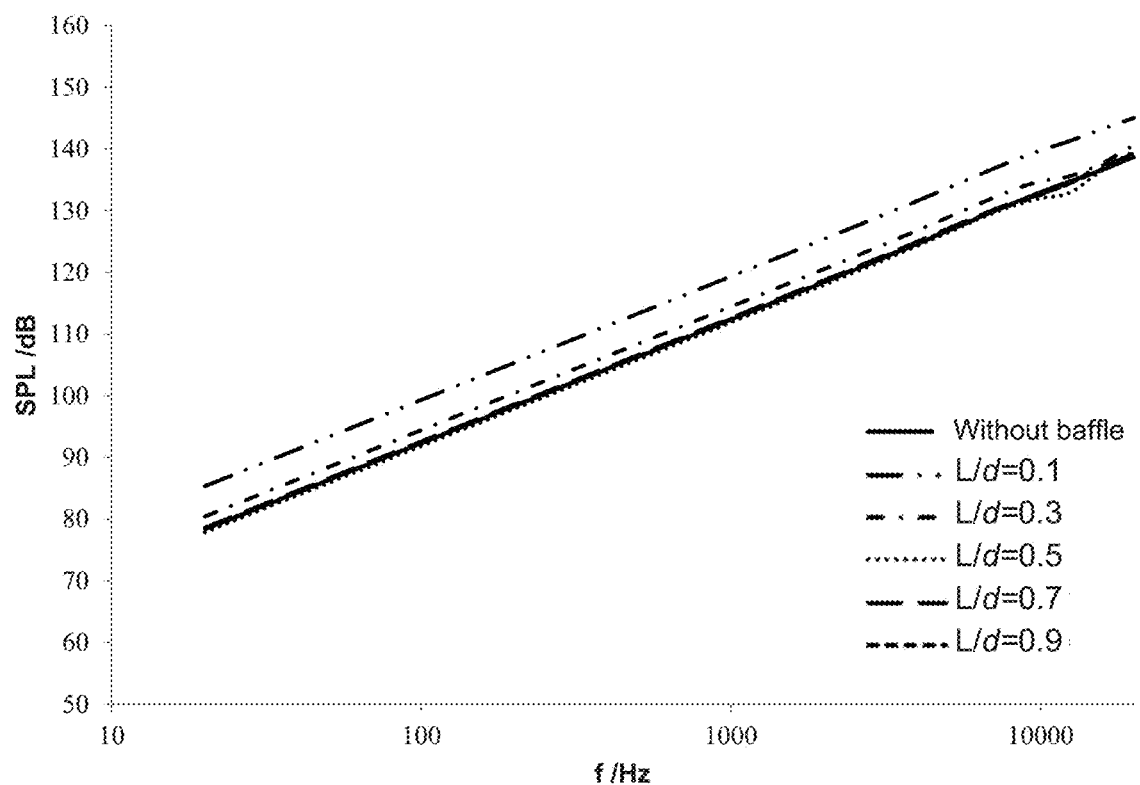
FIG. 34 is a graph illustrating a change of a volume of a sound in a near-field along with a frequency when a baffle is at different positions according to some embodiments of the present disclosure.
Figure 35:
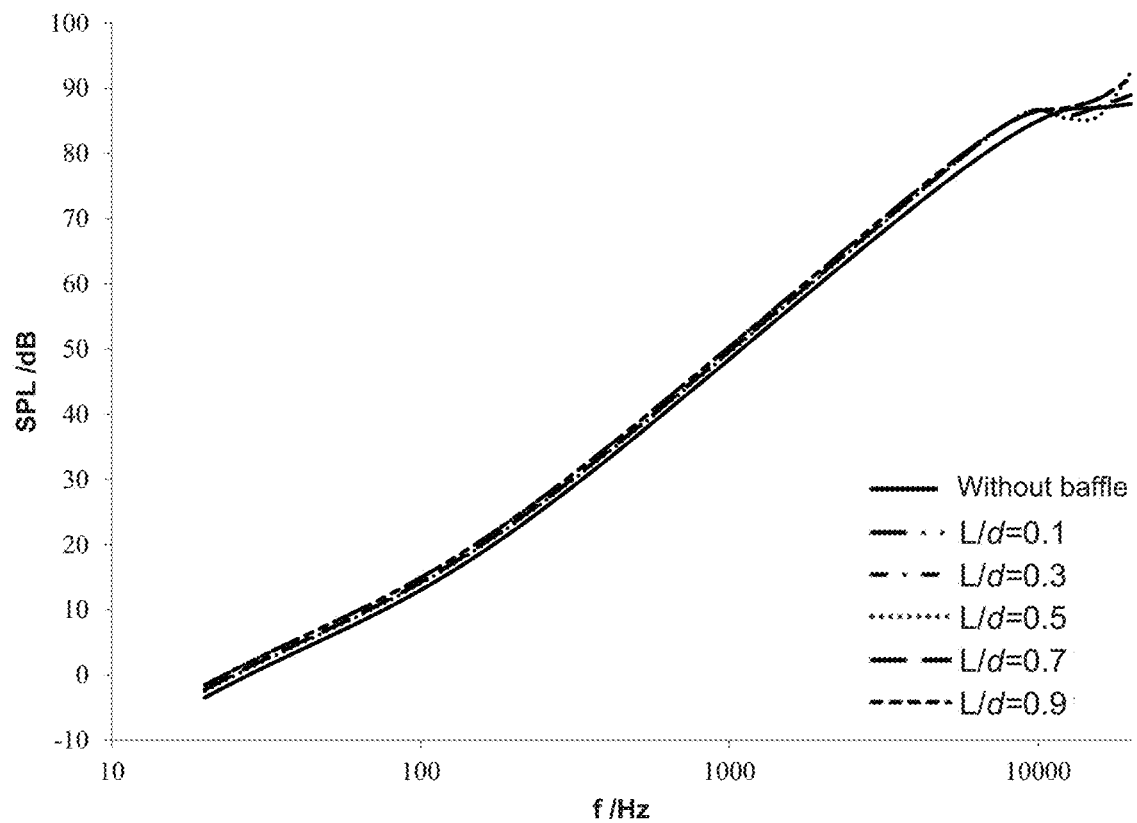
FIG. 35 is a graph illustrating a change of a volume of a leakage sound in a far-field along with a frequency when a baffle is at different positions according to some embodiments of the present disclosure.
Figure 36:
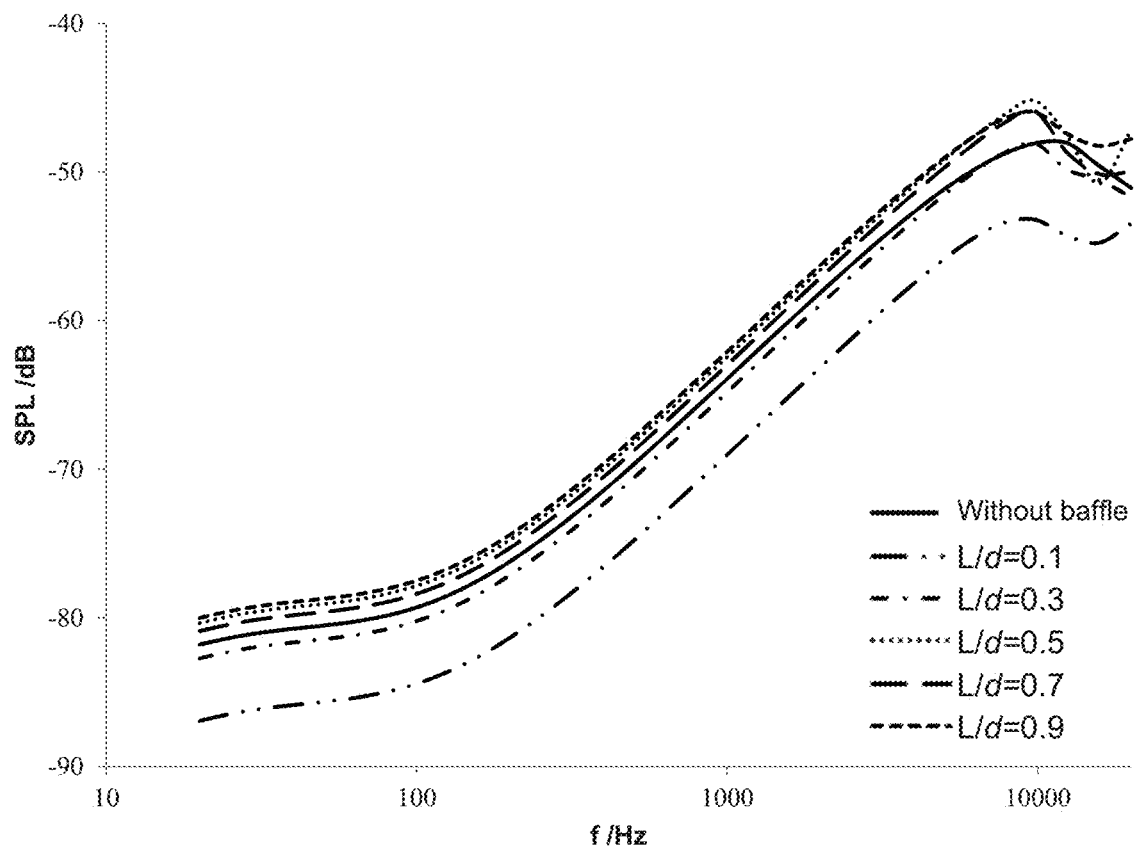
FIG. 36 is a graph illustrating a change of a normalized parameter along with a frequency when a baffle is at different positions according to some embodiments of the present disclosure.

FIG. 34 is a graph illustrating a change of a volume of a sound in a near-field along with a frequency when a baffle is at different positions according to some embodiments of the present disclosure. FIG. 35 is a graph illustrating a change of a volume of a leakage sound in a far-field along with a frequency when a baffle is at different positions according to some embodiments of the present disclosure. FIG. 36 is a graph illustrating a change of a normalized parameter along with a frequency when a baffle is at different positions according to some embodiments of the present disclosure. As shown in FIGS. 34-36, the sound leakage in the far-field may be not changed or a change of the sound leakage in the far-field may be less than a sound threshold when the position of the baffle is changed between the two point sound sources of the dual-point sound source. When a distance d between the point sound source $a_1$ and the point sound source $a_2$ is constant, when L is decreased, a volume of a sound at a hearing position may be increased, the normalized parameter may be decreased, and the capability for reducing sound leakage may be enhanced. When L increases, the volume at the hearing position may be increased, the normalized parameter may be increased, and the capability for reducing the sound leakage may be weakened. When L is relatively small, the hearing position may be close to the baffle, an acoustic route of a sound wave from the point sound source $a_2$ to the hearing position may be increased in the existence of the baffle. In this case, an acoustic route difference between an acoustic route from the point sound source $a_1$ to the hearing position and an acoustic route from the point sound source $a_2$ to the hearing position may be increased and the interference cancellation of the sound may be reduced. The volume of the sound at the hearing position may be increased in the existence of the baffle. When L is relatively large, the hearing position may be far away from the baffle. The baffle may not affect (or barely affect) the acoustic route difference. The volume at the hearing position may be not changed when the baffle is added.

As described above, by adjusting positions of the sound guiding holes on the acoustic output device, the auricle of the user may be served as the baffle to separate sound guiding holes when the user wears the acoustic output device. In this case, the structure of the acoustic output device may be simplified, and the output effect of the acoustic output device may be further improved. In some embodiments, the positions of the two sound guiding holes may be determined so that a ratio of a distance between the sound guiding hole on the front side of the auricle and the auricle (or a contact point on the acoustic output device for contact with the auricle) to a distance between the two sound guiding holes may be less than or equal to 0.5 when the user wears the acoustic output device. In some embodiments, the ratio of the distance between the sound guiding hole on the front side of the auricle and the auricle to the distance between the two sound guiding holes may be less than or equal to 0.3. In some embodiments, the ratio of the distance between the sound guiding hole on the front side of the auricle and the auricle to the distance between the two sound guiding holes may be less than or equal to 0.1. In some embodiments, the ratio of the distance between the sound guiding hole on the front side of the auricle and the auricle to the distance between the two sound guiding holes may be larger than or equal to 0.05. In some embodiments, a ratio of the distance between the two sound guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output device may affect the volume of the sound in the near-field and sound leakage in the far-field. The acoustic route may be changed by adjusting a length of a chamber between a vibration diaphragm in the acoustic output device and the sound guiding hole. In some embodiments, the acoustic driver may include the vibration diaphragm. A front side and a rear side of the vibration diaphragm may be coupled to two sound guiding holes through a front chamber and a rear chamber, respectively. The acoustic route from the vibration diaphragm to each of the two sound guiding holes may be different. In some embodiments, a ratio of the acoustic route from the vibration diaphragm to one of the two sound guiding holes to the acoustic route from the vibration diaphragm to another of the two sound guiding holes may be 0.5-2. In some embodiments, the ratio may be 0.6-1.5. In some embodiments, the ratio may be 0.8-1.2.

In some embodiments, when the two sound guiding holes transmit the sounds with opposite phases, amplitudes of the sounds may be adjusted to improve the output performance of the acoustic output device. Specifically, the amplitude of the sound transmitted by each of the two sound guiding holes may be adjusted by adjusting an impedance of an acoustic route between the sound guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound guiding holes may be adjusted to change the acoustic resistance of the acoustic route. In some embodiments, a ratio of acoustic impedance between the acoustic driver (e.g., the vibration diaphragm of the acoustic driver) and the two sound guiding holes may be 0.5-2. In some embodiments, the ratio of the acoustic impedance between the acoustic driver and the two sound guiding holes may be 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output device without departing from this principle. For example, the hearing position may not be on the line connecting the dual-point sound source, but may also be above, below, or in an extension direction of the line connecting the dual-point sound source. As another example, a method for measuring the distance between a point sound source and the auricle, and a method for measuring the height of the auricle may also be adjusted according to different conditions. These similar changes may be all within the protection scope of the present disclosure.

Figure 37:
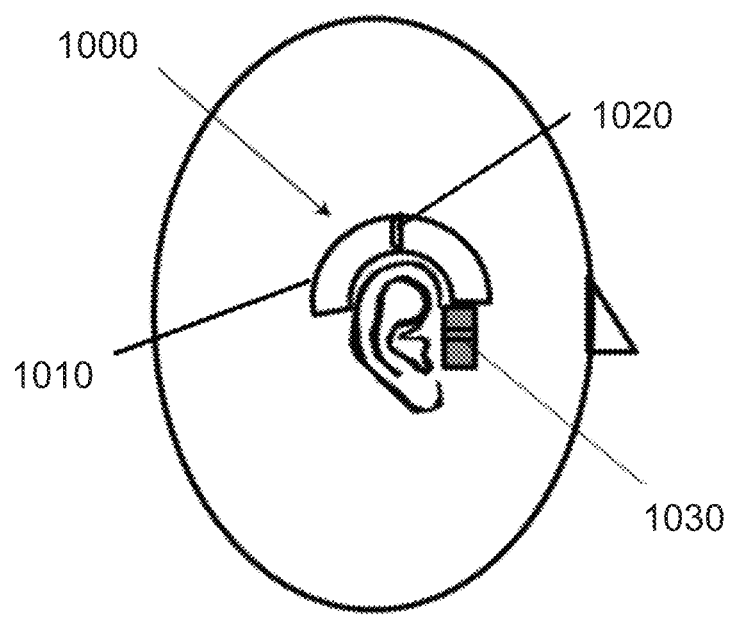
FIG. 37 is a structural diagram illustrating another exemplary acoustic output device according to some embodiments of the present disclosure.

FIG. 37 is a structural diagram illustrating another exemplary acoustic output device according to some embodiments of the present disclosure.

For a human ear, a frequency band of a sound that can be heard may be in a middle-low-frequency band. An optimization goal of the acoustic output device in the mid-low-frequency bands may be to increase a volume of a heard sound. When a hearing position is fixed, parameters of the dual-point sound source may be adjusted to increase the volume of the heard sound and not increase a volume of a leakage sound (e.g., an increase of the volume of the heard sound may be greater than an increase of the volume of the leakage sound). In a high-frequency band, a sound leakage of the dual-point sound source may be not decreased significantly. In the high-frequency band, an optimization goal of the acoustic output device may be reducing the sound leakage. The sound leakage may be further reduced and a leakage-reducing frequency band may be expanded by adjusting the parameters of the dual-point sound source of different frequencies. In some embodiments, the acoustic output device 1000 may include an acoustic driver 1030. The acoustic driver 1030 may output sound through two of the second sound guiding holes. More descriptions regarding the acoustic driver 1030, the second sound guiding holes, and a structure therebetween may be described with reference to the acoustic driver 1020 and/or the first sound guiding holes and the relevant descriptions thereof. In some embodiments, the acoustic driver 1030 and the acoustic driver 1020 may output sounds with different frequencies, respectively. In some embodiments, the acoustic output device 1000 may include a controller configured to cause the acoustic driver 1020 to output a sound within a first frequency range and cause the acoustic driver 1030 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 1020 may be a low-frequency speaker, and the acoustic driver 1030 may be a middle-high-frequency speaker. Due to different frequency response characteristics of the low-frequency speaker and the middle-high-frequency speaker, frequency bands of sounds output by the acoustic driver 1020 and the acoustic driver 1030 may be different. A high-frequency band and a low-frequency band may be divided using the low-frequency speaker and the middle-high-frequency speaker, and accordingly, a dual-point sound source with a low-frequency and a dual-point sound source with a middle-high-frequency may be constructed to output sound in the near-field output and/or reduce sound leakage in the far-field. For example, the dual-point sound source for outputting low-frequency sound may be formed when the acoustic driver 1020 outputs the low-frequency sound through the sound guiding hole 1011 and the sound guiding hole 1012 shown in FIG. 1. The dual-point sound source with low-frequency may be disposed on two sides of an auricle to increase a volume heard by an ear near the near-field. A dual-point sound source for outputting middle-high-frequency sound may be formed when the acoustic driver 1030 outputs the middle-high-frequency sound through two second sound guiding holes. A middle-high-frequency sound leakage may be reduced by adjusting a distance between the two second sound guiding holes. The dual-point sound source with middle-high-frequency may be disposed on two sides of the auricle, or the same side of the auricle. Alternatively, the acoustic driver 1020 may provide a dual-point sound source for outputting full-frequency sound through the sound guiding hole 1011 and the sound guiding hole 1012 to increase the volume of the sound in the near-field.

Further, a distance $d_2$ between the two second sound guiding holes may be less than a distance $d_1$ between the sound guiding hole 1011 and the sound guiding hole 1012, that is, $d_1$ may be greater than $d_2$. For illustration purposes, as shown in FIG. 9, two sets of dual-point sound sources may have a stronger sound leakage reduction capability than that of a single point sound source and that of one single set of dual-point sound source, and the two sets of dual-point sound sources may include one set of a low-frequency dual-point sound source and one set of a high-frequency dual-point sound source, and a distance between two point sound sources of each set of the dual-point sound sources may be different.

It should be noted that the sound guiding holes of the acoustic output device may be not limited to the two sound guiding holes 1011 and 1012 corresponding to the acoustic driver 1720 shown in FIG. 37 distributed on two sides of the auricle, and the two sound guiding holes corresponding to the acoustic driver 1030 may be distributed on the front side of the auricle. For example, in some embodiments, the two second sound guiding holes corresponding to the acoustic driver 1030 may be disposed on the same side of the auricle (e.g., a rear side, an upper side, or a lower side of the auricle). As another example, the two second sound guiding holes corresponding to the acoustic driver 1030 may be disposed on two sides of the auricle. In some embodiments, when the sound guiding holes 1011 and the sound guiding hole 1012 and/or the two second sound guiding holes are disposed on the same side of the auricle, a baffle may be disposed between the sound guiding holes 1011 and the sound guiding hole 1012 and/or the two second sound guiding holes to further increase the volume of the sound in the near-field and reduce the sound leakage in the far-field. As yet another example, the two sound guiding holes corresponding to the acoustic driver 1020 may be disposed on the same side of the auricle (e.g., the front side, the rear side, the upper side, the lower side, etc. of the auricle).

FIG. 38 is a schematic diagram illustrating exemplary audio glasses according to some embodiments of the present disclosure. As shown in FIG. 38, an audio glasses 3800 may include one or more acoustic output devices 3810, one or more frames 3820, one or more audio glasses legs 3830, one or more lenses 3840, a communication unit 3850, a battery unit 3860, and a control unit 3870.

The acoustic output device(s) 3810 may be configured to output sound. The sound may include audio files (e.g., music, recording, etc.), real-time calls, broadcast, prompt sound, or the like. For example, the user may play audio or broadcast through the acoustic output devices 3810. As another example, the user may make a real-time call with an external device through the acoustic output devices 3810 (in this case, the audio glasses 3800 may also include a microphone). As yet another example, the acoustic output devices 3810 may output a prompt sound according to a user's operation or a state of the audio glasses 3800 or one or more components (e.g., the acoustic output devices 3810, the communication unit 3850, the battery unit 3860, or the control unit 3870) of the audio glasses 3800. More descriptions regarding the acoustic output devices 3810 may be found elsewhere in the present disclosure. See, e.g., an acoustic output device 100, an acoustic output device 300, an acoustic output device 400, an acoustic output device 500, an acoustic output device 600, an acoustic output device 1000, etc., and descriptions thereof from FIG. 1 to FIG. 37. In some embodiments, the acoustic output devices 3810 may be disposed inside the temples 3830. In some embodiments, the acoustic output devices 3810 may include a first output device 3810-1 and a second output device 3810-2 disposed on a left temple and a right temple of the temples 3830, respectively. The first output device 3810-1 and the second output device 3810-2 may communicate with a signal source (e.g., a computer, a mobile phone, or other mobile devices) in a wired or wireless manner (e.g., Bluetooth) through the communication unit 3850. For example, the first output device 3810-1 and the second output device 3810-2 may be communicated with the signal source through the communication unit 3850. As another example, the first output device 3810-1 may be communicated with the signal source through the communication unit 3850, and the second output device 3810-2 may be wirelessly connected with the first output device 3810-1 through the communication unit 3850 or may be connected with the first output device 3810-1 through one or more wires inside the frames 3820 and the temples 3830. Audio output of the first output device 3810-1 and the second output device 3810-2 may be synchronized through one or more synchronization signals. In some alternative embodiments, the acoustic output devices 3810 may be disposed inside the frames 3820 or the lens(es) 3840. In some alternative embodiments, the acoustic output devices 3810 may be independent of the audio glasses 3800 and may be detachably connected with the audio glasses 3800 (e.g., via a plug connection, a snap connection, a threaded connection, etc.).

In some embodiments, each temple of the temples 3830 may carry the acoustic output devices 3810. For example, the temples 3830 may include an enclosed housing structure with a hollow interior, and the interior of each temple of the temples 3830 may carry a plurality of first output devices 3810-1 or second output devices 3810-2, respectively. In some embodiments, the acoustic output devices 3810 may be disposed at apart of the temples 3830. For example, the acoustic output devices 3810 may be disposed at a head (e.g., a part close to the lens(es) 3840), a tail (e.g., a part away from the lens(es) 3840), a middle part of the temples 3830, or the like, or any combination thereof. As another example, apart of the plurality of acoustic output devices 3810 may be disposed at the head of the temples 3830, and another part may be disposed at the tail of the temples 3830.

The audio glasses 3800 or the component(s) (e.g., the acoustic output devices 3810, the battery unit 3860, and the control unit 3870) of the audio glasses 3800 may communicate with each other or with an external device (e.g., another audio glasses, a signal source (e.g., a computer, a mobile phone, or other mobile devices) through the communication unit 3850. For example, the audio glasses 3800 may communicate with an external mobile phone (e.g., via a Bluetooth connection manner) through the communication unit 3850 to realize a function such as dialing and/or receiving a call, playing audio, etc. As another example, the audio glasses 3800 may communicate with other audio glasses through the communication unit 3850 to realize audio sharing operation. In some embodiments, the communication between the audio glasses 3800 and other audio glasses may include wireless communication. The wireless communication may include but is not limited to Bluetooth, a local area network, a wide area network, a wireless personal area network, a near field communication, or the like, or any combination thereof. In some embodiments, when the communication unit 3850 communicates with an external device, the external device may obtain information of the audio glasses 3800 (e.g., position information, power information, etc.) and control the audio glasses 3800 to implement its function(s), such as playing audio, making a call, or the like. In some embodiments, the communication unit 3850 may be disposed at any position of the audio glasses 3800. For example, the communication unit 3850 may be disposed inside the frames 3820, the temples 3830, or the lenses 3840. As another example, the communication unit 3850 may be integrated into the acoustic output devices 3810, the battery unit 3860, or the control unit 3870.

The frames 3820 may be configured to support the lenses 3840. In some embodiments, a shape of the frames 3820 may include a circle shape, a rectangle shape, an oval shape, a polygon (regular or irregular) shape, or the like. In some embodiments, the frames 3820 may include a shape that fits the lens(es) 3840. For example, when the lenses 3840 are rectangular, the frames 3820 may also be rectangular. As another example, when the lens(es) 3840 are oval, the frames 3820 may be oval. In some embodiments, a material of the frames 3820 may include metal and/or non-metal. The metal may include pure metal (i.e., a metallic element), alloy, metal-clad, metal-plated, or the like. The pure metal may include iron, copper, aluminum, titanium, silver, gold, or the like. The alloy may include stainless steel, copper alloy, nickel-chromium alloy, manganese-nickel alloy, nickel-copper alloy, nickel-titanium alloy, titanium alloy, or the like. The metal-plated may include gold-plated, titanium-plated, rhodium-plated, palladium-plated, nickel-plated, chrome-plated, or the like. The non-metal may include plastic, fiber (e.g., acetate, nitrocellulose, nylon), polymer material (e.g., plastic titanium, epoxy resin), wood, an animal shell, an animal horn, or the like. The plastic may include thermoplastic, thermosetting plastic, hybrid plastic, or the like. In some embodiments, the material of the temples 3830 may be the same as the material of the frames 3820. For example, the material of the temples 3830 and the material of the frames 3820 may be both plastic titanium. In some alternative embodiments, the material of the temples 3830 may be different from the material of the frames 3820. For example, the material of the temples 3830 may be plastic, and the material of the frames 3820 may be metal.

In some embodiments, the audio glasses 3800 may further include abridge 3821. The bridge 3821 may connect the left and right frames 3820 and the left and right lenses 3840. The bridge 3821 may be integrally formed with the left and right frames 3820 or physically connected between a left frame and a right frame of the frames 3820. The material of the bridge 3821 may be the same as or different from that of the frames 3820. In some embodiments, the audio glasses 3800 may further include one or more nose pads 3822. The nose pad(s) 3822 may be configured to support and stabilize the audio glasses 3800 when the user wears the audio glasses 3800. A left nose pad and a right nose pad of the nose pads 3822 may be integrally formed with the left and right lens frames 3820 or physically connected to the left and right frames of the frames 3820, respectively. The material of the nose pad(s) 3822 may be the same as or different from that of the frames 3820. In some embodiments, the frames 3820 may further include one or more pile heads 3823. The pile heads 3823 may be a junction between the frames 3820 and the temples 3830. The frames 3820 may be physically connected to the temples 3830 through the pile heads 3823. The physical connection may include a hinged connection, a snap connection, a threaded connection, a welding connection, or the like. For example, one end of a hinge 3880 configured to connect a frame of the frames 3820 and a temple of the temples 3830 may be fixed at the pile heads 3823 and the other end of the hinge 3880 may be fixed at the temples 3830. A left pile head and a right pile head of the pile heads 3823 may be integrally formed with the left frame and the right frame of the frames 3820 or physically connected to the left and right frames of the frames 3820, respectively. Material of the pile heads 3823 may be the same as or different from that of the frames 3820. Material of the hinge 3880 may include pure metal, alloy, metal-clad, metal-plated (e.g., metal-plated stainless steel), or the like.

In some embodiments, a shape of the lens(es) 3840 may include a circle shape, a rectangle shape, an oval shape, a polygon (regular or irregular) shape, or the like. In some embodiments, the lens(es) 3840 may include a myopia lens, a presbyopic lens, a sunglass lens (e.g., a dark audio glasses), a flat lens, an anti-blue lens, a polarized lens, or the like, or any combination thereof. Material of the lens(es) 3840 may include natural material, optical glass, optical resin, or the like. In some embodiments, the lens(es) 3840 may have anti-scratch and anti-shatter performance. In some embodiments, the audio glasses 3800 may be used as augmented reality (AR) audio glasses or virtual reality (VR) audio glasses. In this case, the light transmittance and/or haze degree of the lens(es) 3840 may be automatically adjusted and the audio glasses 3800 may call a mini projection device near the lens(es) 3840. For example, in an AR mode, the light transmittance of the lens(es) 3840 may be reduced, and an image or a video to be projected may be projected outside the lens(es) 3840 in a user's gaze direction through the mini projection device. As another example, in an VR mode, the haze degree of the lens(es) 3840 may be increased, and an image or a video to be projected may be projected inside the lens(es) 3840 through the mini projection device.

The battery unit 3860 may be configured to provide electrical power to other components (e.g., the acoustic output devices 3810, the communication unit 3850, or the control unit 3870) of the audio glasses 3800. In some embodiments, a charging mode of the power source 3860 may include a wireless charging mode, a wired charging mode, a magnetic charging mode, or the like. The wireless charging mode may include an electromagnetic induction wireless charging mode, a magnetic resonance wireless charging mode, a radio wave wireless charging mode, a solar charging mode, or the like, or any combination thereof. In some embodiments, the battery unit 3860 may include a dry battery, a lead storage battery, a lithium battery, a solar battery, or the like, or any combination thereof. In some embodiments, the battery unit 3860 may be disposed inside the temples 3830. For example, the battery unit 3860 may be disposed inside the left temple or the right temple of the temples 3830, and may provide electrical power to the first output device 3810-1 and the second output device 3810-2 of the temples 3830. As another example, the battery unit 3860 may be disposed inside the left temple and the right temple of the temples 3830, and may provide electrical power to the first output device 3810-1 and the second output device 3810-2, respectively. It should be noted that the battery unit 3860 is not limited to the case shown in FIG. 38 that the battery unit 3860 is disposed at a position of the temples 3830 close to the lenses 3840. For example, the battery unit 3860 may be disposed at a position of the temples 3830 away from the lenses 3840. As another example, the battery unit 3860 may be disposed inside the frames 3820 or the lens(es) 3840. As yet another example, the battery unit 3860 may be integrated into the acoustic output devices 3810, the communication unit 3850, the control unit 3870, etc.

The control unit 3870 may be configured to control a working state of the one or more components (e.g., the acoustic output devices 3810, the communication unit 3850, the battery unit 3860, etc.) of the audio glasses 3800. For example, the control unit 3870 may control the acoustic output devices 3810 to turn on or off. As another example, the control unit 3870 may switch audio outputted by the acoustic output devices 3810 according to a user's instruction, for example, playing audio, playing songs in a playlist of a specified category (e.g., a classical category, a pop category), or playing songs of a specified singer (e.g., Michael Jackson, Jay Chou, etc.), adjusting the volume of sound outputted by the acoustics output devices 3810, etc. In some embodiments, the control unit 3870 may communicate with the component(s) of the audio glasses 3800 directly or through the communication unit 3850. In some embodiments, the control unit 3870 may automatically detect state(s) of component(s) of the audio glasses 3800 or automatically receive state information reported by the component(s) of the audio glasses 3800. According to the state or state information, the control unit 3870 may control the component(s) of the audio glasses 3800. For example, the control unit 3870 may automatically detect the electric quantity of the power source 3860, and when the electric quantity of the power source 3860 is lower than a critical value (e.g., 20%), the control unit 3870 may control the acoustic output device 3810 to output a charging prompt sound (e.g., "Low Battery", "Power Off"). As another example, the control unit 3870 may automatically detect whether the communication unit 3850 is connected to an external device (e.g., the user's mobile phone) (e.g., via a Bluetooth manner). When the communication unit 3850 is not connected to the external device, the control unit 3870 may control the communication unit 3850 to connect the external device and control the acoustic output devices 3810 to output a prompt sound when the connection is successful (e.g., "Bluetooth Connected"). In some embodiments, the control unit 3870 may be further configured to control an external device that communicates with the audio glasses 3800. For example, the control unit 3870 may control a smart assistant (e.g., SIRI™) in a mobile phone associated with the audio glasses 3800 through the communication unit 3850. Further, according to the user's instruction (e.g., a voice instruction, a tapping instruction, etc.), the control unit 3870 may wake up the smart assistant in the mobile phone through the communication unit 3850, and control the mobile phone to perform an operation through the smart assistant, such as checking the weather, starting navigation, voice control playback, etc. In some embodiments, the control unit 3870 may be disposed at any position of the temples 3830, the frames 3820, or the lenses 3840. In some alternative embodiments, the control unit 3870 may be integrated into the acoustic output devices 3810, the communication unit 3850, or the battery unit 3860.

In some embodiments, the audio glasses 3800 may include an acoustic receiving device (not shown). The acoustic receiving device may be configured to receive an external sound, such as a user's voice instruction, a call, or the like. The acoustic receiving device may include a microphone, a voice tube, or the like. The acoustic receiving device may be disposed at any position of the temples 3830, the frames 3820, or the lenses 3840. In some alternative embodiments, the acoustic receiving device may be integrated into the acoustic output devices 3810, the communication unit 3850, the battery unit 3860, or the control unit 3870.

In some embodiments, the audio glasses 3800 may further include one or more detection units (not shown). The detection unit(s) may be configured to automatically detect the working state of the audio glasses 3800 and the component(s) (e.g., the acoustic output devices 3810, the communication unit 3850, or the power source(s) 3860) of the audio glasses 3800. In some embodiments, the control unit 3870 may control the audio glasses 3800 and the component(s) of the audio glasses 3800 according to the state information detected by the detection unit(s) (e.g., a placement or wearing state, whether being rapped, a tilt angle, an electric quantity, etc.). For example, when the detection unit(s) detects that the audio glasses 3800 are in a removed state, the control unit 3870 may turn off the component(s) (e.g., the acoustic output devices 3810) of the audio glasses 3800 after a preset time (e.g., 15 s). As another example, when the detection unit(s) detects that one of the temples 3830 of the audio glasses 3800 is rapped regularly (e.g., two beats in rapid succession), the control unit 3870 may automatically pause the acoustic output device 3810 to output sound. As yet another example, when detecting that the battery unit 3860 is with insufficient electrical power, the control unit 3870 may control the acoustic output device 3810 to output a prompt sound that the audio glasses needs to be charged. The detection unit(s) may be disposed at any position of the temples 3830, the frames 3820, or the lenses 3840. The detection unit(s) may include a detector, a sensor, a gyroscope, or the like. The detector may include a battery detector, a weight detector, an infrared detector, a mechanical detector, or the like, or any combination thereof. The sensor may include a temperature sensor, a humidity sensor, a pressure sensor, a displacement sensor, a flow sensor, a liquid level sensor, a force sensor, a speed sensor, a torque sensor, or the like, or any combination thereof. The gyroscope may be configured to detect a placement direction of the audio glasses 3800. For example, when the gyroscope detects that a bottom of the audio glasses 3800 is placed upward, the control unit 3870 may turn off the battery unit 3860 after a preset time (e.g., 20 s). The gyroscope may also communicate with a gyroscope of an external device (e.g., a mobile phone) directly or through the communication unit 3850.

In some embodiments, the audio glasses 3800 may include a control switch (not shown). The control switch may be configured to directly control the audio glasses 3800 and the component(s) (e.g., the acoustic output devices 3810, the communication unit 3850, or the battery unit 3860) of the audio glasses 3800. The form and operation mode of the control switch are merely described as some examples. A user may control the audio glasses 3800 or the component(s) of the audio glasses 3800 by performing an operation on one or more buttons of the control switch. The operation may include a simultaneously pressing, a sequentially multiple consecutive pressing, a single short-time pressing, a single long-time pressing, a touching, a sliding, or the like, or any combination thereof. For example, the user may turn on or off the acoustic output device 3810 by pressing the control button for along time. As another example, the user may connect or disconnect the communication (e.g., a Bluetooth connection) between the audio glasses 3800 and an external device by pressing the control switch for a long time. As yet another example, the user may answer or hang up a call, play or pause audio, switch audio (e.g., play next audio or play previous audio) by clicking the control switch for different times. In some embodiments, the user may control an external device communicating (or associated) with the audio glasses 3800 by performing an operation on one or more buttons in the control switch. The operation may include a simultaneously pressing, sequentially multiple consecutive pressing, a single short-time pressing, a single long-time pressing, a touching, a sliding, or the like, or any combination thereof. For example, when the user presses the control switch, the control switch may wake up the smart assistant in the mobile phone directly or through the communication unit 3850. As another example, when the detection unit(s) detects that the control switch is pressed, the control unit 3870 may wake up the smart assistant in the mobile phone. The control switch may include a physical button, an optical button, an electronic button, or the like. The control switch may be disposed at any position of the temples 3830, the frames 3820, or the lenses 3840.

In some embodiments, the audio glasses 3800 may include one or more indicator lights (not shown). The indicator lights may be configured to indicate the working state of the components (e.g., the acoustic output devices 3810, the communication unit 3850, or the battery unit 3860) of the audio glasses 3800. The indicator lights may emit light of one or more colors and/or flash different times to indicate different states (e.g., on, off, volume, power, tone, voice rate, etc.) of the acoustic output devices 3810. For example, when the acoustic output device 3810 is turned on, at least one of the indicator lights may emit green light, and when the acoustic output device 3810 is turned off, at least one of the indicator lights may emit red light. As another example, when the acoustic output device 3810 is turned on, at least one of the indicator lights may flash 3 times, and when the acoustic output device 3810 is turned off, at least one of the indicator lights may flash once. The indicator lights may also emit light with one or more colors and/or flash different times to indicate a connection state of the communication unit 3850. For example, when the communication unit 3850 is successfully connected to an external device, at least one of the indicator lights may emit green light, and when the communication unit 3850 is disconnected from the external device, at least one of the indicator lights may emit red light. As another example, when the communication unit 3850 is disconnected from the external device, at least one of the indicator lights may keep flashing. The indicator lights may emit light with one or more colors and/or flash different times to indicate the electric quantity of the power source 3860. For example, when the power source 3860 lacks electricity, at least one of the indicator lights may emit red light. As another example, when the power source 3860 lacks electricity, at least one of the indicator lights may keep flashing. The indicator lights may be disposed at any position of the temples 3830, the frames 3820, or the lens(es) 3840.

In some embodiments, the audio glasses 3800 may include a positioning unit (not shown). The positioning unit may be configured to obtain real-time position information of the audio glasses 3800. Exemplary position information may include longitude data, latitude data, location information, surrounding environment information, or the like, or any combination thereof. The positioning unit may position the audio glasses 3800 through a Global Positioning System (GPS), a Global Navigation Satellite System (GLONASS), a Beidou Navigation System (COMPASS), a Galileo Positioning System, a Quasi-Zenith Satellite System (QZSS), and a Wireless Fidelity (Wi-Fi) positioning technology, or the like, or any combination thereof. In some embodiments, an external device communicating with the audio glasses 3800 may obtain the position information of the audio glasses 3800.

In some embodiments, the audio glasses 3800 may have a waterproof rating of IPX1. In some embodiments, the audio glasses 3800 may have a waterproof rating of IPX2. In some embodiments, the audio glasses 3800 may have a waterproof rating of IPX3. In some embodiments, the audio glasses 3800 may have a waterproof rating of IPX4. In some embodiments, the audio glasses 3800 may have a waterproof rating of IPX5. In some embodiments, the audio glasses 3800 may have a waterproof rating of IPX6. In some embodiments, the audio glasses 3800 may have a waterproof rating of IPX7. In some embodiments, the audio glasses 3800 may have a waterproof rating of IPX8. In some embodiments, the audio glasses 3800 may have a dustproof rating of IP1. In some embodiments, the audio glasses 3800 may have a dustproof rating of IP2. In some embodiments, the audio glasses 3800 may have a dustproof rating of IP3. In some embodiments the audio glasses 3800 may have a dustproof rating of IP3. In some embodiments, the audio glasses 3800 may have a dust-proof rating of IP4. In some embodiments, the audio glasses 3800 may have a dust-proof rating of IP5. In some embodiments, the audio glasses 3800 may have a dust-proof rating of IP6.

It should be noted that the above description is merely for the convenience of description, and not intended to limit the scope of the present disclosure. It should be understood that, for those skilled in the art, after understanding the principle of the present disclosure, various modifications and changes in the forms and details of the audio glasses 3800 may be made without departing from this principle. For example, the audio glasses 3800 may further include other units, such as a noise reduction unit. The noise reduction unit may be configured to reduce the noise of the sound output by the acoustic output device 3810. These changes are within the protection scope of the present disclosure.

Figure 39:
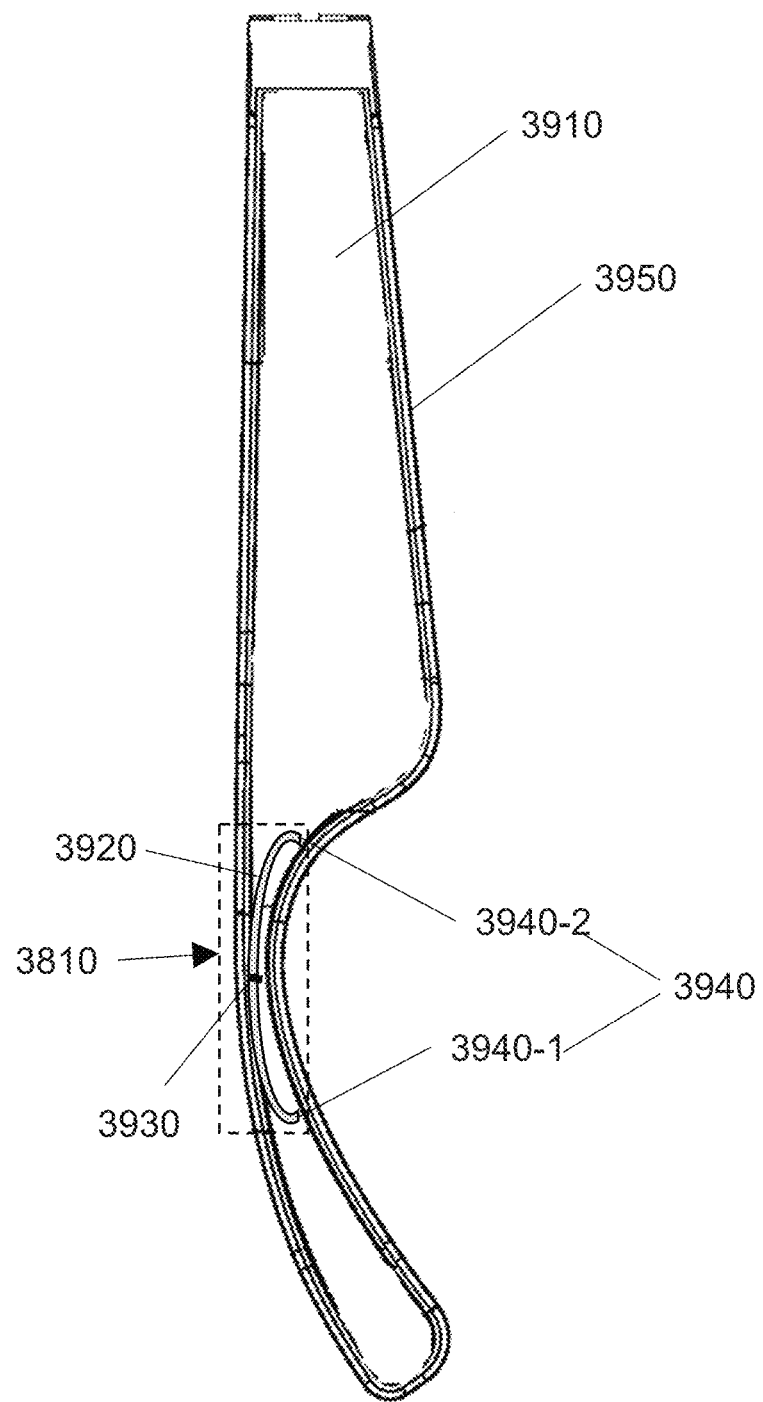
FIG. 39 is a schematic diagram illustrating a cross-sectional view of a temple of exemplary audio glasses according to some embodiments of the present disclosure.

FIG. 39 is a schematic diagram illustrating a cross-sectional view of a temple of the audio glasses 3800 according to some embodiments of the present disclosure. As shown in FIG. 39, the temple 3830 may include a cavity 3910. The acoustic output device 3810 may be disposed in the cavity 3910. The acoustic output device 3810 may include an acoustic route 3920 and an acoustic driver 3930 disposed in the acoustic route 3920. In some embodiments, the acoustic route 3920 may include a shell structure with various shapes. The shape of the acoustic route 3920 may include a circular ring, a rectangle, an oval, a (regular or irregular) polygon, a U-shape, a V-shape, a semi-circle, etc. In some embodiments, the acoustic route 3920 may be a part of the temple 3830 or physically connected to the temple 3830 (e.g., via a snap connection, a threaded connection, etc.). In some embodiments, the acoustic route 3920 may include a guiding tube, a sound cavity, a resonant cavity, a sound hole, a sound slit, a tuning net, or the like, or any combination thereof. More descriptions regarding the acoustic output device 3810 may be found elsewhere in the present disclosure. See, e.g., FIG. FIG. 4, FIG. 5, FIGS. 6A-6B, FIGS. 7A-7B, FIG. 10, and FIG. 37, and the relevant descriptions thereof.

In some embodiments, the acoustic route 3920 may include a guiding tube with a certain size. The size may be denoted by one or more parameters such as a tube radius, a length, an aspect ratio, etc. In some embodiments, the tube radius of the acoustic route 3920 may remain unchanged or may be changed along the length of the acoustic route 3920. In some embodiments, the tube radius of the acoustic route 3920 may be larger than or equal to 5.0 millimeters. In some embodiments, the tube radius of the acoustic route 3920 may be larger than or equal to 4.5 millimeters. In some embodiments, the tube radius of the acoustic route 3920 may be larger than or equal to 4.0 millimeters. In some embodiments, the tube radius of the acoustic route 3920 may be larger than or equal to 3.5 millimeters. In some embodiments, the tube radius of the acoustic route 3920 may be larger than or equal to 3.0 millimeters. In some embodiments, the tube radius of the acoustic route 3920 may be larger than or equal to 2.5 millimeters. In some embodiments, the tube radius of the acoustic route 3920 may not larger than or equal to 2.0 millimeters. In some embodiments, the tube radius of the acoustic route 3920 may be larger than or equal to 1.5 millimeters. In some embodiments, the tube radius of the acoustic route 3920 may be larger than or equal to 1.0 millimeters. In some embodiments, the tube radius of the acoustic route 3920 may be larger than or equal to 0.5 millimeters. In some embodiments, the tube radius of the acoustic route 3920 may be less than or equal to 9.0 millimeters. In some embodiments, the pipe radius of the acoustic route 3920 may be less than or equal to 8.5 millimeters. In some embodiments, the tube radius of the acoustic route 3920 may be less than or equal to 8.0 millimeters. In some embodiments, the tube radius of the acoustic route 3920 may be less than or equal to 7.5 millimeters. In some embodiments, the tube radius of the acoustic route 3920 may be less than or equal to 7.0 millimeters. In some embodiments, the tube radius of the acoustic route 3920 may be less than or equal to 6.5 millimeters. In some embodiments, the tube radius of the acoustic route 3920 may be less than or equal to 6.0 millimeters. In some embodiments, the tube radius of the acoustic route 3920 may be less than or equal to 5.5 millimeters. In some embodiments, the length of the acoustic route 3920 may be less than or equal to 500 millimeters. In some embodiments, the length of the acoustic route 3920 may be less than or equal to 450 millimeters. In some embodiments, the length of the acoustic route 3920 may be less than or equal to 400 millimeters. In some embodiments, the length of the acoustic route 3920 may be less than or equal to 350 millimeters. In some embodiments, the length of the acoustic route 3920 may be less than or equal to 300 millimeters. In some embodiments, the length of acoustic route 3920 may be less than or equal to 250 millimeters. In some embodiments, the length of acoustic route 3920 may be less than or equal to 200 millimeters. In some embodiments, the length of acoustic route 3920 may be less than or equal to 150 millimeters. In some embodiments, the length of the acoustic route 3920 may be less than or equal to 100 millimeters. In some embodiments, the length of the acoustic route 3920 may be less than or equal to 50 millimeters. In some embodiments, the length of the acoustic route 3920 may be less than or equal to 30 millimeters. In some embodiments, the length of the acoustic route 3920 may be less than or equal to 10 millimeters. In some embodiments, the aspect ratio (a length to a radius) of the acoustic route 3920 may be less than or equal to 200. In some embodiments, the aspect ratio of the acoustic route 3920 may be less than or equal to 150. In some embodiments, the aspect ratio of the acoustic route 3920 may be less than or equal to 100. In some embodiments, the aspect ratio of the acoustic route 3920 may be less than or equal to 50. More descriptions regarding the acoustic route 3920 may be found elsewhere in the present disclosure. See, e.g., FIG. 4, FIG. 5, FIGS. 6A-6B, and FIGS. 8A-8C, and the relevant descriptions thereof.

The acoustic route 3920 may include one or more guiding holes 3940 (e.g., a guiding hole 3940-1 and a guiding hole 3940-2) for transmitting sound, and the acoustic driver 3930 may output sound through the guiding hole 3940-1 and the guiding hole 3940-2. In some embodiments, the guiding hole 3940-1 and the guiding hole 3940-2 may be respectively disposed on a surface 3950 of the temple 3830 and directly communicated with the external environment. In this case, the guiding hole(s) 3940 for outputting sound in the acoustic output device 3810 may be disposed on the temple 3830. When the user wears the audio glasses 3800, the guiding hole 3940 may be close to but not block the ear canal, and the user's ears remain open. The user may not only hear the sound outputted by the acoustic output device 3810, but also obtain the sound of the external environment. In some embodiments, a shape of the guiding hole(s) 3940 may include a circle, a circular ring, rectangle, an oval, a (regular or irregular) polygon, a U-shape, a V-shape, semi-circle, or the like. The shape of the guiding hole 3940-1 may be the same as or different from that of the guiding hole 3940-2. Merely by way of example, the guiding hole 3940-1 and the guiding hole 3940-2 may be circular. One of the guiding holes may be circular, and the other of the guiding holes may be oval. In some embodiments, the guiding hole 3940 may have a certain size. The size of the guiding hole 3940-1 may be the same as or different from that of the guiding hole 3940-2. In some embodiments, the guiding hole may be referred to as a sound source (although the acoustic driver 3930 may actually output the sound from a view of physics). A guiding hole 3940 may be regarded as a point sound source (or a single point sound source). A pair of the guiding holes 3940 (e.g., the guiding hole 3940-1 and the guiding hole 3940-2) corresponding to the same acoustic driver 3930 may be regarded as a dual-point sound source. In some embodiments, an area of each guiding hole may be less than or equal to 2 $cm^2$. In some embodiments, the area of each guiding hole may be less than or equal to 1.5 $cm^2$. In some embodiments, the area of each guiding hole may be less than or equal to 1.2 $cm^2$. In some embodiments, the area of each guiding hole may be less than or equal to 1 $cm^2$. In some embodiments, the area of each guiding hole may be less than or equal to 0.8 $cm^2$. In some embodiments, the area of each guiding hole may be less than or equal to 0.5 $cm^2$. In some embodiments, the area of each guiding hole may be less than or equal to 0.3 $cm^2$. In some embodiments, the area of each guiding hole may be less than or equal to 0.2 $cm^2$. In some embodiments, the area of each guiding hole may be less than or equal to 0.1 $cm^2$. In some embodiments, the area of each guiding hole may be less than or equal to 0.05 $cm^2$. In some embodiments, the area of some guiding holes may be less than or equal to 0.3 $cm^2$, and the area of a part of some guiding holes may be larger than or equal to 0.3 $cm^2$. In some embodiments, the area of some guiding holes may be less than or equal to 0.2 $cm^2$, and the area of some guiding holes may be larger than or equal to 0.2 $cm^2$. In some embodiments, the area of some guiding holes may be less than or equal to 0.1 $cm^2$, and the area of some guiding holes may be larger than or equal to 0.3 $cm^2$.

In some embodiments, the acoustic route 3920 may carry one or more acoustic drivers 3930. The acoustic driver(s) 3930 may be disposed inside the acoustic route 3920. The acoustic driver(s) 3930 may be a component that may receive an electrical signal and convert the electrical signal into a voice signal to be output. In some embodiments, according to a frequency, a type of the acoustic driver 3930 may include a low-frequency acoustic driver, a high-frequency acoustic driver, a full-frequency acoustic driver, or any combination thereof. In some embodiments, according to a principle, the acoustic driver 3930 may include a moving coil driver, a moving iron driver, a piezoelectric driver, an electrostatic driver, a magnetostrictive driver, or the like. More descriptions regarding the acoustic driver 3930 may be found elsewhere in the present disclosure. See, e.g., FIG. 4, FIG. 5, FIGS. 6A-6B, FIG. 10, and FIG. 37, and the relevant descriptions thereof.

In some embodiments, the acoustic driver 3930 may include a transducer. The transducer may be configured to generate vibration under the driving of an electric signal, and the vibration may generate sounds with the same amplitude, the same frequency, and opposite phases (180 degrees inversion). A type of the transducer may include an air conductive loudspeaker, a bone conductive loudspeaker, a hydroacoustic transducer, an ultrasonic transducer, or the like, or any combination thereof. The transducer may be of a moving coil type, a moving iron type, a piezoelectric type, an electrostatic type, a magnetostrictive type, or the like, or any combination thereof. More descriptions regarding the sound guiding hole 3940 may be found elsewhere in the present disclosure. See, e.g., FIG. 4, FIG. 5, and FIGS. 6A-6B, and the relevant descriptions thereof.

In some embodiments, the transducer may include a vibration diaphragm. The vibration diaphragm may vibrate when driven by an electric signal, and a front side and a rear side of the vibration diaphragm may simultaneously output a positive phase sound and a reverse phase sound. In some embodiments, a front chamber (i.e., a front half of the acoustic route 3920) for transmitting sound may be provided at the front side of the vibration diaphragm in the acoustic route 3920. The front chamber may be acoustically coupled with the guiding hole 3940-1, and the sound from the front side of the vibration diaphragm may be output from the guiding hole 3940-1 through the front chamber. A rear chamber (i.e., a rear half of the acoustic route 3920) for transmitting sound may be provided at the rear side of the vibration diaphragm in the acoustic route 3920. The rear chamber may be acoustically coupled with the guiding hole 3940-2, and the sound from the rear side of the vibration diaphragm may be output from the guiding hole 3940-2 through the rear chamber. It should be noted that when the vibration diaphragm is vibrating, the front side and the rear side of the vibration diaphragm may simultaneously generate sounds with opposite phases. When the sounds pass through the front chamber and the rear chamber, respectively, the sounds may propagate outwards from the guiding hole 3940-1 and the guiding hole 3940-2. In some embodiments, the structures of the front chamber and the rear chamber may be designed so that the sound output by the acoustic driver 3930 at the sound guiding hole 3940-1 and the sound guiding hole 3940-2 may satisfy a specific condition. For example, lengths of the front chamber and the rear chamber may be designed such that sounds with a specific phase relationship (e.g., opposite phase) (in the figure, "+" and "−" may be configured to represent sounds with different phases) may be output from the guiding hole 3940-1 and the guiding hole 3940-2. Accordingly, a low volume in the near-field of the audio glasses may be improved and sound leakage in the far-field may be effectively reduced. More descriptions regarding the sound leakage reduction of the dual-point sound source may be found elsewhere in the present disclosure. See, e.g., FIG. 2 and the relevant descriptions thereof.

In some embodiments, a plurality of front chambers for transmitting sound may be provided at the front side of the vibration diaphragm in the acoustic route 3920, and each of the plurality of front chambers may be coupled with the guiding hole 3940-1 corresponding to the front chamber. A plurality of rear chambers for transmitting sound may be provided at the rear side of the vibration diaphragm in the acoustic route 3920. Each of the plurality of rear chambers may be coupled with the guiding hole 3940-2 corresponding to the rear chamber. For example, the acoustic route 3920 may include two front chambers beside the front side of the vibration diaphragm. When the vibration diaphragm vibrates, the sound generated on the front side of the vibration diaphragm may be transmitted to the two corresponding guiding holes 3940-1, respectively, through the two front chambers. The two guiding holes 3940-1 corresponding to the front side of the vibration diaphragm and the one guiding hole 3940-2 corresponding to the rear chamber of the vibration diaphragm may form a tri-point sound source.

In some embodiments, the acoustic driver 3930 may include a plurality of vibration diaphragms (e.g., two vibration diaphragms). Each of the plurality of vibration diaphragms may vibrate to generate sound, which may pass through different chambers connected to the vibration diaphragm in the acoustic route 3920 and output from corresponding guiding hole 3940. The plurality of vibration diaphragms may be controlled by the same or different controllers, and generate sounds that satisfy certain phases and amplitudes (e.g., sounds with the same amplitude but opposite phases, sounds with different amplitudes and opposite phases, etc.). More descriptions regarding the vibration diaphragm may be found elsewhere in the present disclosure. See, e.g., FIG. FIG. 1, FIG. 5, and FIG. 10, and the relevant descriptions thereof.

In some embodiments, the sound generated by the plurality of vibration diaphragms may be decomposed into two or more sounds having different frequency components. For example, the sound may be decomposed into a sound having high-frequency components and a sound having low-frequency components. The sounds having different frequency components may be transmitted to the corresponding guiding hole 3940. For example, the sound with the high-frequency components may be transmitted to the guiding holes 3940-1 and 3940-2 and propagated outwards through the guiding holes 3940-1 and 3940-2, and the sound with the low-frequency components may be transmitted to the guiding holes 3940-3 and 3940-4 (not shown) and propagate outwards through the guiding holes 3940-3 and 3940-4. More descriptions regarding the frequency division may be found elsewhere in the present disclosure. See, e.g., FIG. 2, FIG. 4, and FIGS. 8A-8C, and the relevant descriptions thereof.

It should be noted that the above description is merely for the convenience of description, and not intended to limit the scope of the present disclosure. It should be understood that, for those skilled in the art, after understanding the principle of the present disclosure, various modifications and changes in the forms and details of the audio glasses 3800 may be made without departing from this principle. For example, the acoustic route 3920 may include a tuning net and/or tuning cotton to adjust the sound output by the acoustic driver 3930. As another example, each guiding hole 3940 may include a sound-permeable dust-proof net and/or a waterproof net to protect components inside the temple 3830 of the audio glasses 3800. The dust-proof net and/or the waterproof net may be of high-density net cover material. These changes may fall within the protection scope of the present disclosure.

Figure 40:
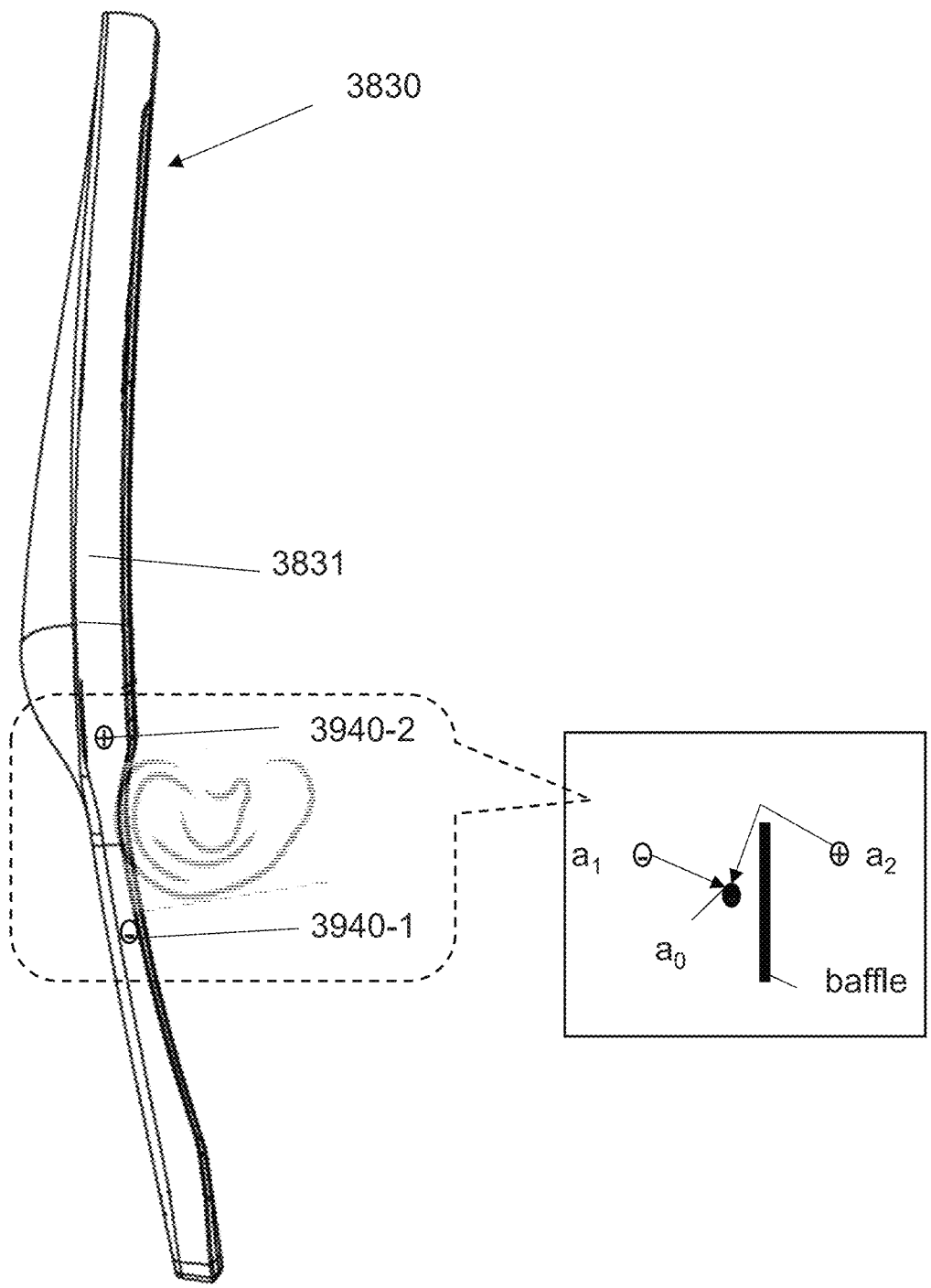
FIG. 40 is a schematic diagram illustrating guiding holes on a temple of exemplary audio glasses according to some embodiments of the present disclosure.

FIG. 40 is a schematic diagram illustrating guiding holes on a temple of a audio glasses 3800 according to some embodiments of the present disclosure. As shown in FIG. 40, a guiding hole 3940-1 and a guiding hole 3940-2 of an acoustic output device 3810 may be disposed on a lower side 3831 of a temple 3830. The guiding hole 3940-1 may be disposed on the temple 3830 and at a rear side of the user's auricle when the audio glasses is worn by the user. The guiding hole 3940-2 may be disposed on the temple 3830 and at a front side of the user's auricle when the audio glasses is worn by the user. When the guiding hole 3940-1 and the guiding hole 3940-2 of the acoustic output device 3810 are disposed on both sides of the auricle, respectively, the auricle may serve as a baffle. In this case, the guiding hole 3940-1 and the guiding hole 3940-2 may be respectively regarded as a point sound source A1 and a point sound source A2 in FIG. 40, and the auricle may be equivalent to the baffle in FIG. 40. A hearing position A0 may be a position of the ear hole.

It should be noted that the guiding hole(s) 3940 (e.g., the guiding hole 3940-1 and the guiding hole 3940-2) of the acoustic output device 3810 are not limited to the distribution shown in FIG. 40. For example, the guiding hole 3940-1 may be disposed on a front side of the user's auricle, and an upper side 3834, an inner side 3832, or an outer side 3833 of the temple 3830, when the audio glasses is worn by the user. The guiding hole 3940-2 may be disposed on the rear side of the user's auricle and the upper side 3834, the inner side 3832, or the outer side 3833 of the temple 3830 when the audio glasses is worn by the user. In some embodiments, when the guiding holes 3940-1 and 3940-2 are disposed on the front side of the user's auricle and on a surface 3950 of the temple 3830 when the audio glasses are worn by the user, the auricle may not serve as a baffle. In the embodiment, a baffle may be disposed between the guiding holes 3940-1 and 3940-2. The baffle may be disposed inside the temple 3830 or on the outer surface of the temple 3830. More descriptions regarding the baffle may be found elsewhere in the present disclosure. See, e.g., FIG. 14, FIGS. 18-21, and FIGS. 29-36, and the relevant descriptions thereof.

It should be noted that the above description is merely for the convenience of description, and not intended to limit the scope of the present disclosure. It should be understood that, for those skilled in the art, after understanding the principle of the present disclosure, various modifications and changes in the forms and details of the audio glasses 3800 may be made without departing from this principle. For example, in some embodiments, a count of the guiding hole 3940-1 or 3940-2 on both sides of the user's auricle and on the temple 3830 when the audio glasses are worn by the user may be not limited to one shown in FIG. 40, and the count of the guiding hole 3940-1 or 3940-2 may be any integer than 1. The count of the guiding hole 3940-1 may be the same as or different from that of the guiding hole 3940-2. For example, the count of the guiding holes 3940-2 on the front side of the user's auricle and on the temple 3830 may be two, and the count of the guiding holes 3940-1 on the rear side of the user's auricle and on the temple 3830 may be two or three. These changes are fall within the protection scope of the present disclosure.

Figure 41:
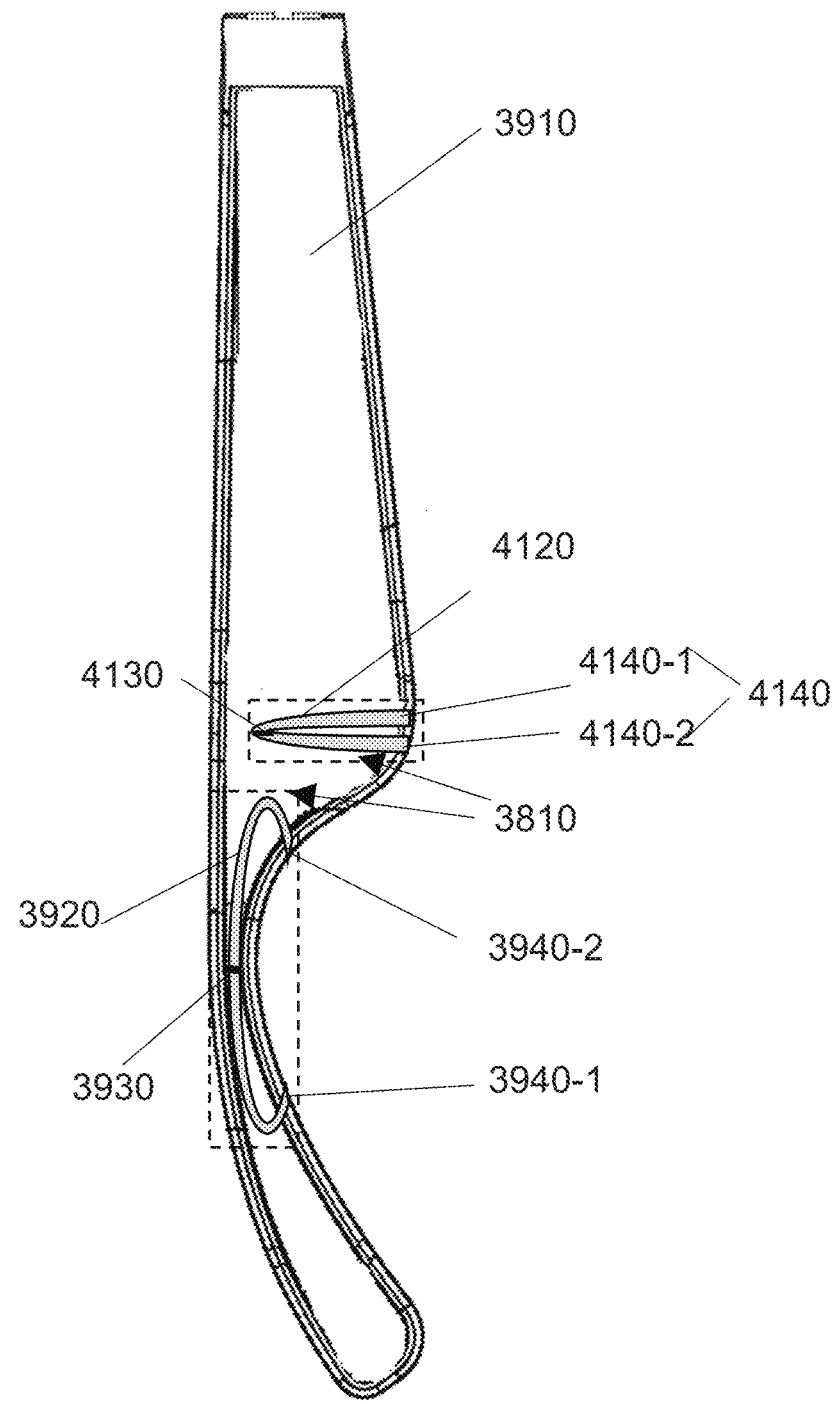
FIG. 41 is a schematic diagram illustrating a cross-sectional view of a temple of exemplary audio glasses according to some embodiments of the present disclosure.

FIG. 41 is a schematic diagram illustrating a cross-sectional view of a temple of audio glasses 3800 according to some embodiments of the present disclosure. As shown in FIG. 41, an acoustic output device 3810 may include an acoustic driver 4130. The acoustic driver 4130 may output sound from two corresponding guiding holes 4140 (e.g., a guiding hole 4140-1 and a guiding hole 4140-2). In some embodiments, the acoustic driver 4130 and the acoustic driver 3930 may respectively output sounds with different frequencies. In some embodiments, the acoustic output device 3810 may further include a controller (not shown), and the controller may be configured to cause the acoustic driver 3930 to output sound in a first frequency range and cause the acoustic driver 4130 to output sound in a second frequency range. The second frequency range may include frequencies higher than frequencies in the first frequency range. For example, the first frequency range may be 100 Hz-1000 Hz, and the second frequency range may be 1000 Hz-10000 Hz. In some alternative embodiments, the controller may be configured to cause the acoustic driver 3930 to output sounds in a plurality of frequency ranges (e.g., a low frequency range, a low and middle frequency range, a middle and high frequency range, a high frequency range, etc.). More descriptions regarding the controller may be found elsewhere in the present disclosure. See, e.g., FIG. 4, FIGS. 6A-6B, and FIG. 37, and the relevant descriptions thereof.

In some embodiments, the acoustic driver 3930 may be a low-frequency acoustic driver, and the acoustic driver 4130 may be a high-frequency acoustic driver. For example, the acoustic driver 3930 may be a low-frequency loudspeaker (e.g., a moving coil driver), and the acoustic driver 4130 may be a high-frequency loudspeaker (e.g., a moving iron driver). Due to different frequency response characteristics of the low-frequency loudspeaker and the high-frequency loudspeaker, frequency bands (or ranges) of the output sound may be different. High-frequency bands and low-frequency bands of a sound may be divided using the low-frequency loudspeaker and the high-frequency loudspeaker. A low-frequency dual-point sound source and a high-frequency dual-point sound source may be constructed to improve a volume of the sound in the near-field and reduce far-field sound leakage. For example, the acoustic driver 3930 may provide a dual-point sound source for outputting a low-frequency sound through the guiding hole 3940-1 and the guiding hole 3940-2, which may be configured to output sound in the low-frequency band. The low-frequency dual-point sound source may be closer to the auricle and configured to increase a volume near the near-field (e.g., positions near the ear of the user). The acoustic driver 4130 may provide a dual-point sound source for outputting a high-frequency sound through the guiding hole 4140-1 and the guiding hole 4140-2, which may be configured to output sound in the high-frequency band. More descriptions regarding the construction of the low-frequency dual-point source and the high-frequency dual-point sound source and positions of the low-frequency dual-point source and the high-frequency dual-point sound source may be found elsewhere in the present disclosure. See, e.g., FIG. 42 and the relevant descriptions thereof. In some embodiments, the acoustic driver 4130 may provide a dual-point sound source for outputting a full-frequency sound through the guiding hole 4140-1 and the guiding hole 4140-2, thereby further increasing the volume of the near-field sound. In some alternative embodiments, the acoustic output device 3810 may include a plurality of acoustic drivers 3930 for generating sounds in a plurality of frequency bands (e.g., a low frequency band, a middle and low frequency band, a middle and high frequency band, a high frequency band, etc.).

For human ears, the frequency band of sound that can be heard may be concentrated in a low-frequency band, and in the low-frequency band, the dual-point sound source may have a strong sound leakage reduction effect, thus in the low-frequency band, an optimization goal may be to increase a volume of the hearing sound. In the high-frequency band, the sound leakage reduction effect of the dual-point sound source may be relatively weak. In the high-frequency band, an optimization goal may be to reduce sound leakage. In some embodiments, the effect of increasing the volume of the hearing sound, reducing the volume of leakage sound (e.g., the increment of the volume of the hearing sound is greater than the increment of the volume of the leakage sound), and expanding the frequency band of leakage reduction may be achieved by adjusting parameters of the acoustic output device 3810 (e.g., a distance between the guiding holes, a frequency band of the output sound, a distance between the front chamber and the rear chamber in the acoustic route 3920 and the acoustic route 4120, and an acoustic impedance in a front and a rear of the diaphragm).

It should be noted that the above description is merely for the convenience of description, and not intended to limit the scope of the present disclosure. It should be understood that, for those skilled in the art, after understanding the principle of the present disclosure, various modifications and changes in the forms and details of the audio glasses 3800 may be made without departing from this principle. For example, the acoustic driver 3930 may be a mid-low-frequency loudspeaker that outputs sound in the mid-low-frequency band. As another example, the acoustic driver 4130 may be a mid-high-frequency loudspeaker that outputs sound in the mid-high-frequency band. These changes are within the protection scope of the present disclosure.

Figure 42:
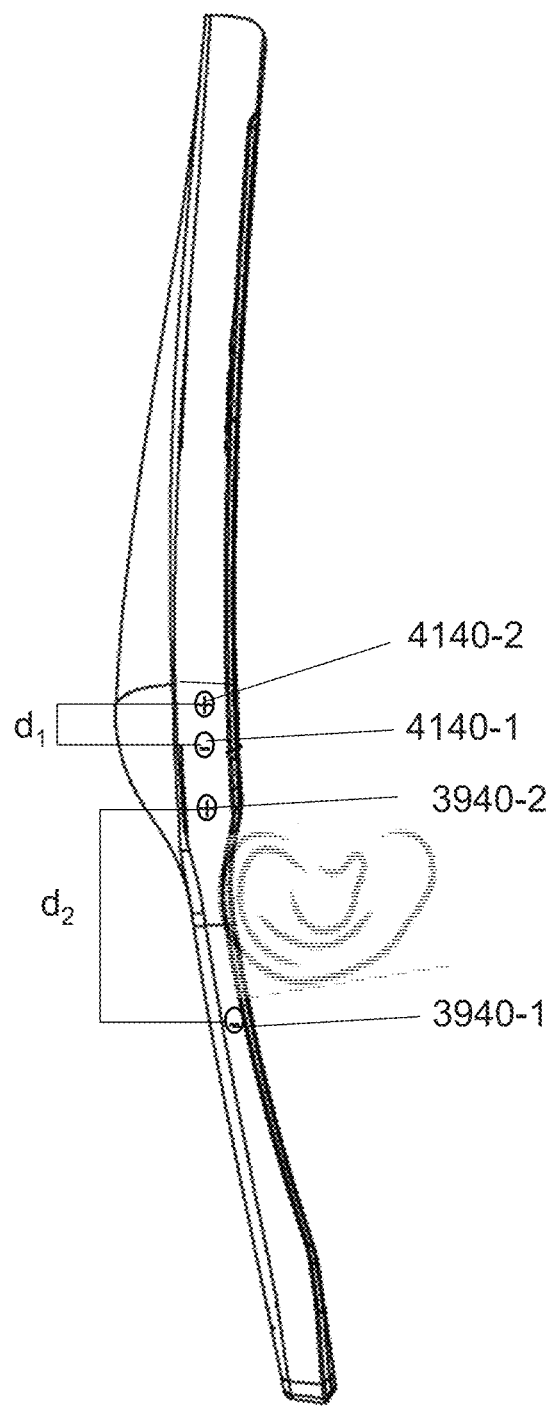
FIG. 42 is a schematic diagram illustrating guiding holes on a temple of exemplary audio glasses according to some embodiments of the present disclosure.

FIG. 42 is a schematic diagram illustrating guiding holes on a temple of a audio glasses according to some embodiments of the present disclosure. As shown in FIG. 41 and FIG. 42, the guiding holes 4140 (e.g., the sound guiding hole 4140-1 and the sound guiding hole 4140-2) corresponding to the acoustic driver 4130 in the acoustic output device 3810 may be disposed on the lower side 3831 of the temple 3830. For the purposes of illustration, the following descriptions are described assuming that the acoustic driver 4130 is a high-frequency acoustic driver and the acoustic driver 3930 is a low-frequency acoustic driver, and not intended to limit the scope of the present disclosure. In some embodiments, distances between two sets of guiding holes 3940 and 4140 may be controlled to increase a volume of the near-field sound and reduce high-frequency sound leakage. In some embodiments, a distance $d_2$ between the guiding hole 4140-1 and the guiding hole 4140-2 corresponding to the acoustic driver 4130 may be less than a distance $d_1$ between the guiding hole 3940-1 and the guiding hole 3940-2 corresponding to the acoustic driver 3930, that is, $d_1$ may be greater than $d_2$. In the low-frequency band, a relatively great distance $d_1$ may correspond to a relatively high volume output by the acoustic output device 3810. At the same time, the relatively great distance $d_1$ may slightly increase the sound leakage, the sound leakage in the low-frequency band may be very relatively small, and after slightly increased, the leakage sound may be kept at a low level. In the high frequency band, a relatively small distance $d_2$ may overcome a problem that a cut-off frequency of the high-frequency sound leakage reduction is relatively low and the frequency band of the sound leakage reduction is relatively narrow. On the other hand, the relatively small distance $d_2$ may improve the sound leakage reduction performance of the acoustic output device in the high-frequency band, and satisfy the needs of an open binaural acoustic output device. More descriptions regarding the adjustment of the distance between two point sound sources of a dual-point sound source to reduce sound leakage may be found elsewhere in the present disclosure. See, e.g., FIG. 9 and FIGS. 12-13, and the relevant descriptions thereof.

In some embodiments, the frequency band of the sound output by the guiding hole 3940-1 and the guiding hole 3940-2 corresponding to the acoustic driver 3930 may overlap with the frequency band of the sound output by the guiding hole 4140-1 and the guiding hole 4140-2 corresponding to the acoustic driver 4130. In this embodiment, a phase of the sound output by the guiding hole 3940 (also referred to as a phase of the guiding hole) corresponding to the acoustic driver 3930 may be the same as or different from a phase of the sound output by the guiding hole 4140 corresponding to the acoustic driver 4130. When the phase of the guiding hole 3940 is different from the phase of the guiding hole 4140, the sound leakage reduction of the audio glasses may be improved. In some embodiments, when the frequency band of the sound output by the guiding hole 3940-1 and the guiding hole 3940-2 overlaps with the frequency band of the sound output by the guiding hole 4140-1 and the guiding hole 4140-2, and the phase of the guiding hole 3940 is different from the phase of the guiding hole 4140, $d_1/d_2$ may be set to 1-1.5. In some embodiments, $d_1/d_2$ may be set to 1-1.4. In some embodiments, $d_1/d_2$ may beset to 1-1.3. In some embodiments, $d/d_2$ may be set to 1-1.2. In some embodiments, $d/d_2$ may be set to 1-1.1. More descriptions regarding the overlap of the frequency bands may be found elsewhere in the present disclosure. See, e.g., FIG. 4 and the relevant descriptions thereof.

In some embodiments, the sound leakage may be reduced by controlling the length of the front chamber and the rear chamber corresponding to the guiding hole. For example, a length of the rear chamber corresponding to the guiding hole 3940-2 may be different from a length of the front chamber corresponding to the guiding hole 3940-1, and a length of the rear chamber corresponding to the guiding hole 4140-2 may be the same as a length of the front chamber corresponding to the guiding hole 4140-1, and a phase difference between the two sounds output by the guiding holes (e.g., the guiding hole 3940 and the guiding hole 4140) may be 180°. In this embodiment, a ratio of the length of the rear chamber corresponding to the guiding hole 3940-2 to the length of the front chamber corresponding to the guiding hole 3940-1 may be 0.5-2. In some embodiments, the ratio of the length of the rear chamber of the guiding hole 3940-2 to the length of the front chamber corresponding to the guiding hole 3940-1 may be 0.6-1.5. In some embodiments, the ratio of the length of the rear chamber corresponding to the guiding hole 3940-2 to the length of the front of the guiding hole 3940-1 may be 0.8-1.2. More descriptions regarding the adjustment of the lengths of the front chamber and the rear chamber to reduce sound leakage may be found elsewhere in the present disclosure. See, e.g., FIGS. 34-36 and the relevant descriptions thereof.

In some embodiments, the sound leakage may be reduced by controlling acoustic impedances at the front and the rear of the diaphragm. In some embodiments, an acoustic impedance of an acoustic route (e.g., the front chamber) corresponding to the guiding hole 3940-2 may be different from an acoustic impedance of the acoustic route (e.g., the rear chamber) corresponding to the guiding hole 3940-1 in the acoustic output device 3810, and an acoustic impedance of the acoustic route (e.g., the front chamber) corresponding to the guiding hole 4140-2 may be different from the acoustic impedance of the acoustic route (e.g., the rear chamber) corresponding to the guiding hole 4140-1. In some embodiments, the acoustic impedance of the acoustic route (e.g., the front chamber) corresponding to the guiding hole 3940-2 may be different from the acoustic impedance of the acoustic route (e.g., the rear chamber) corresponding to the guiding hole 3940-1, and the acoustic impedance of the acoustic route (e.g., the front chamber) corresponding to the guiding hole 4140-2 may be the same as the acoustic impedance of the acoustic route (rear chamber) corresponding to the guiding hole 4140-1. In the embodiment, a ratio of the acoustic impedance (also referred to as an acoustic impedance ratio) of the acoustic route corresponding to the guiding hole 3940-2 to the acoustic impedance of the acoustic route corresponding to the guiding hole 3940-1 or a ratio of the acoustic impedance (also referred to as an acoustic impedance ratio) of the acoustic route corresponding to the guiding hole 3940-1 to the acoustic impedance of the acoustic route corresponding to the guiding hole 3940-2 may be 0.5-2. In some embodiments, the ratio of the acoustic impedance may be 0.6-1.9. In some embodiments, the ratio of the acoustic impedance ratio may be 0.7-1.8. In some embodiments, the ratio of the acoustic impedance ratio may be 0.8-1.7. In some embodiments, the ratio of the acoustic impedance ratio may be 0.8-1.6. In some embodiments, the ratio of the acoustic impedance ratio may be 0.8-1.5. In some embodiments, the ratio of the acoustic impedance ratio may be 0.8-1.4. In some embodiments, the ratio of the acoustic impedance ratio may be 0.8-1.4. In some embodiments, the ratio of the acoustic impedance ratio may be 0.8-1.3. In some embodiments, the ratio of the acoustic impedance ratio may be 0.8-1.2. In some embodiments, the ratio of the acoustic impedance ratio may be 0.85-1.15. In some embodiments, the ratio of the acoustic impedance ratio may be 0.9-1.1. In some embodiments, the ratio of the acoustic impedance ratio may be 0.95-1.05. In some embodiments, the ratio of the acoustic impedance ratio may be 0.95-1. In some embodiments, the acoustic impedance of the acoustic routes 3920 and 4120 may be adjusted by using an acoustic resistance material (e.g., a tuning net and/or tuning cotton, etc.) in the acoustic route 3920 and the acoustic route 4120. In some alternative embodiments, the tuning net may be configured as a waterproof layer, a dust-proof net, etc., for the guiding hole 3940 and the guiding hole 4140. More descriptions regarding the acoustic impedance may be found elsewhere in the present disclosure. See, e.g., FIGS. 34-36 and the relevant descriptions thereof.

It should be noted that the above description is merely for the convenience of description, and not intended to limit the scope of the present disclosure. It should be understood that, for those skilled in the art, after understanding the principle of the present disclosure, various modifications and changes in the forms and details of the audio glasses (e.g., the audio glasses 3800) may be made without departing from this principle. For example, to further improve the volume of the sound in the low frequency band, the acoustic driver 3930 may have only one guiding hole 4140, which may be a single point sound source. These changes are within the protection scope of the present disclosure.

Figure 43:
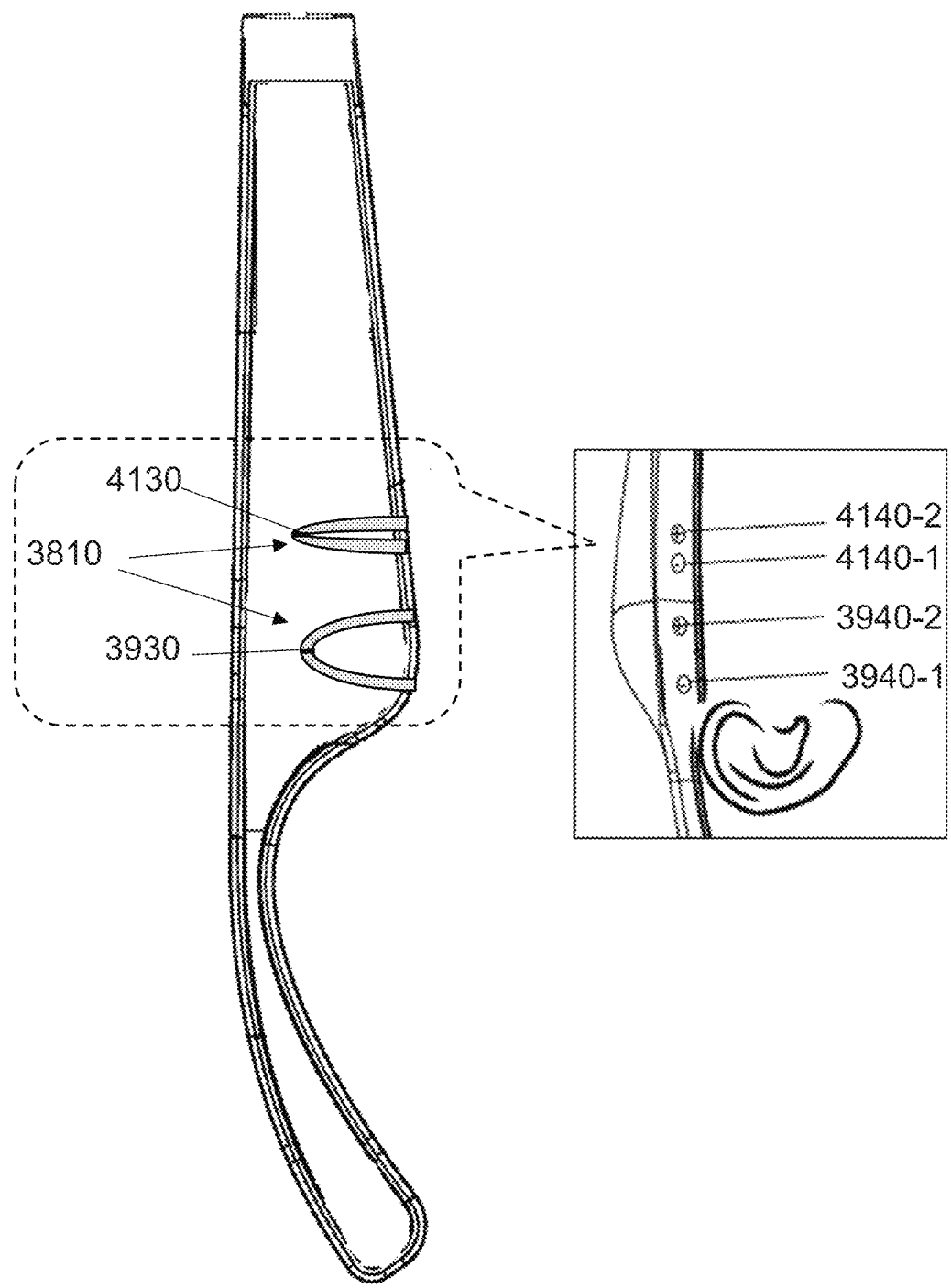
FIG. 43 is a schematic diagram illustrating guiding holes on a temple of exemplary audio glasses according to some embodiments of the present disclosure.

FIG. 43 is a schematic diagram illustrating guiding holes on a temple of audio glasses 3800 according to some embodiments of the present disclosure. As shown in FIG. 43, a guiding hole 3940-1 and a guiding hole 3940-2 corresponding to an acoustic driver 3930 in an acoustic output device 3810 may be disposed on a front side of the user's auricle and on the temple 3830 when the audio glasses is worn by the user. It should be noted that the distribution of the guiding hole 3940 and the guiding hole 4140 of the acoustic output device 3810 may be not limited to the situation shown in FIGS. 39-43. For example, each or anyone of the guiding hole 3940-1, the guiding hole 3940-2, the guiding hole 4140-1, and the guiding hole 4140-2 may be disposed at a relatively low side 3831 or an upper side 3834 of the temple 3830. As another example, each or any one of the guiding hole 3940-1, the guiding hole 3940-2, the guiding hole 4140-1, and the guiding hole 4140-2 may be disposed at the inner side 3832 or the outer side 3833 of the temple 3830. As yet another example, each or any one of the guiding hole 3940-1, the guiding hole 3940-2, the guiding hole 4140-1, and the guiding hole 4140-2 may be disposed at the front side of the user's auricle and on any position of the temple 3830 when the audio glasses is worn by the user. As yet another example, each or any one of the guiding hole 3940-1, the guiding hole 3940-2, the guiding hole 4140-1, and the guiding hole 4140-2 may be disposed at a rear side of the user's auricle on any position of the temple 3830 when the audio glasses is worn by the user. In some alternative embodiments, each or any one of the guiding hole 3940-1, the guiding hole 3940-2, the guiding hole 4140-1, and the guiding hole 4140-2 may be disposed on the frame 3820 or the lens 3840.

It should be noted that the above description is merely for the convenience of description, and not intended to limit the scope of the present disclosure. It should be understood that, for those skilled in the art, after understanding the principle of the present disclosure, various modifications and changes in the forms and details of the audio glasses 3800 may be made without departing from this principle. For example, the acoustic output device 3810 may include three or more acoustic drivers. Each of the three or more acoustic drivers may correspond to three or more guiding holes, and each of the three or more guiding holes may be disposed at any position of the audio glasses 3800. These changes are within the protection scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output device, comprising:
    at least one set of acoustic drivers configured to generate sounds,
        wherein the at least one set of acoustic drivers includes at least one low-frequency acoustic driver and at least one high-frequency acoustic driver,
        the at least one low-frequency acoustic driver is configured to generate sounds in a first frequency range,
        the at least one high-frequency acoustic driver is configured to generate sounds in a second frequency range, and
        the second frequency range includes one or more frequencies higher than one or more frequencies in the first frequency range;
    at least two guiding holes configured to output the sounds generated by the at least one set of acoustic drivers, a phase difference being between phases of the sounds output by the at least two guiding holes,
        wherein the at least two guiding holes include at least two first guiding holes and at least two second guiding holes,
        the at least two first guiding holes are configured to output the sounds generated by the at least one low-frequency acoustic driver, and
        the at least two second guiding holes are configured to output the sounds generated by the at least one high-frequency acoustic driver; and
    a supporting structure configured to support the at least one high-frequency acoustic driver and the at least one low-frequency acoustic driver and keep the at least two second guiding holes closer to the user's ear canal entrance than the at least two first guiding holes.

2. The acoustic output device of claim 1, wherein the phases of the sounds output by the at least two guiding holes are opposite.

3. The acoustic output device of claim 1, wherein
    a first distance is between the at least two first guiding holes, a second distance is between the at least two second guiding holes, and the first distance exceeds than the second distance.

4. The acoustic output device of claim 3, wherein the first distance is in a range of 20 millimeters-40 millimeters, and the second distance is in a range of 3 millimeters-7 millimeters.

5. The acoustic output device of claim 3, wherein the first distance is at least twice of the second distance.

6. The acoustic output device of claim 1, wherein the first frequency range includes frequencies lower than 650 Hz, and the second frequency range includes frequencies higher than 1000 Hz.

7. The acoustic output device of claim 1, wherein the first frequency range overlaps with the second frequency range.

8. The acoustic output device of claim 1, further comprising a controller, wherein
the controller includes an electronic frequency division module configured to divide an audio source signal to generate a low-frequency signal corresponding to the first frequency range and a high-frequency signal corresponding to the second frequency range,
the low-frequency signal drives the at least one low-frequency acoustic driver to generate the sounds in the first frequency range, and
the high-frequency signal drives the at least one high-frequency acoustic driver to generate the sounds in the second frequency range.

9. The acoustic output device of claim 1, wherein
the at least one low-frequency acoustic driver includes a first transducer,
the at least one high-frequency acoustic driver includes a second transducer, and
the first transducer and the second transducer have different frequency response characteristics.

10. The acoustic output device of claim 1, wherein
at least two first acoustic routes are formed between the at least one low-frequency acoustic driver and the at least two first guiding holes,
at least two second acoustic routes are formed between the at least one high-frequency acoustic driver and the at least two second guiding holes, and
the at least two first acoustic routes and the at least two second acoustic routes have different frequency selection characteristics.

11. The acoustic output device of claim 10, wherein each of the at least two first acoustic routes includes an acoustic resistance material, and an acoustic impedance of the acoustic resistance material is in a range from 5MKS Rayleigh to 500MKS Rayleigh.

12. The acoustic output device of claim 1, wherein the at least two first guiding holes and the at least two second guiding holes are disposed on the supporting structure.

13. The acoustic output device of claim 1, wherein the supporting structure includes a first housing, the low-frequency acoustic driver is encapsulated by the first housing, and the first housing defines a front chamber and a rear chamber of the low-frequency acoustic driver.

14. The acoustic output device of claim 13, wherein
the front chamber of the low-frequency acoustic driver is acoustically coupled to one of the at least two first guiding holes, and the rear chamber is acoustically coupled to the other first guiding hole of the at least two first guiding holes.

15. The acoustic output device of claim 1, wherein the supporting structure includes a second housing, the high-frequency acoustic driver is encapsulated by the second housing, and the second housing defines a front chamber and a rear chamber of the high-frequency acoustic driver.

16. The acoustic output device of claim 15, wherein the front chamber of the high-frequency acoustic driver is acoustically coupled to one of the at least two second guiding holes, and the rear chamber of the high-frequency acoustic driver is acoustically coupled to the other second guiding hole of the at least two second guiding holes.

17. A pair of glasses, comprising a frame, one or more lenses, and one or more legs, wherein the glasses further include:
at least one set of acoustic drivers configured to generate sounds,
wherein the at least one set of acoustic drivers includes at least one low-frequency acoustic driver and at least one high-frequency acoustic driver,
the at least one low-frequency acoustic driver is configured to generate sounds in a first frequency range,
the at least one high-frequency acoustic driver is configured to generate sounds in a second frequency range, and
the second frequency range includes one or more frequencies higher than one or more frequencies in the first frequency range;
at least two guiding holes configured to output the sounds generated by the at least one set of acoustic drivers, a phase difference being between phases of the sounds output by the at least two guiding holes,
wherein the at least two guiding holes include at least two first guiding holes and at least two second guiding holes,
the at least two first guiding holes are configured to output the sounds generated by the at least one low-frequency acoustic driver, and
the at least two second guiding holes are configured to output the sounds generated by the at least one high-frequency acoustic driver; and
a supporting structure configured to support the at least one high-frequency acoustic driver and the at least one low-frequency acoustic driver and keep the at least two second guiding holes closer to the user's ear canal entrance than the at least two first guiding holes.

* * * * *